US008594370B2

(12) United States Patent
Schamp et al.

(10) Patent No.: US 8,594,370 B2
(45) Date of Patent: Nov. 26, 2013

(54) VULNERABLE ROAD USER PROTECTION SYSTEM

(75) Inventors: Gregory G. Schamp, South Lyon, MI (US); Owen A. Davies, Goleta, CA (US); James C. Demro, Santa Barbara, CA (US)

(73) Assignee: Automotive Systems Laboratory, Inc., Pontiac, MI (US)

( * ) Notice: Subject to any disclaimer, the term of this patent is extended or adjusted under 35 U.S.C. 154(b) by 1070 days.

(21) Appl. No.: 11/658,758

(22) PCT Filed: Jul. 26, 2005

(86) PCT No.: PCT/US2005/026518
§ 371 (c)(1),
(2), (4) Date: Feb. 19, 2008

(87) PCT Pub. No.: WO2006/014974
PCT Pub. Date: Feb. 9, 2006

(65) Prior Publication Data
US 2009/0010495 A1  Jan. 8, 2009

Related U.S. Application Data

(60) Provisional application No. 60/591,564, filed on Jul. 26, 2004.

(51) Int. Cl.
*G06K 9/00* (2006.01)
(52) U.S. Cl.
USPC ........... 382/103; 382/104; 382/106; 382/224; 382/225; 382/173; 382/168; 382/170; 382/181; 382/203; 382/197; 701/301; 340/901; 340/435; 340/436; 340/425.5

(58) Field of Classification Search
USPC ......... 382/103, 104, 106, 170, 168, 173, 224, 382/225; 701/301; 340/901, 435, 436, 340/425.5
See application file for complete search history.

(56) References Cited

U.S. PATENT DOCUMENTS 4,628,362 A   12/1986  Waehner
4,708,473 A   11/1987  Metzdorff et al.
(Continued)

FOREIGN PATENT DOCUMENTS

CA   2244061 A    9/1998
DE   3636946 C2   5/1989
(Continued)

OTHER PUBLICATIONS

U.S. Appl. No. 60/549,203, filed Mar. 2, 2004.*
(Continued)

*Primary Examiner* — Matthew Bella
*Assistant Examiner* — Julian Brooks
(74) *Attorney, Agent, or Firm* — Raggio & Dinnin, P.C.

(57) ABSTRACT

A range map of a visual scene generated by a stereo vision and associate image processing system, and is filtered to remove objects beyond a region of interest and for which a collision is not possible, and to remove an associated road surface. Objects clustered in range bins are separated by segmentation. A composite range map is generated using principale components analysis and processed with a connected-components sieve filter. Objects are identified using one or more of a harmonic profile and other features using an object recognition processor using a combination of inclusive, exclusive and harmonic networks to generate a classification metric.

41 Claims, 38 Drawing Sheets

(56) References Cited

U.S. PATENT DOCUMENTS

| | | |
|---|---|---|
| 4,802,230 A | 1/1989 | Horowitz |
| 5,016,173 A | 5/1991 | Kenet et al. |
| 5,020,114 A | 5/1991 | Fujioka et al. |
| 5,163,319 A | 11/1992 | Spies et al. |
| 5,204,536 A | 4/1993 | Vardi |
| 5,307,136 A | 4/1994 | Saneyoshi |
| 5,400,244 A | 3/1995 | Watanabe et al. |
| 5,455,685 A | 10/1995 | Mori |
| 5,487,116 A | 1/1996 | Nakano et al. |
| 5,528,698 A | 6/1996 | Kamei et al. |
| 5,541,590 A | 7/1996 | Nishio |
| 5,633,944 A | 5/1997 | Guibert et al. |
| 5,671,290 A | 9/1997 | Vaidyanathan |
| 5,675,489 A | 10/1997 | Pomerleau |
| 5,684,898 A | 11/1997 | Brady et al. |
| 5,835,614 A | 11/1998 | Aoyama et al. |
| 5,844,505 A | 12/1998 | Van Ryzin |
| 5,845,000 A | 12/1998 | Breed et al. |
| 5,852,672 A | 12/1998 | Lu |
| 5,892,575 A | 4/1999 | Marino |
| 5,937,079 A | 8/1999 | Franke |
| 5,946,041 A | 8/1999 | Morita |
| 5,983,147 A | 11/1999 | Krumm |
| 5,987,174 A | 11/1999 | Nakamura et al. |
| 5,988,862 A | 11/1999 | Kacyra et al. |
| 6,031,935 A * | 2/2000 | Kimmel ............ 382/173 |
| 6,035,053 A | 3/2000 | Yoshioka et al. |
| 6,122,597 A | 9/2000 | Saneyoshi et al. |
| 6,150,932 A | 11/2000 | Kenue |
| 6,169,572 B1 | 1/2001 | Sogawa |
| 6,191,704 B1 | 2/2001 | Takenaga et al. |
| 6,205,242 B1 | 3/2001 | Onoguchi |
| 6,213,401 B1 | 4/2001 | Brown |
| 6,215,898 B1 | 4/2001 | Woodfill et al. |
| 6,266,442 B1 | 7/2001 | Laumeyer et al. |
| 6,307,959 B1 | 10/2001 | Mandelbaum et al. |
| 6,311,123 B1 | 10/2001 | Nakamura et al. |
| 6,327,522 B1 | 12/2001 | Kojima et al. |
| 6,337,637 B1 | 1/2002 | Kubota et al. |
| RE37,610 E * | 3/2002 | Tsuchiya et al. ............ 340/435 |
| 6,370,475 B1 | 4/2002 | Breed et al. |
| 6,405,132 B1 | 6/2002 | Breed et al. |
| 6,421,463 B1 | 7/2002 | Poggio et al. |
| 6,429,789 B1 | 8/2002 | Kiridena et al. |
| 6,453,056 B2 | 9/2002 | Laumeyer et al. |
| 6,456,737 B1 | 9/2002 | Woodfill et al. |
| 6,477,260 B1 | 11/2002 | Shimomura |
| 6,518,916 B1 | 2/2003 | Ashihara et al. |
| 6,553,296 B2 | 4/2003 | Breed et al. |
| 6,615,137 B2 | 9/2003 | Lutter et al. |
| 6,653,935 B1 | 11/2003 | Winner et al. |
| 6,661,449 B1 | 12/2003 | Sogawa |
| 6,671,615 B1 | 12/2003 | Becker et al. |
| 6,687,577 B2 | 2/2004 | Strumolo |
| 6,727,844 B1 | 4/2004 | Zimmermann et al. |
| 6,734,904 B1 | 5/2004 | Boon et al. |
| 6,749,218 B2 | 6/2004 | Breed |
| 6,771,834 B1 * | 8/2004 | Martins et al. ............ 382/257 |
| 6,788,817 B1 | 9/2004 | Saka et al. |
| 6,789,015 B2 | 9/2004 | Tsuji et al. |
| 6,792,147 B1 | 9/2004 | Saka et al. |
| 6,801,244 B2 | 10/2004 | Takeda et al. |
| 6,801,662 B1 | 10/2004 | Owechko et al. |
| 6,819,779 B1 | 11/2004 | Nichani |
| 6,823,084 B2 | 11/2004 | Myers et al. |
| 6,836,724 B2 | 12/2004 | Becker et al. |
| 6,856,873 B2 | 2/2005 | Breed et al. |
| 6,891,960 B2 | 5/2005 | Retterath et al. |
| 6,911,997 B1 | 6/2005 | Okamoto et al. |
| 6,917,693 B1 | 7/2005 | Kiridena et al. |
| 6,920,954 B2 | 7/2005 | Hashimoto et al. |
| 6,937,747 B2 | 8/2005 | Culp et al. |
| 6,946,978 B2 | 9/2005 | Schofield |
| 6,947,575 B2 | 9/2005 | Wallace et al. |
| 6,956,469 B2 | 10/2005 | Hirvonen et al. |
| RE38,870 E | 11/2005 | Hall |
| 6,961,443 B2 | 11/2005 | Mahbub |
| 6,963,661 B1 | 11/2005 | Hattori et al. |
| 6,968,073 B1 | 11/2005 | O'Boyle et al. |
| 7,009,500 B2 | 3/2006 | Rao et al. |
| 7,046,822 B1 | 5/2006 | Knoeppel et al. |
| 7,057,532 B2 | 6/2006 | Shafer et al. |
| 7,068,815 B2 | 6/2006 | Chang et al. |
| 7,068,844 B1 | 6/2006 | Javidi et al. |
| 7,139,411 B2 | 11/2006 | Fujimura et al. |
| 7,151,530 B2 | 12/2006 | Roeber et al. |
| 7,202,776 B2 | 4/2007 | Breed |
| 7,203,356 B2 | 4/2007 | Gokturk et al. |
| 7,209,221 B2 | 4/2007 | Breed et al. |
| 7,230,640 B2 | 6/2007 | Regensburger et al. |
| 7,263,209 B2 | 8/2007 | Camus et al. |
| 7,275,431 B2 | 10/2007 | Zimmermann et al. |
| 7,337,650 B1 | 3/2008 | Preston et al. |
| 7,340,077 B2 * | 3/2008 | Gokturk et al. ............ 382/103 |
| 7,366,325 B2 | 4/2008 | Fujimura et al. |
| 7,397,929 B2 | 7/2008 | Nichani et al. |
| 7,400,744 B2 | 7/2008 | Nichani et al. |
| 7,403,659 B2 | 7/2008 | Das et al. |
| 7,406,181 B2 | 7/2008 | O'Boyle et al. |
| 7,493,202 B2 | 2/2009 | Demro et al. |
| 7,505,841 B2 | 3/2009 | Sun et al. |
| 7,543,677 B2 | 6/2009 | Igawa |
| 7,630,806 B2 | 12/2009 | Breed |
| 7,783,403 B2 | 8/2010 | Breed |
| 7,852,462 B2 | 12/2010 | Breed et al. |
| 2001/0037203 A1 | 11/2001 | Satoh |
| 2001/0045981 A1 | 11/2001 | Gloger et al. |
| 2002/0050924 A1 | 5/2002 | Mahbub |
| 2002/0051578 A1 | 5/2002 | Imagawa et al. |
| 2002/0116106 A1 | 8/2002 | Breed et al. |
| 2002/0181742 A1 | 12/2002 | Wallace et al. |
| 2002/0198632 A1 | 12/2002 | Breed et al. |
| 2003/0016869 A1 | 1/2003 | Laumeyer et al. |
| 2003/0138133 A1 | 7/2003 | Nagaoka et al. |
| 2003/0156756 A1 | 8/2003 | Gokturk et al. |
| 2003/0169906 A1 | 9/2003 | Gokturk et al. |
| 2003/0179084 A1 | 9/2003 | Skrbina et al. |
| 2003/0202683 A1 | 10/2003 | Ma et al. |
| 2003/0204384 A1 | 10/2003 | Owechko et al. |
| 2003/0209893 A1 | 11/2003 | Breed et al. |
| 2003/0235341 A1 | 12/2003 | Gokturk et al. |
| 2004/0086153 A1 | 5/2004 | Tsai et al. |
| 2004/0098191 A1 | 5/2004 | Becker et al. |
| 2004/0120571 A1 | 6/2004 | Duvdevani et al. |
| 2004/0136564 A1 | 7/2004 | Roeber et al. |
| 2004/0178945 A1 | 9/2004 | Buchanan |
| 2004/0183906 A1 | 9/2004 | Nagaoka et al. |
| 2004/0212676 A1 | 10/2004 | Mathes et al. |
| 2004/0246114 A1 | 12/2004 | Hahn |
| 2004/0252862 A1 | 12/2004 | Camus et al. |
| 2004/0252863 A1 | 12/2004 | Chang et al. |
| 2004/0252864 A1 | 12/2004 | Chang et al. |
| 2005/0002662 A1 | 1/2005 | Arpa et al. |
| 2005/0013465 A1 | 1/2005 | Southall et al. |
| 2005/0015201 A1 | 1/2005 | Fields et al. |
| 2005/0018043 A1 | 1/2005 | Takeda et al. |
| 2005/0024491 A1 | 2/2005 | Takeda et al. |
| 2005/0063565 A1 | 3/2005 | Nagaoka et al. |
| 2005/0084156 A1 | 4/2005 | Das et al. |
| 2005/0111700 A1 | 5/2005 | O'Boyle et al. |
| 2005/0131646 A1 | 6/2005 | Camus |
| 2005/0162638 A1 | 7/2005 | Suzuki et al. |
| 2005/0175235 A1 | 8/2005 | Luo et al. |
| 2005/0175243 A1 | 8/2005 | Luo et al. |
| 2005/0177336 A1 | 8/2005 | Zimmermann et al. |
| 2005/0185845 A1 | 8/2005 | Luo et al. |
| 2005/0185846 A1 | 8/2005 | Luo et al. |
| 2005/0238229 A1 | 10/2005 | Ishidera |
| 2005/0249378 A1 | 11/2005 | Retterath et al. |
| 2006/0208169 A1 | 9/2006 | Breed et al. |
| 2007/0131851 A1 | 6/2007 | Holtz |
| 2007/0154067 A1 | 7/2007 | Laumeyer et al. |
| 2008/0253606 A1 | 10/2008 | Fujimaki et al. |

(56) References Cited

U.S. PATENT DOCUMENTS

FOREIGN PATENT DOCUMENTS

| EP | 0 281 725 A2 | 9/1988 |
|---|---|---|
| GB | 2270436 A | 3/1994 |
| JP | H06-22319 6223191 A | 8/1994 |
| JP | 7134237 A | 5/1995 |
| JP | 9254726 A | 9/1997 |
| JP | 10210486 A | 8/1998 |
| JP | 10285582 A | 10/1998 |
| JP | 11031230 A | 2/1999 |
| JP | 11353593 A | 12/1999 |
| JP | 2000207693 A | 7/2000 |
| JP | 2000293685 A | 10/2000 |
| JP | 2001052171 A | 2/2001 |
| JP | 2001084377 A | 3/2001 |
| JP | 2001134892 A | 5/2001 |
| JP | 2001204013 A | 7/2001 |
| JP | 3218521 B2 | 10/2001 |
| JP | 3431498 B2 | 7/2003 |
| JP | 3450189 B2 | 9/2003 |
| JP | 2003281503 A | 10/2003 |
| JP | 2004054308 A | 2/2004 |
| JP | 3598793 B2 | 12/2004 |
| JP | 3666332 B2 | 6/2005 |
| JP | 3716623 B2 | 11/2005 |
| JP | 3729025 B2 | 12/2005 |
| JP | 3859429 B2 | 12/2006 |
| JP | 4253901 B2 | 4/2009 |

OTHER PUBLICATIONS

Higgins Jr., Charles M., Classification and Approximation with Rule-Based Networks, Thesis in Partial Fulfillment of the Requirements for the Degree of Doctor of Philosophy, Department of Electrical Engineering, California Institute of Technology, Pasadena, California, 1993.

Lawrence, Steve; Giles, C. Lee; and Tsoi, Ah Chung, "Lessons in Neural Network Training: Overfitting May be Harder than Expected,"Proceedings of the Fourteenth National Conference on Artificial Intelligence, AAAI-97, AAAI Press, Menlo Park, California, pp. 540-545, 1997. Copyright AAAI.

Haykin, Simon, Neural Networks: A Comprehensive Foundation (2nd Edition), Prentice Hall, ISBN 0-13-273350-1, 1998, pp. 142 and 159.

Morse, Bryan S., "Lecture 2: Image Processing Review, Neighbors, Connected Components, and Distance," Bringham Young University, Copyright Bryan S. Morse 1998-2000, last modified on Jan. 6, 2000, downloaded from http://morse.cs.byu.edu/650/lectures/lect02/review-connectivity.pdf on Jul. 15, 2011, 7 pp.

Ostermann, Luis Garrido, "Chapter 2: General Framework," Signal Theory and Communications Department, Universitat Politecnica De Catalunya, Apr. 2002, pp. 9-32, downloaded from http://tdx.cat/bitstream/handle/10803/6878/03CAPITOL2.pdf?sequence=3 on Jul. 15, 2011.

Kumar, Minakshi, "Digital Image Processing," from Satellite Remote Sensing and GIS Applications in Agricultural Metrology, World Meteorological Organisation, Jul. 2003, pp. 81-102, downloaded from http://www.wamis.org/agm/pubs/agm8/Paper-5.pdf on Jul. 15, 2011.

Boverie et al., "Intelligent System for Video Monitoring of Vehicle Cockpit," SAE 980613, Feb. 23-26, 1998.

Conde et al.,"A Smart Airbag Solution Based on a High Speed CMOS Camera System",1999 IEEE Internaltional Conference on Image Processing, pp. 930-934.

Ramesh et al., "Real-Time Video Surveillance and Monitoring for Automotive Applications," SAE 2000-01-0347, Mar. 6-9, 2000.

Lequellec et al., "Car Cockpit 3D Reconstruction by a Structured Light Sensor" IEEE Intelligent Vehicles Symposium 2000, Oct. 3-5, 2000, pp. 87-92.

Siemens, "Sensors: All-Round Talent", NewWorld, Feb. 2001, downloaded from the internet on Aug. 20, 2007 from http://w4.siemens.de/Ful/en/archiv/newworld/heft2_01/artikel03/index.html.

International Search Report in International Application No. PCT/US05/026518, Feb. 16, 2006.

Written Opinion of the International Searching Authority in International Application No. PCT/US05/026518, Feb. 16, 2006.

International Preliminary Examination Report in International Application No. PCT/US05/026518, Aug. 30, 2006.

Everitt, Brian S, "Statistical Methods for Medical Investigations, 2nd edition," Hodder Arnold, ISBN 0-340-61431-5, 1994, pp. 129-139.

European Search Report in European Application No. 05778164.3-1224 / 1779295 based on PCT/US2005026518, Jun. 1, 1012, 10 pages.

Bernier T et al: "A new method for representing and matching shapes of natural objects", Pattern Recognition, Elsevier, GB, vol. 36, No. 8, Aug. 1, 2003, pp. 1711-1723.

Wang Z et al: "Shape based leaf image retrieval", IEE Proceedings: Vision, Image and Signal Processing, Institution of Electrical Engineers, GB, vol. 150, No. 1, Feb. 20, 2003, pp. 34-43.

Wu H-S et al: "Optimal segmentation of cell images", IEE Proceedings: Vision, Image and Signal Processing, Institution of Electrical Engineers, GB, vol. 145, No. 1, Feb. 25, 1998, pp. 50-56.

Grigorescu C et al: "Distance sets for shape filters and shape recognition", IEEE Transactions on Image Processing, IEEE Service Center, Piscataway, NJ, US, vol. 12, No. 10, Oct. 1, 2003, pp. 1274-1286.

J Woodfill and B, Von Herzen, "Real-time stereo vision on the PARTS reconfigurable computer," Proceedings of The 5th Annual IEEE Symposium on Field Programmable Custom Computing Machines, (Apr. 1997).

K. Konolige, "Small Vision Systems: Hardware and Implementation," Proc. Eighth Int'l Symp. Robotics Research, pp. 203-212, Oct. 1997.

E.G.M Petrakis, "Binary Image Processing", PowerPoint presentation downloaded from http://www.intelligence.tuc.gr/~petrakis/courses/computervision/binary.pdf on Jul. 15, 2011, 30 pp.

Kuzuwa & Partners, English Language Summary of 2nd Office Action in Japanese Patent Application No. 2007-523736 (based on International Application No. PCT/US2005/026518), Jul. 27, 2012, 4 pages.

Kuzuwa & Partners, English Language Summary of 1st Office Action in Japanese Patent Application No. 2011-221172 (Division of Japanese Patent Application No. 2007-523736 based on International Application No. PCT/US2005/026518), May 22, 2013, 3 pages.

Kuzuwa & Partners, English Language Summary of 3rd Office Action in Japanese Patent Application No. 2007-523736 (based on International Application No. PCT/US2005/026518), Jun. 5, 2013, 4 pages.

\* cited by examiner

Down Range Data
Row i  Z(i,j)
Column j
Fig. 15.
Range Histogram (Bin Counts)
Down Range Z  ∑Pixels(i,j)@Z
Column j
Fig. 16.
Pixel Value
Row i  V(i,j)
Column j
Fig. 17
Fig. 18a.
Fig. 18b.
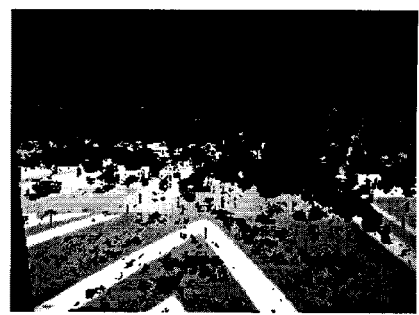
Fig. 18c.

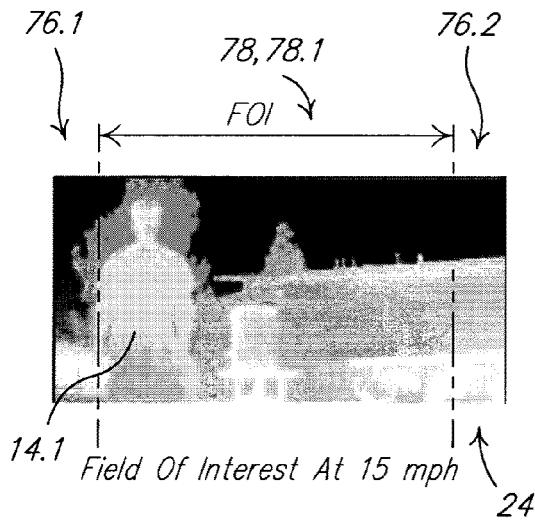
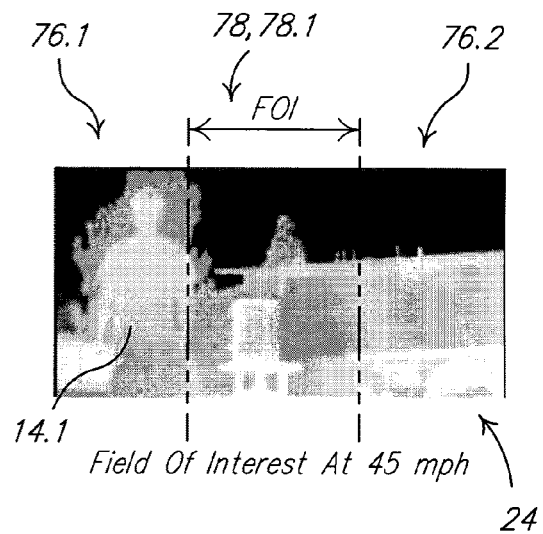
Fig. 22a.  Fig. 22b.
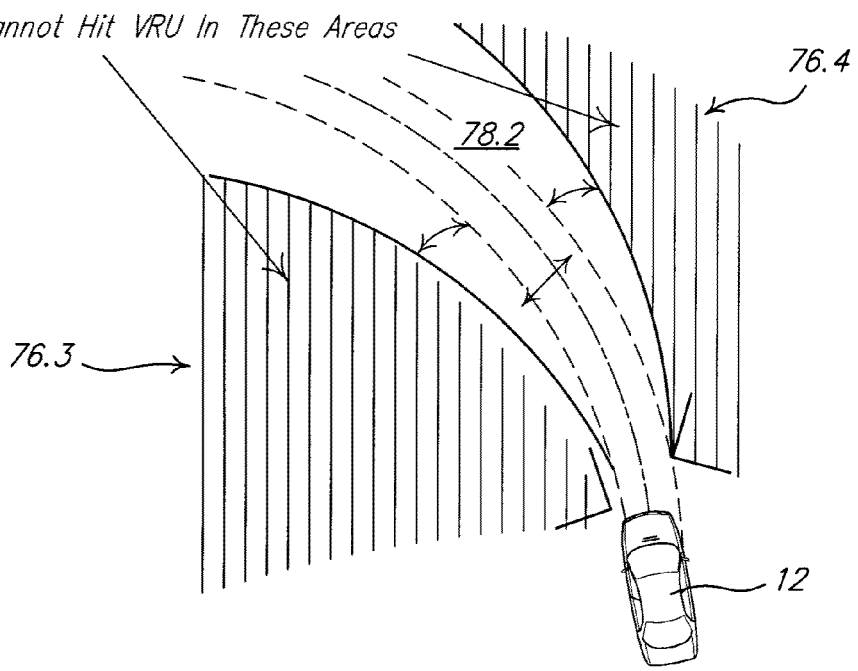
Fig. 23.

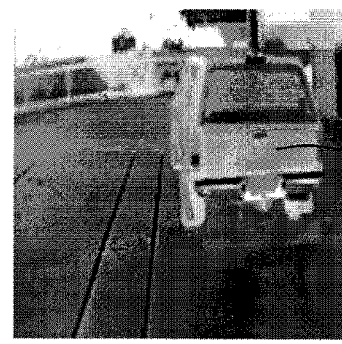
Fig. 37c.
Fig. 37d.
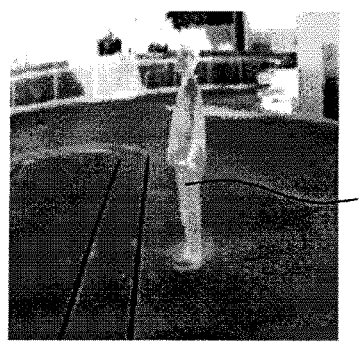
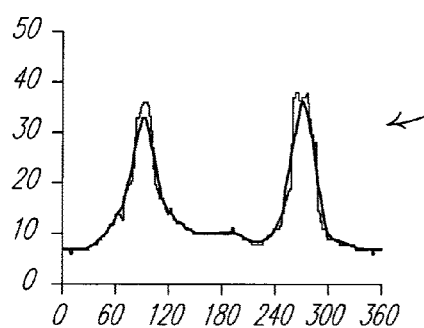
Fig. 37e.

|  | Bicycle | Trash Can | Dog | Vehicle | Pedestrian |
|---|---|---|---|---|---|
| Bicycle | 1.0000 | 0.2603 | −0.1177 | 0.2149 | −0.0037 |
| Trash Can | 0.2603 | 1.000 | −0.6499 | −0.7229 | 0.6999 |
| Dog | −0.1177 | −0.6499 | 1.0000 | 0.6377 | −0.5920 |
| Vehicle | 0.2149 | −0.7229 | 0.6377 | 1.0000 | −0.8028 |
| Pedestrian | −0.0037 | 0.6999 | −0.5920 | −0.8028 | 1.0000 |
*Fig. 37f.*
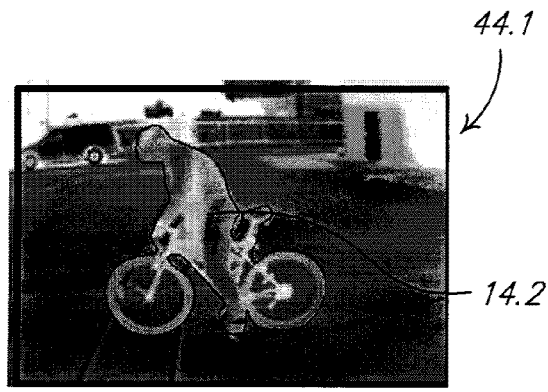
*Fig. 38a.*
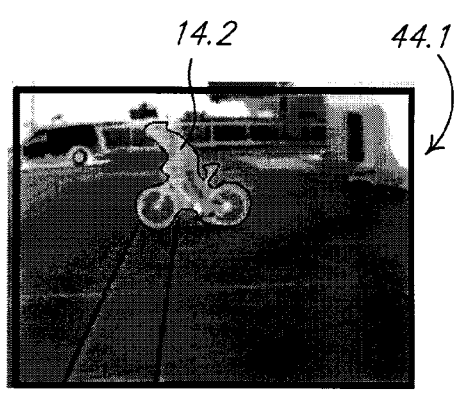
*Fig. 38b.*
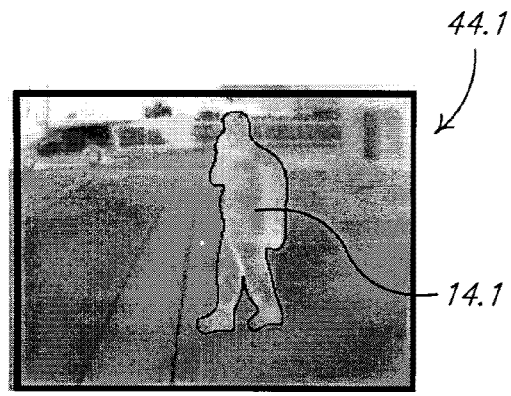
*Fig. 38c.*
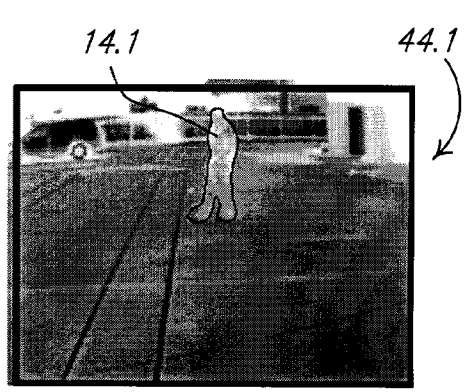
*Fig. 38d.*

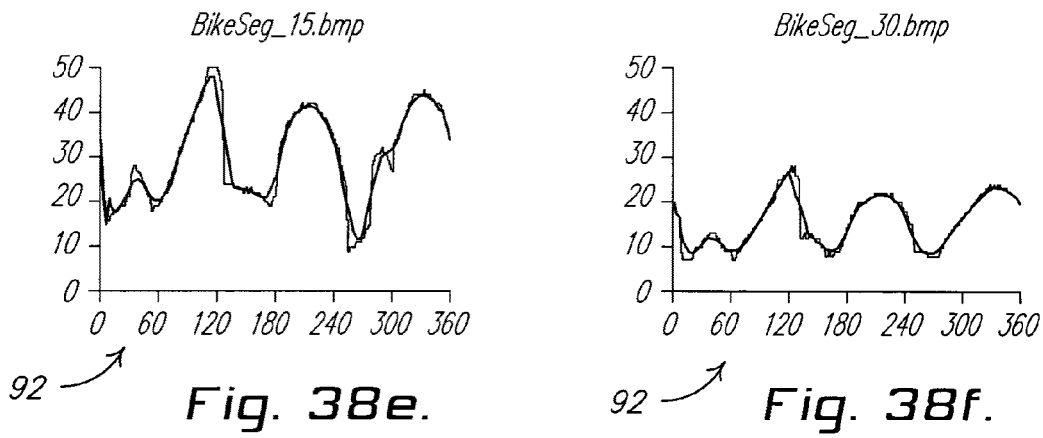
Fig. 38e. Fig. 38f.
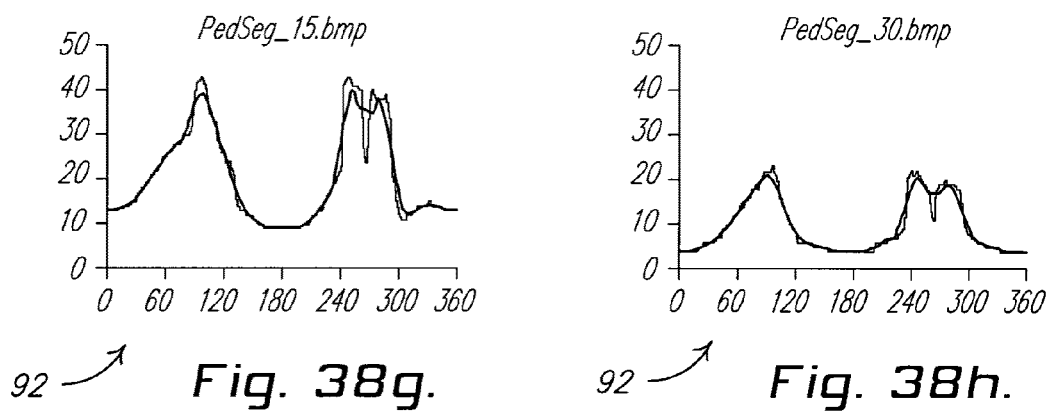
Fig. 38g. Fig. 38h.
Correlation Matrix:
|   | e | f | g | h |
|---|---|---|---|---|
| e | 1.0000 | 0.9799 | -0.1242 | -0.1300 |
| f | 0.9799 | 1.0000 | -0.1986 | -0.2437 |
| g | -0.1242 | -0.1986 | 1.0000 | 0.9501 |
| h | -0.1300 | -0.2437 | 0.9501 | 1.0000 |
Fig. 38i.

Fig. 55.

```
Combined Classification Statistics:
  NetStat [0] = Range (Dist-To-Impact)
  NetStat [1] = Detec (Detection Flag)
  NetStat [2] = Cvehi (Compact Vehicle)
  NetStat [3] = VruB (Bicyclist)
  NetStat [4] = VruP (Pedestrian)
  --- OR ---
Discrete Classification Statistics:
  NetStat [0] = Range (Dist-To-Impact)
  NetStat [1] = Detec (Detection Flag)
  NetStat [2] = Cvehi (Inclusive Network)
  NetStat [3] = Vru3c (Inclusive Network)
  NetStat [4] = Pbike (Exclusive Network)
  NetStat [5] = Pstat (Exclusive Network)
  NetStat [6] = Pwalk (Exclusive Network)
  NetStat [7] = Pbike (Harmonic Network)
  NetStat [8] = Pstat (Harmonic Network)
  NetStat [9] = Pwalk (Harmonic Network)
```

Fig. 56.

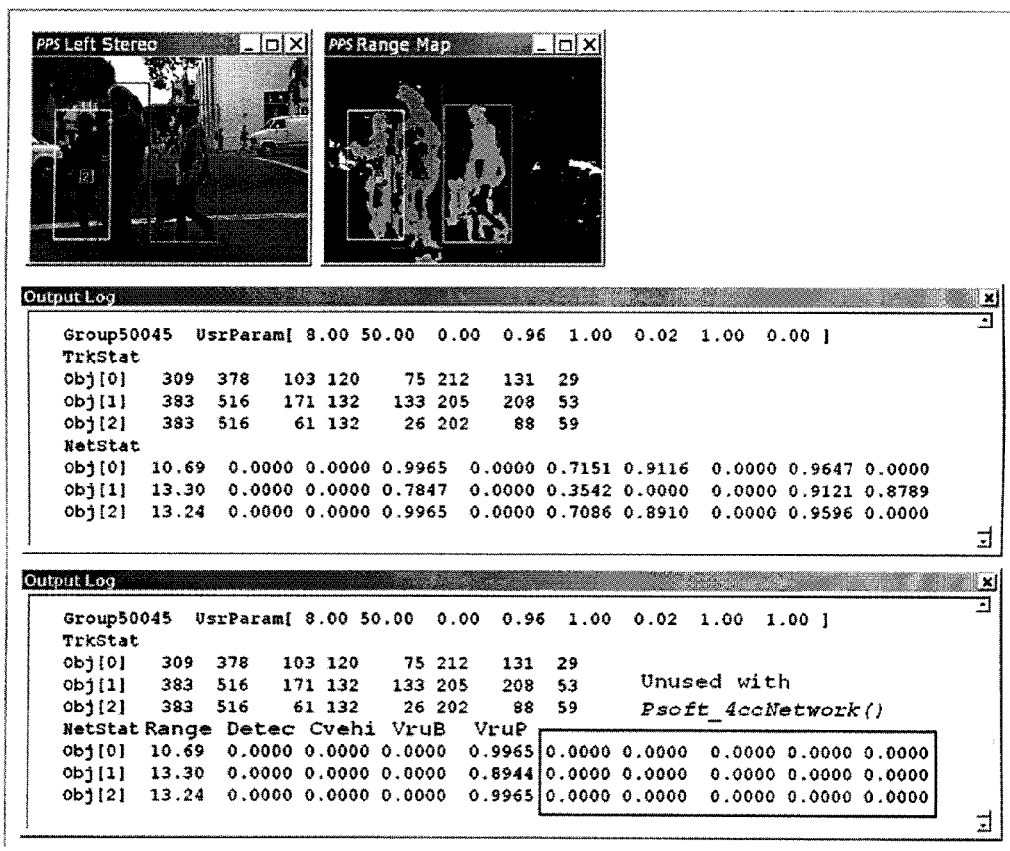

VULNERABLE ROAD USER PROTECTION SYSTEM

CROSS-REFERENCE TO RELATED APPLICATIONS

The instant application is filed under 35 U.S.C. §371 as the U.S. National Phase of International Application No. PCT/US2005/026518 filed on 26 Jul. 2005, which claims the benefit of prior U.S. Provisional Application Ser. No. 60/591,564 filed on Jul. 26, 2004, which is incorporated herein by reference.

BRIEF DESCRIPTION OF THE DRAWINGS

In the accompanying drawings:

FIG. 15 illustrates an array of down range data associated with a stereo image, used by the road surface filter process illustrated in FIG. 14;

FIG. 16 illustrates a range map array, used by the road surface filter process illustrated in FIG. 14;

FIG. 17 illustrates an array of pixel values operated upon by the road surface filter process illustrated in FIG. 14;

FIG. 18a illustrates a grayscale image of a road scene from a left-hand camera of the stereo vision system;

FIG. 18b illustrates a range map generated by a stereo engine for the scene illustrated in FIG. 18a;

FIG. 18c illustrates a modification of the image illustrated in FIG. 18b, modified so as to display substantially only the associated road surface therein;

FIG. 19b illustrates a range map generated by the stereo engine for the scene illustrated in FIG. 19a;

FIG. 22a illustrates an example of a VRU vulnerable area for a vehicle traveling at a first speed;

FIG. 22b illustrates an example of a VRU vulnerable area for a vehicle traveling at a second speed;

FIG. 23 illustrates collision inevitable and collision possible spaces for a turning vehicle;

FIG. 37c illustrates a grayscale image and an associated harmonic profile of a dog object;

FIG. 37d illustrates a grayscale image and an associated harmonic profile of a vehicle object;

FIG. 37e illustrates a grayscale image and an associated harmonic profile of a pedestrian object;

FIG. 37f illustrates cross correlation matrix generated from cross-correlations of the harmonic profiles of FIGS. 37a-e;

FIGS. 38a-i illustrate the range invariance of harmonic profiles;

FIG. 46b illustrates the best-fit rectangle and best-fit ellipse geometric shape descriptors of an attached object pair segmentation image generated from the image illustrated in FIG. 46a;

FIG. 47a illustrates a grayscale image, corresponding to FIG. 46a;

FIG. 47b illustrates the best-fit rectangle and best-fit ellipse geometric shape descriptors of the largest object in the segmentation image generated from the image illustrated in FIG. 47a;

FIG. 55 illustrates combined and discrete classification statistics of a 4-class consolidated network;

FIG. 56 illustrates a visual scene, an associated range map, and associated classification statistics for a particular test sequence;

DESCRIPTION OF EMBODIMENT(S)

Figure 1:
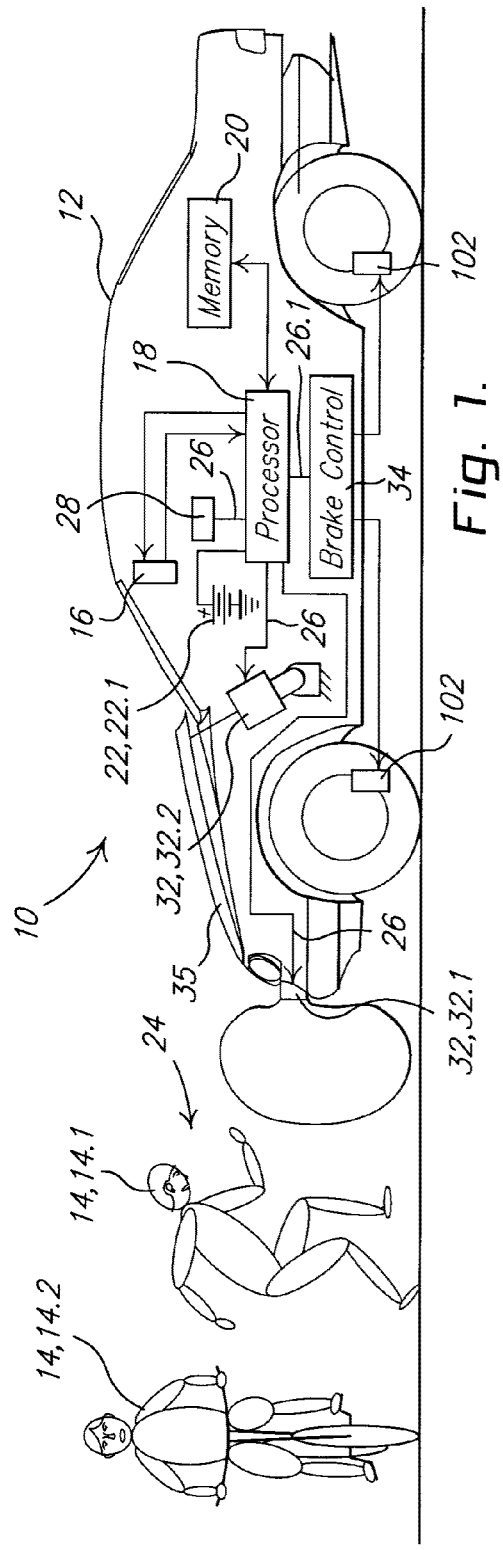
FIG. 1 illustrates an elevation view of a vehicle encountering a plurality of vulnerable road users (VRU), and a block diagram of a vulnerable road user protection system in a deployed state in the vehicle.
Figure 2:
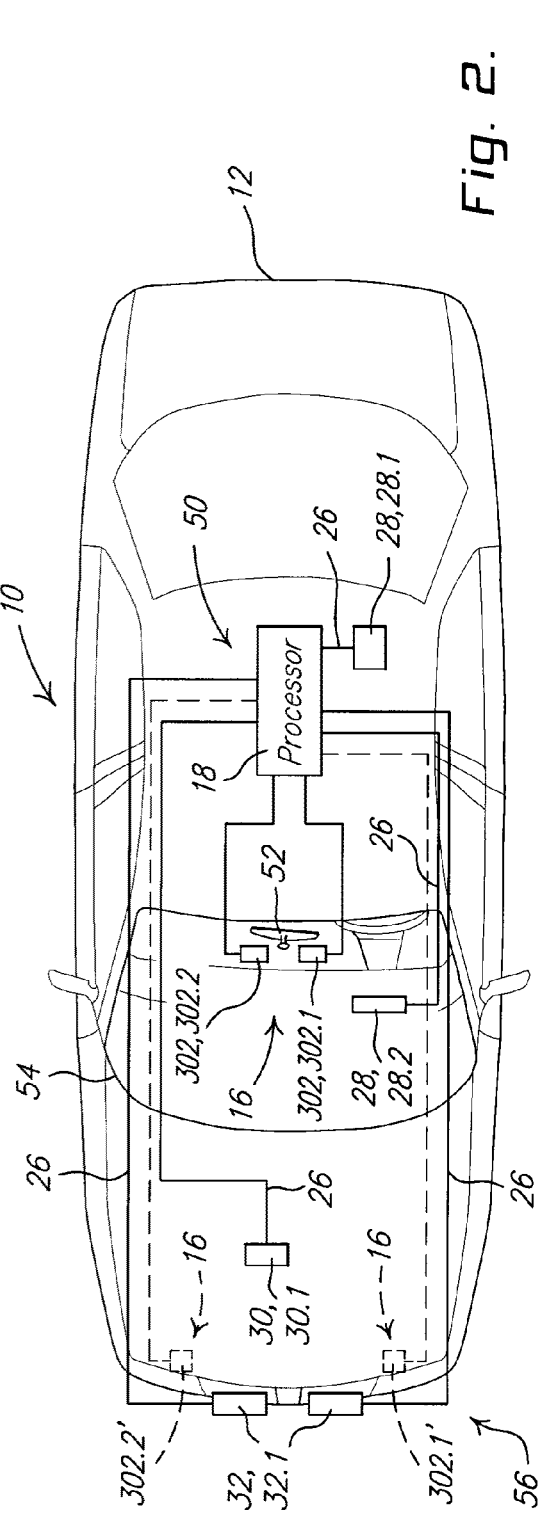
FIG. 2 illustrates a top view of a vehicle and a block diagram of a vulnerable road user protection system thereof.

Referring to FIGS. 1 and 2, a vulnerable road user protection system 10 is incorporated in a vehicle 12 so as to provide for protecting a vulnerable road user 14 (hereinafter "VRU 14") from a collision with the vehicle 12. Examples of VRUs 14 include a pedestrian 14.1 and a pedal cyclist 14.2. For example, in the European Union 7,000 pedestrians 14.1 and 2,000 pedal cyclists 14.2 are killed every year, while several hundred thousand are injured. Comparable figures in the United States (for the year 1998) were 5,220 pedestrian 14.1 fatalities (accounting for 13 percent of all traffic deaths) and 69,000 reported VRU 14 injuries. This ratio of pedestrian 14.1 fatalities to all traffic deaths varies considerably from country to country, with the United States lowest at 13% and the United Kingdom and Japan the highest at 28%. Accordingly, there exists a need for the vulnerable road user protection system 10 to provide for a reduction of these deaths and injuries and the associated societal costs.

The vulnerable road user protection system 10 incorporates a stereo vision system 16 operatively coupled to a processor 18 incorporating or operatively coupled to a memory 20, and powered by a source of power 22, e.g. a vehicle battery 22.1. Responsive to information from the visual scene 24 within the field of view of the stereo vision system 16, the processor 18 generates one or more signals 26 to one or more associated driver warning devices 28, VRU warning devices 30, or VRU protective devices 32 so as to provide for protecting one or more VRUs 14 from a possible collision with the vehicle 12 by one or more of the following ways: 1) by alerting the driver 33 with an audible or visual warning signal from a audible warning device 28.1 or a visual display or lamp 28.2 sufficient lead time so that the driver 33 can take evasive action to avoid a collision; 2) by alerting the VRU 14 with an audible or visual warning signal—e.g. by sounding a vehicle horn 30.1 or flashing the headlights 30.2—so that the VRU 14 can stop or take evasive action; 3) by generating a signal 26.1 to a brake control system 34 so as to provide for automatically braking the vehicle 12 if a collision with a VRU 14 becomes likely, or 4) by deploying one or more VRU protective devices 32 —for example, an external air bag 32.1 or a hood actuator 32.2 in advance of a collision if a collision becomes inevitable. For example, the hood actuator 32.2 cooperates with a relatively compliant hood 35 so as to provide for increasing the distance over which energy from an impacting VRU 14 may be absorbed by the hood 35. In one embodiment, the hood actuator 32.2 comprises a pyrotechnic actuator, and in another embodiment, the hood actuator 32.2 comprises a hydraulic or electric actuator, the latter requiring relatively more time to actuate—and therefore a relatively sooner detection of a need to be actuated—than the latter, but beneficially being reversible.

Figure 3:
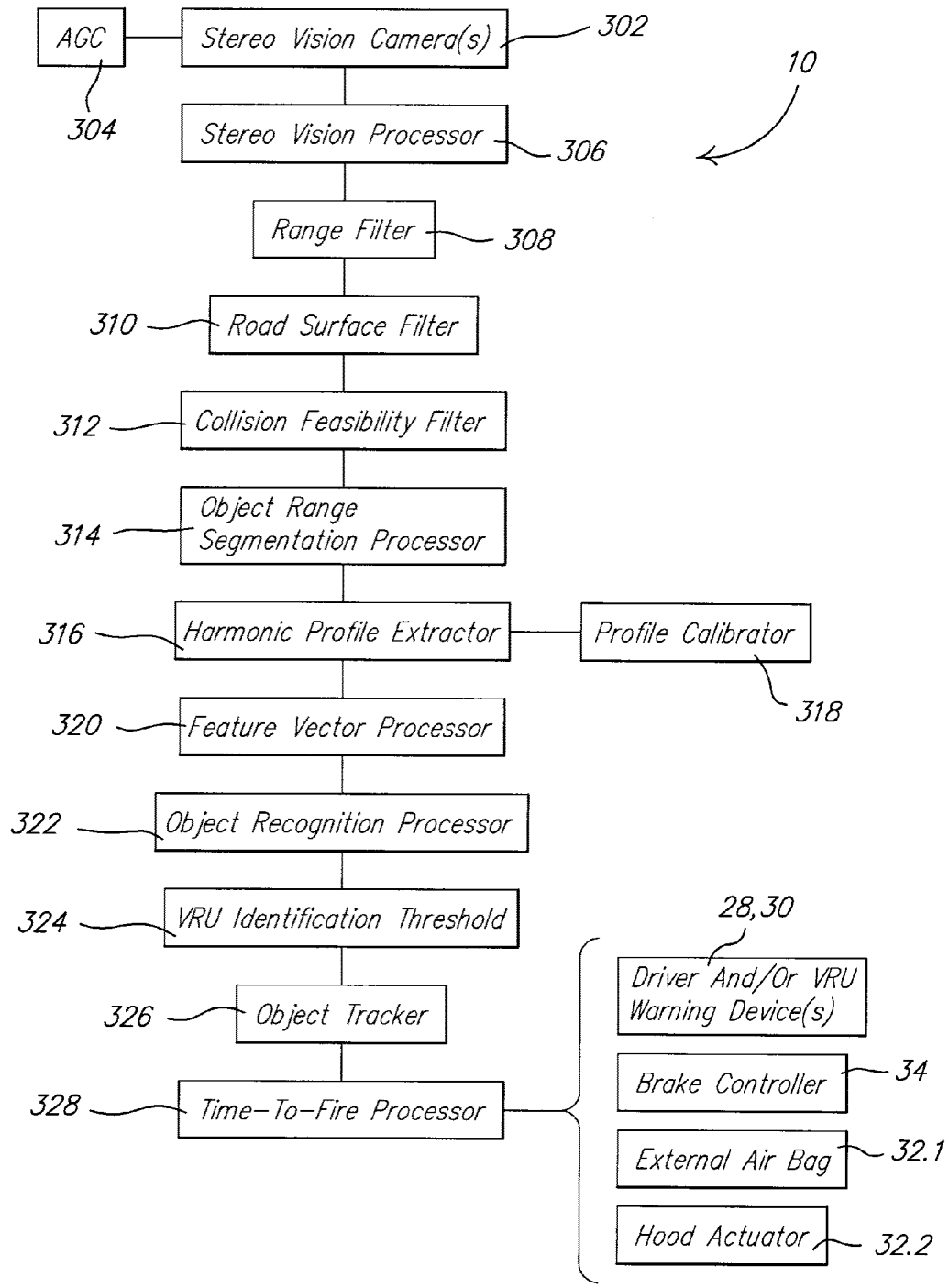
FIG. 3 illustrates a block diagram of a vulnerable road user protection system.
Figure 4:
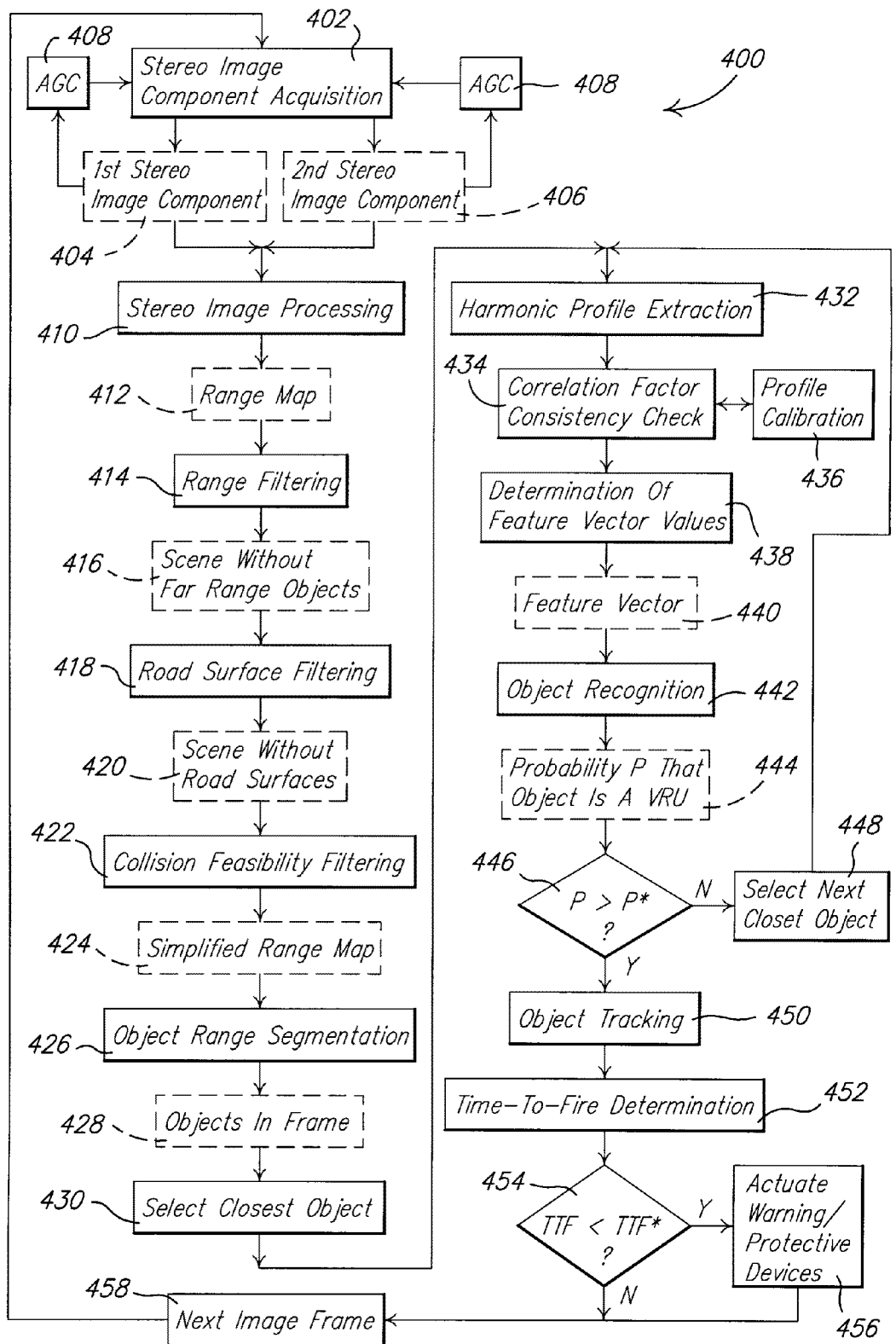
FIG. 4 illustrates a flow chart of a vulnerable road user protection process of the vulnerable road user protection system.

A block diagram of the vulnerable road user protection system 10 is illustrated in FIG. 3, and an associated vulnerable road user protection process 400 is illustrated in FIG. 4. The elements of the vulnerable road user protection system 10 and the operation of the associated vulnerable road user protection process 400 illustrated in FIGS. 3 and 4 will now be described element by element, and step by step, with reference to FIGS. 3 and 4 and other drawing figures as indicated.

The vulnerable road user protection system 10 uses three-dimensional object recognition to identify a VRU 14. One approach to three-dimensional object recognition is to analyze a monocular intensity image. The position and orientation of an object are estimated by matching two-dimensional features (extracted from the image) to a model of the object. However, a combinatorial problem arises if the object and/or the scene are complex. Another approach to three-dimensional object recognition is to use separately sensed range information to determine three-dimensional features of the object, however, special devices, such as a laser range finder, are necessary to obtain direct range data of a scene. Yet another approach to three-dimensional object recognition is to reconstruct three-dimensional information directly from stereo intensity images acquired by the stereo vision system 16. Cameras and computers have crossed the price/power threshold such that inexpensive stereo and multi-baseline vision systems are commercially feasible and have the potential to be the default infrastructure for computer vision applications.

Figure 5A:
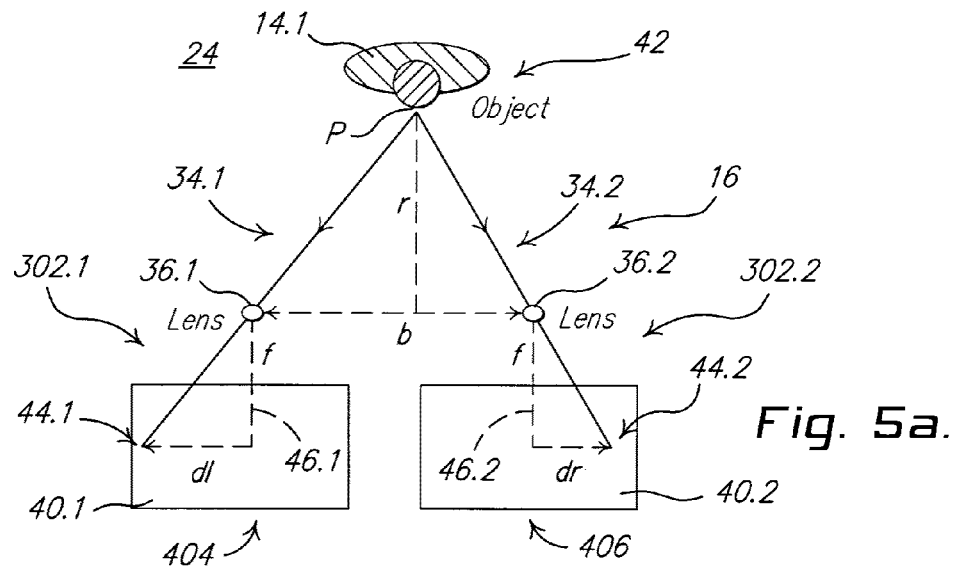
FIG. 5a illustrates a geometry of a stereo vision system.
Figure 6:
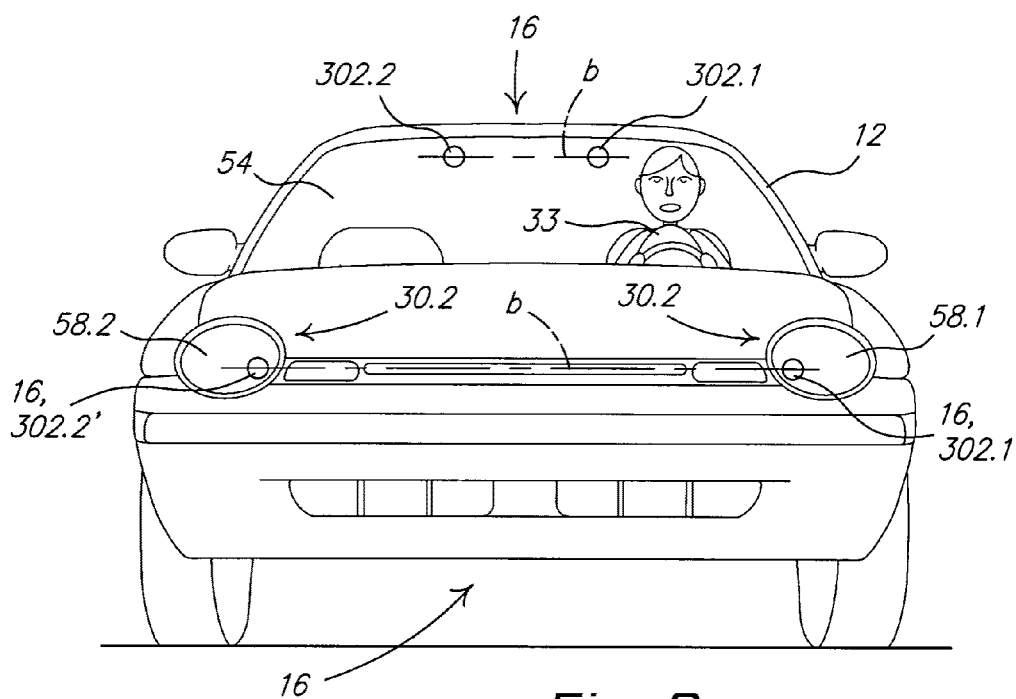
FIG. 6 illustrates a front view of a vehicle and various stereo vision camera embodiments of a stereo vision system of an associated vulnerable road user protection system.

Referring to FIGS. 3, 4 and 5a, in one embodiment, the stereo vision system 16 incorporates at least one stereo vision camera 302 that, in step (402), provides for acquiring first 404 and second 406 stereo image components, each of which is displaced from one another by a baseline b distance that separates the associated first 34.1 and second 34.2 viewpoints. For example, as illustrated in FIGS. 2, 5a and 6, first 302.1 and second 302.2 stereo vision cameras having associated first 36.1 and second 36.2 lenses, each having a focal length f, are displaced from one another such that the optic axes of the first 36.1 and second 36.2 lenses are separated by the baseline b. Each stereo vision camera 302 is modeled as a pinhole camera 38, and the first 404 and second 406 stereo image components are electronically recorded at the corresponding coplanar focal planes 40.1, 40.2 of the first 36.1 and second 36.2 lenses. For example, the first 302.1 and second 302.2 stereo vision cameras may comprise wide dynamic range electronic cameras that incorporate focal plane CCD (charge coupled device) arrays and associated electronic memory and signal processing circuitry. For a given object 42 located a range r distance from the first 36.1 and second 36.2 lenses, the associated first 404 and second 406 stereo image components are taken from associated different first 34.1 and second 34.2 viewpoints. For a given point P on the object 42, the first 44.1 and second 44.2 images of that point P are offset from the first 46.1 and second 46.2 image centerlines of the associated first 404 and second 406 stereo image components by a first offset dl for the first stereo image component 404 (e.g. left image), and a second offset dr for the second stereo image component 406 (e.g. right image), wherein the first dl and second dr offsets are in a plane containing the baseline b and the point P and are in opposite directions relative to the first 46.1 and second 46.2 image centerlines. The difference between the first dl and second dr offsets is called the disparity d, and is directly related to the range r of the object 42 in accordance with the following equation:

$$r = b \cdot f / d, \text{ where } d = dl - dr$$

Figure 5B:
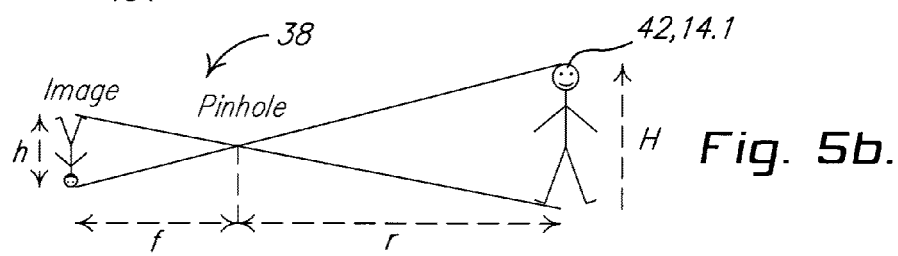
FIG. 5b illustrates an imaging-forming geometry of a pinhole camera.

Referring to FIG. 5b, the height H of the object 42 can be derived from the height h of the object image 48 based on the assumption of a pinhole camera 38 and the associated image forming geometry.

Referring to FIGS. 2 and 6, in one embodiment, the first 302.1 and second 302.2 stereo vision cameras are located along a substantially horizontal baseline b within the passenger compartment 50 of the vehicle 12, e.g. in front of a rear view mirror 52, so as to view the visual scene 24 through the windshield 54 of the vehicle 12. In another embodiment, the first 302.1' and second 302.2' stereo vision cameras are located at the front 56 of the vehicle 12 along a substantially horizontal baseline b, for example, within or proximate to the left 58.1 and right 58.2 headlight lenses, respectively.

Figure 7:
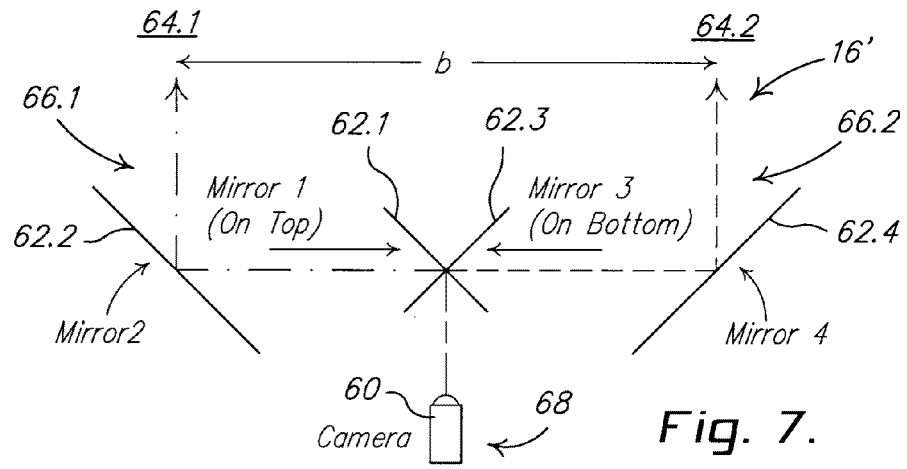
FIG. 7 illustrates a single-camera stereo vision system.

Referring to FIG. 7, in yet another embodiment, a stereo vision system 16' incorporates a single camera 60 that cooperates with a plurality of flat mirrors 62.1, 62.2, 62.3, 62.3, e.g. first surface mirrors, that are adapted to provide for first 64.1 and second 64.2 viewpoints that are vertically split with respect to one another, wherein an associated upper portion of the field of view of the single camera 60 looks out of a first stereo aperture 66.1 and an associated lower part of the field of view of the single camera 60 looks out of a second stereo aperture 66.2, wherein the first 66.1 and second 66.2 stereo apertures are separated by a baseline b distance. If the detector 68 of the single camera 60 is square, then each corresponding field of view would have a horizontal-to-vertical aspect ratio of approximately two to one, which is beneficial for the vulnerable road user protection system 10, wherein the necessary field of view is much greater in the horizontal direction than in the vertical direction. In the embodiment illustrated in FIG. 7, the field of view of the single camera 60 is divided into the upper and lower fields of view by a first mirror 62.1 and a third mirror 62.3, respectively, that are substantially perpendicular to one another and at an angle of 45 degrees to the baseline b. The first mirror 62.1 is located above the third mirror 62.3 and cooperates with a relatively larger left-most second mirror 62.2 so that the upper field of view of the single camera 60 provides a first stereo image component 404 from the first viewpoint 64.1 (i.e. left viewpoint). The third mirror 62.3 cooperates with a relatively larger right-most fourth mirror 62.4 so that the lower field of view of the single camera 60 provides a second stereo image component 406 from the second viewpoint 64.2 (i.e. right viewpoint).

Figure 8:
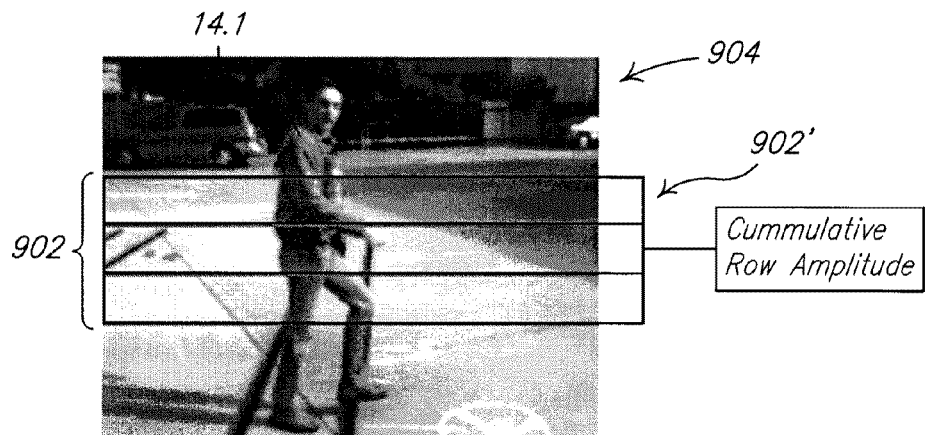
FIG. 8 illustrates elements of an automatic gain control process.

Referring to FIG. 3, an automatic gain control (AGC) circuit 304 is provided to maintain the output level of each stereo vision camera 302 relatively constant over the complete range of anticipated scenarios, which, for example, can vary from a relatively high light level resulting the sun in the field of the stereo vision camera 302 to a relatively low light level when driving down a country road on a moonless night, the most significant adverse consequence being a loss of information that occurs when a significant number of the camera pixels reach saturation, which can occur on very bright days or when the stereo vision camera 302 is looking directly at the sun. Referring to FIGS. 4 and 8, the gain of each stereo vision camera 302 is controlled by an AGC process in step (408) by monitoring the intensity of a subset 902 of the image 904, e.g. three to four pixel rows, near the center of the image 904, and controlling the intensity of the entire image 904 responsive thereto. For example, in one embodiment, the intensity of the entire image 904 is controlled responsive to a cumulative amplitude of the subset pixel rows 902' proximate to the center of the image 904. This approach is beneficial in 1) reducing the computational burden associated with the AGC process (408), 2) providing for optimizing the intensity in a central portion of the image 904, which is a region in which a VRU 14 would most likely be located, and 3) reducing the impact of the sun within the field of view of the stereo vision camera 302 because the sun would typically involve an upper portion of the image 904. The signal level of a particular pixel in either of the first 404 or second 406 stereo image components is dependent upon the exposure time of the associated first 302.1 or second 302.2 stereo vision camera, and upon a gain by which the signal of the corresponding sensing element in the associated first 302.1 or second 302.2 stereo vision camera is amplified so as to generate the associated pixel value of the first 404 or second 406 stereo image component. In one embodiment, the average pixel amplitude is calculated for the pixels in the subset pixel rows 902' for each of the first 404 and second 406 stereo image components. If this average pixel amplitude is greater than a predetermined maximum average amplitude threshold, or less than a predetermined minimum amplitude threshold, then either the exposure time or the associated gain for the associated first 302.1 or second 302.2 stereo vision camera is adjusted so as to provide for controlling the average pixel amplitude to be between the associated minimum and maximum threshold levels, so as to prevent a saturation of either of the first 302.1 or second 302.2 stereo vision cameras.

Figure 9:
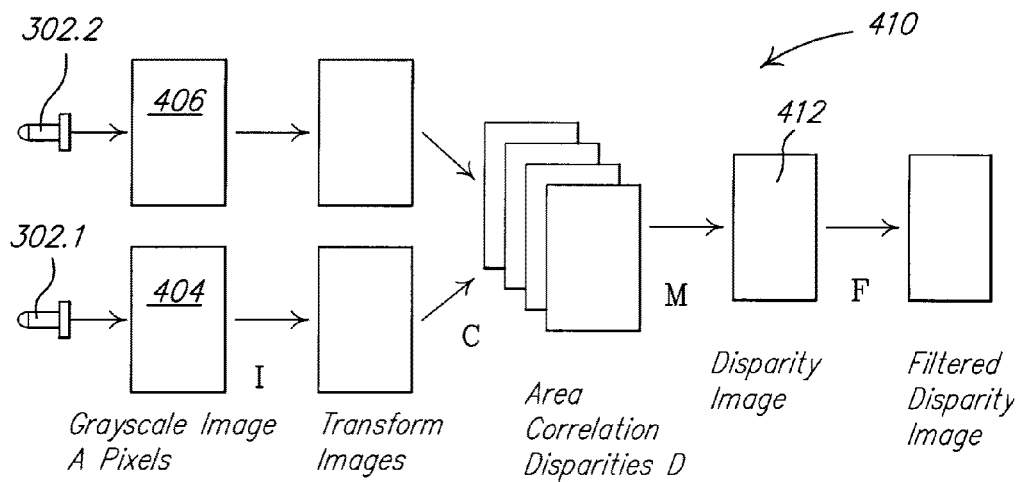
FIG. 9 illustrates a block diagram of an area correlation diagram.

Referring to FIGS. 3, 4 and 9, in a stereo image processing process of step (410), a stereo vision processor 306 provides for generating a range map image 412 (also known as a range image or disparity image) of the visual scene 24 from the individual grayscale images from the stereo vision camera(s) 302 for each of the first 34.1 and second 34.2 viewpoints. The range map image 412 provides for each pixel, the range r from the stereo vision system 16 to the object. Alternatively or additionally, the range map image 412 may provide a vector of associated components, e.g. down-range (Z), cross-range (X) and height (Y) of the object relative to an associated reference coordinate system fixed to the vehicle 12. In another embodiment, in addition to the range r from the stereo vision system 16 to the object, the stereo image processing process 410 could also be adapted to provide the azimuth and elevation angles of the object relative to the stereo vision system 16. For example, the stereo vision processor 306 may operate in accordance with a system and method disclosed in U.S. Pat. No. 6,456,737, which is incorporated herein by reference. Stereo imaging overcomes many limitations associated with monocular vision systems by recovering an object's real-world position through the disparity d between left and right image pairs, i.e. first 404 and second 406 stereo image components, and relatively simple trigonometric calculations.

Referring to FIG. 9, in an associated area correlation algorithm of the stereo vision processor 306, corresponding areas in the first 404 and second 406 stereo image components are matched so as to provide for determining the disparity d therebetween and the corresponding range r thereof. The amount of search for a matching area is reduced by rectifying the input images (a) so that the associated epipolar lines lie along associated scan lines of the associated first 302.1 and second 302.2 stereo vision cameras. This can be done by calibrating the first 302.1 and second 302.2 stereo vision cameras and warping the associated input images (I) to remove lens distortions and alignment offsets between the first 302.1 and second 302.2 stereo vision cameras. Given the rectified images (C), searching for a match can be limited to a particular number of offsets (D) along the baseline direction, wherein the maximum number is given by the minimum and maximum ranges r of interest. In implementations with multiple processors or distributed computation, algorithm operations can be performed in a pipelined fashion to increase throughput. The largest computational cost is in the correlation and minimum-finding operations, which are proportional to the number of pixels times the number of disparities. The algorithm can use a sliding sums method to take advantage of redundancy in computing area sums, so that the window size used for area correlation does not substantially affect the associated computational cost. The resultant disparity map (M) can be further reduced in complexity by removing such extraneous objects such as road surface returns using a road surface filter (F).

The range resolution ($\Delta r$) of the of the stereo image processing process (410) is a function of the range r in accordance with the following equation:

$$\Delta r = (r^2/(bf)) \cdot \Delta d$$

The range resolution ($\Delta r$) is the smallest change in range r that is discernible for a given stereo geometry, corresponding to a change $\Delta d$ in disparity (i.e. disparity resolution $\Delta d$). The range resolution ($\Delta r$) increases with the square of the range r, and is inversely related to the baseline b and focal length f, so that range resolution ($\Delta r$) is improved (decreased) with increasing baseline b and focal length f distances, and with decreasing pixel sizes which provide for improved (decreased) disparity resolution $\Delta d$.

Figure 10A:
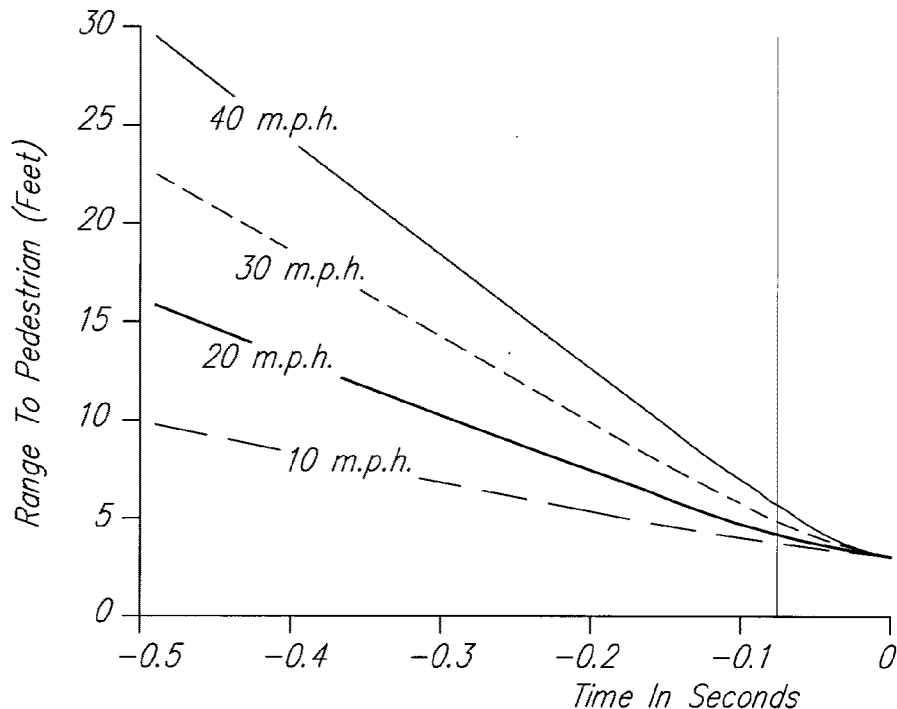
FIG. 10a illustrates a plot of object range as a function of time to impact for various vehicle velocities, for a worst-case scenario.
Figure 10B:
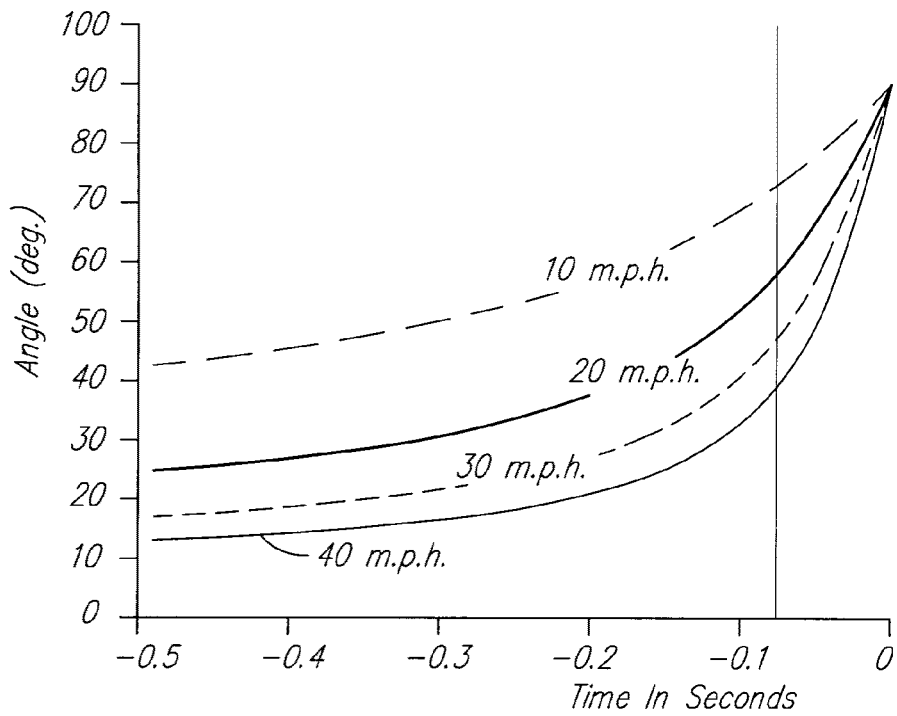
FIG. 10b illustrates a plot of angle to an object as a function of time to impact for various vehicle velocities, for a worst-case scenario.

Referring to FIGS. 10a and 10b, in order to define the boundary parameters for the stereo vision system 16 in terms of range r and field of view requirements, a simple VRU 14/vehicle 12 kinematics program was implemented in MATLAB. A worst-case scenario in terms of encounter geometry was chosen in order to bound the required parameters. This scenario consists of a VRU 14 walking/jogging at a steady speed of 5 mph orthogonal to the velocity vector of the vehicle 12 from the right of the vehicle 12 towards the nearest bumper edge (representing over 90% of all vehicle 12/pedestrian 14.1 encounters) and ending at a position such that the point of impact is the front right hand side of the hood 35 (a worst case scenario, which could also have been from the left of the vehicle 12 ending at a position such that the point of impact was the front left hand side of the hood 35). These parameters yield maximum range and angle as a function of time. Also included in the time histories of these parameters is the point, at which a bumper-mounted external air bag 32.1 initiation must occur. Examination of these preliminary results indicates that if the maximum range at which the proposed system is capable of detecting and recognizing a VRU 14 is 12 feet, sufficient time exists to deploy the external airbag(s) 32.1 or other VRU protective devices 32 at vehicle speeds well in excess of 40 m.p.h. FIGS. 10a and 10b provides a graphical summary of the parametric analysis—from the vantage of the vehicle bumper—bounding the probable encounters for the short-range encounters for which scant time exists for detection and decision-making.

Referring to FIG. 10a, a VRU protective device 32 typically requires time to deploy, thereby necessitating an associated deployment decision sufficiently before an impact occurs, and therefore at a sufficient range r from the VRU 14 prior to impact at a given vehicle velocity, so that the VRU protective device 32 can be deployed prior to impact. Different VRU protective devices 32 having different deployment times will have different associated ranges at which deployment is beneficially commenced. With typical human neuromuscular reaction times of 0.75 to 1.5 seconds, under the above conditions, it is virtually assured that an impact encounter will occur, thereby necessitating automatic deployment of one or more VRU protective devices 32.

Referring to FIG. 10b, the angle requirements provide for defining the camera field of view sufficient to cover the worst case encounter geometry. A relatively wide angle requirement may lead to optical distortion that may not be compensatable in the stereo system, and would result in a relatively wider horizontal field of view resulting in an object of a given size and range spanning relatively fewer pixels. Generally, the faster the velocity of the vehicle 12, the narrower the associated angle requirement.

Objects reflect some portion of the ambient light dependent on their reflectivity, so that a visible/near IR imager can provide a grayscale image of the visual scene 24. Unfortunately, raw grayscale image data is difficult to process and challenging to use in a real time recognition/discrimination system. Alternatively, image intensity histogram data may be used which has sufficiently high information content with associated relatively low image processing requirements. The image intensity histogram is a representation of the number of pixels corresponding to any given intensity level.

However, an intensity distribution alone is not sufficient to adequately discriminate between VRUs 14 and other objects, because a measure of the true size and distance of the object is also necessary. The stereo vision camera 302 is inherently an angle sensor, wherein each pixel represents an instantaneous angular field of view (IFOV). The textural distribution of an object is invariant with respect to range r distance, but the size increases with decreasing range r. In histogram space, the number of pixels is related to the size of the object. Accordingly, if there are enough pixels with the proper distribution of intensity, and if the range information from the stereo vision system 16 indicates that the object is within one of the designated range gates, then a potential VRU 14 will have been detected within a collision range.

Figure 11:
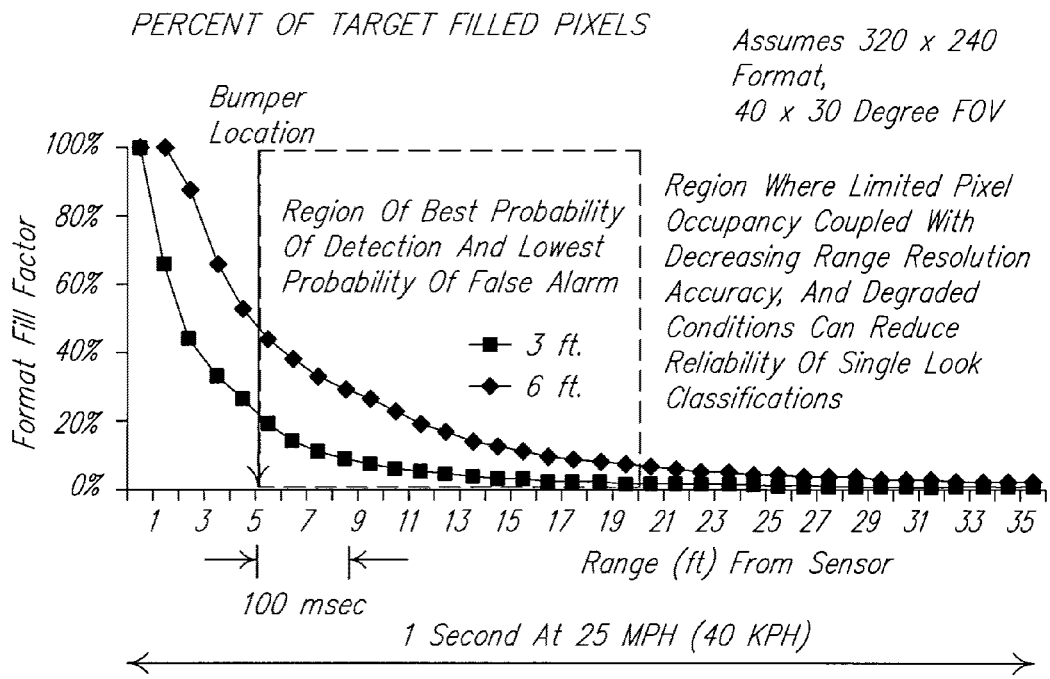
FIG. 11 illustrates a plot of a focal plane area fill factor as a function of range from the associated vision sensor for two different pedestrian heights.

Referring to FIG. 11, the percentage of pixels that are filled by a particular object, i.e. a six foot tall pedestrian 14.1 or a three foot tall pedestrian 14.1, is plotted as a function of the range r distance from the stereo vision system 16 to that pedestrian 14.1, for the stereo vision camera 302 having a 320 by 240 pixel format with a 40 by 30 degree field of view, and located in the passenger compartment 50. The vehicle bumper is approximately five feet in front of the stereo vision camera 302, and the region of best probability of detection and lowest probability of false alarm extends to a range r of about twenty feet from the stereo vision camera 302. If a relatively close range object is detected by the stereo vision system 16 when a person and other objects are in the camera image, the largest number of pixels will represent background or other items, but will have a different set of intensity distributions than those pixels corresponding to the person. The stereo vision system 16 provides range data for each pixel; so that any object—including the background itself—outside the zone of interest can readily be excluded from further discrimination and recognition processing.

Figure 12A:
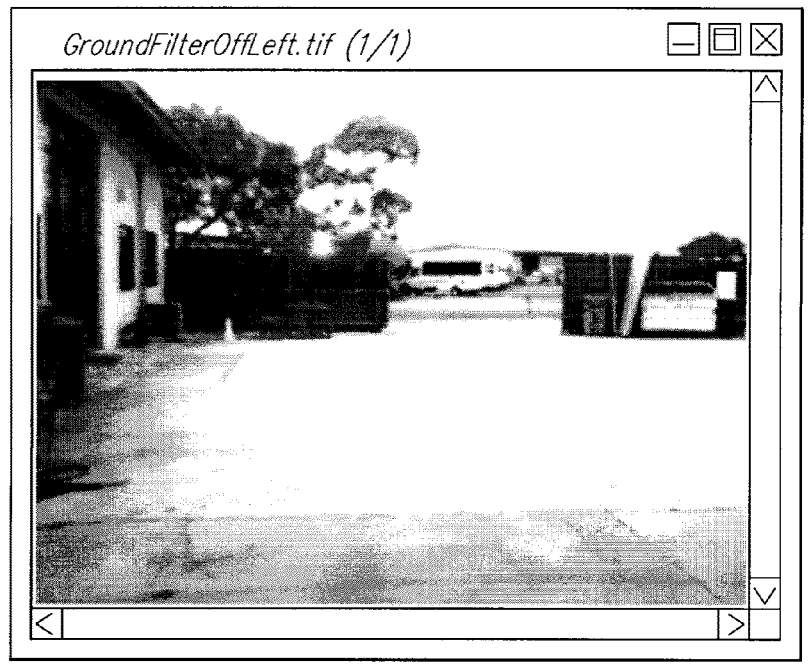
FIG. 12a illustrates an original grayscale image of a scene that includes a road surface.
Figure 12B:
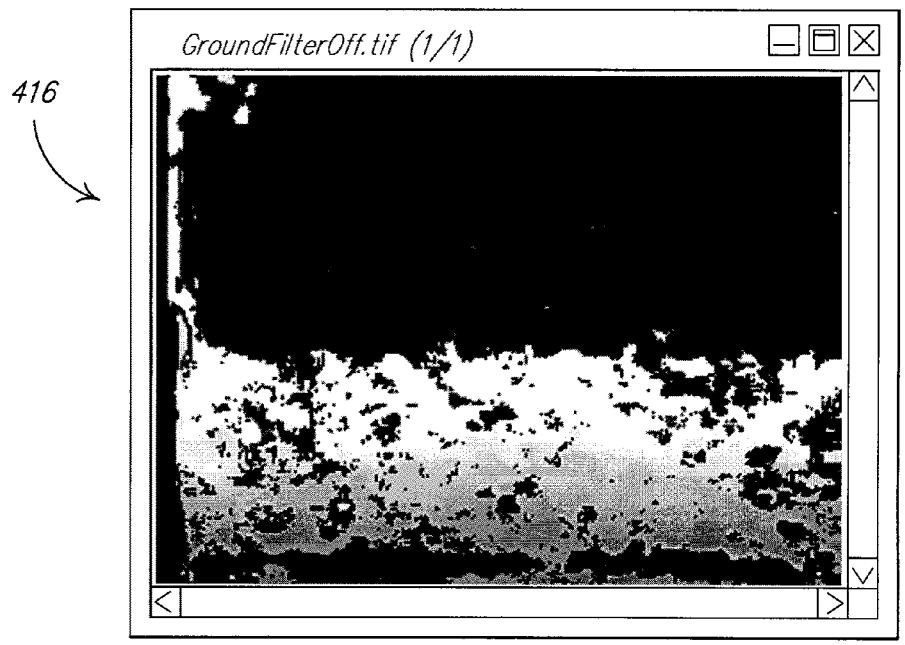
FIG. 12b illustrates a range map corresponding to the image illustrated in FIG. 12a, with far range objects removed by a range filter.

Referring to FIGS. 3 and 4, in accordance with a range filtering process of step (414), a range filter 308 receives the range map image 412 generated by the stereo vision processor 306, and generates a range-filtered image 416 by eliminating objects that are farther than a given maximum distance and closer then a given minimum distance, so as to eliminate most of the background clutter, and thereby provide for simplifying the subsequent process of object recognition. FIG. 12b illustrates an example of a range-filtered image 416 generated by the range filtering process (414) for the grayscale visual scene 24 illustrated in FIG. 12a, wherein the range filter 308 has removed the far range objects from the visual scene 24. For example, in one embodiment, the minimum and maximum distances of the range filter 308 were set to seven and thirty six feet respectively.

Figure 12C:
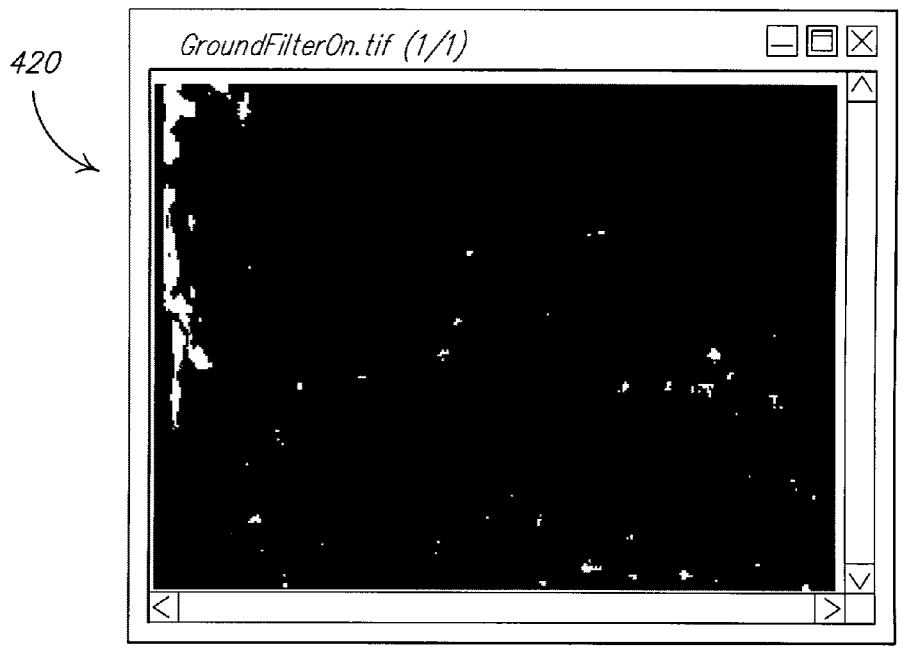
FIG. 12c illustrates a range map corresponding to that of FIG. 12b, wherein the road surface has been filtered out by a road surface filter.

In accordance with a road surface filtering process of step (418), a road surface filter 310 processes the range-filtered image 416 to substantially remove road surface imperfections, painted lines, curbs, etc. which in many cases can produce a sufficient intensity variation that might otherwise generate associated ranging data thereto, which would otherwise complicate the task of segmenting "true" objects in the path of the vehicle 12. The road surface filter 310 removes these "extraneous" objects from the range-filtered image 416 and generates a road-surface-filtered image 420 for subsequent image processing. FIG. 12c illustrates an example of a road-surface-filtered image 420 generated by the road surface filtering process (418) from the range-filtered image 416 illustrated in FIG. 12b for the visual scene 24 illustrated in FIG. 12a, wherein the road surface filter 310 has substantially removed the image of the road surface 70 remaining in and dominating the range-filtered image 416.

In an assumed flat earth configuration, the height of an object with respect to the camera can be readily calculated from the stereo engine 3-D spatial data and compared to the known camera configuration (height and tilt angle). Any pixel with a height less than the measured camera position with respect to the road surface minus some adjustable parameter, say 6 inches, can then be removed. However, this approach is sensitive to a number of uncontrollable and immeasurable factors: the tilt angle and height of the camera with respect to the road surface will change due to heavy braking/acceleration and/or a bumpy road surface, and the assumption of a flat road surface is obviously invalid on inclines/declines and/or banked curves. These factors, particularly for pixels observing the road surface at longer ranges, can make this approach difficult to implement satisfactorily, and may require additional sensors and/or processing to provide for determining the attitude of the vehicle 12 in real time.

Figure 13:
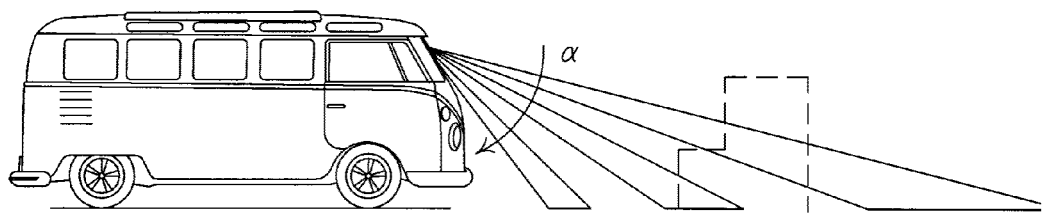
FIG. 13 illustrates a vehicle and three different fields of view corresponding to three corresponding different associated down range bins.

In accordance with another aspect, a road surface filter 310 is adapted to provides for determining and removing the pixels associated with the road surface in the image, without requiring a measurement of the attitude of the vehicle 12 in real time. Referring to FIG. 13, for purposes of illustration, under ideal conditions when the vehicle 12 is traversing a flat road with no objects extending above the road surface (i.e. without the structure illustrated in dashed lines), the down range bin, i.e. the Z-coordinate, corresponding to a road surface return can be readily calculated for each individual pixel within each focal plane array (FPA) column given the camera height, tilt angle and pixel FOV, the latter of which are known with little or no error.

In this ideal case, each range bin associated with each pixel within an FPA column will contain only one return. If an object with a finite vertical height then enters the camera FOV then the down range bins that correspond to the object's down and cross range will contain more than one return: the actual number will depend on both the height of the object and the distance of the object from the camera. Furthermore, if the road banks and/or inclines (within real world constraints) the number of returns per down range bin from the road surface will remain unity, and, errors in the camera tilt angle and height estimates could, in the worst case (e.g. ±5° and ±1 foot) possibly cause some bin counts to change from 1 to 0 or 2.

Accordingly, those pixels that contribute to the bins containing two or fewer counts can be removed from the image so as to eliminate road surface returns from the range map. This technique can be readily extended to the elimination of objects whose vertical extent is, say 6 inches or less, by calculating the number of pixels that would overlay this vertical height as a function of the object's down range distance and adjusting the threshold bin count accordingly.

Figure 14:
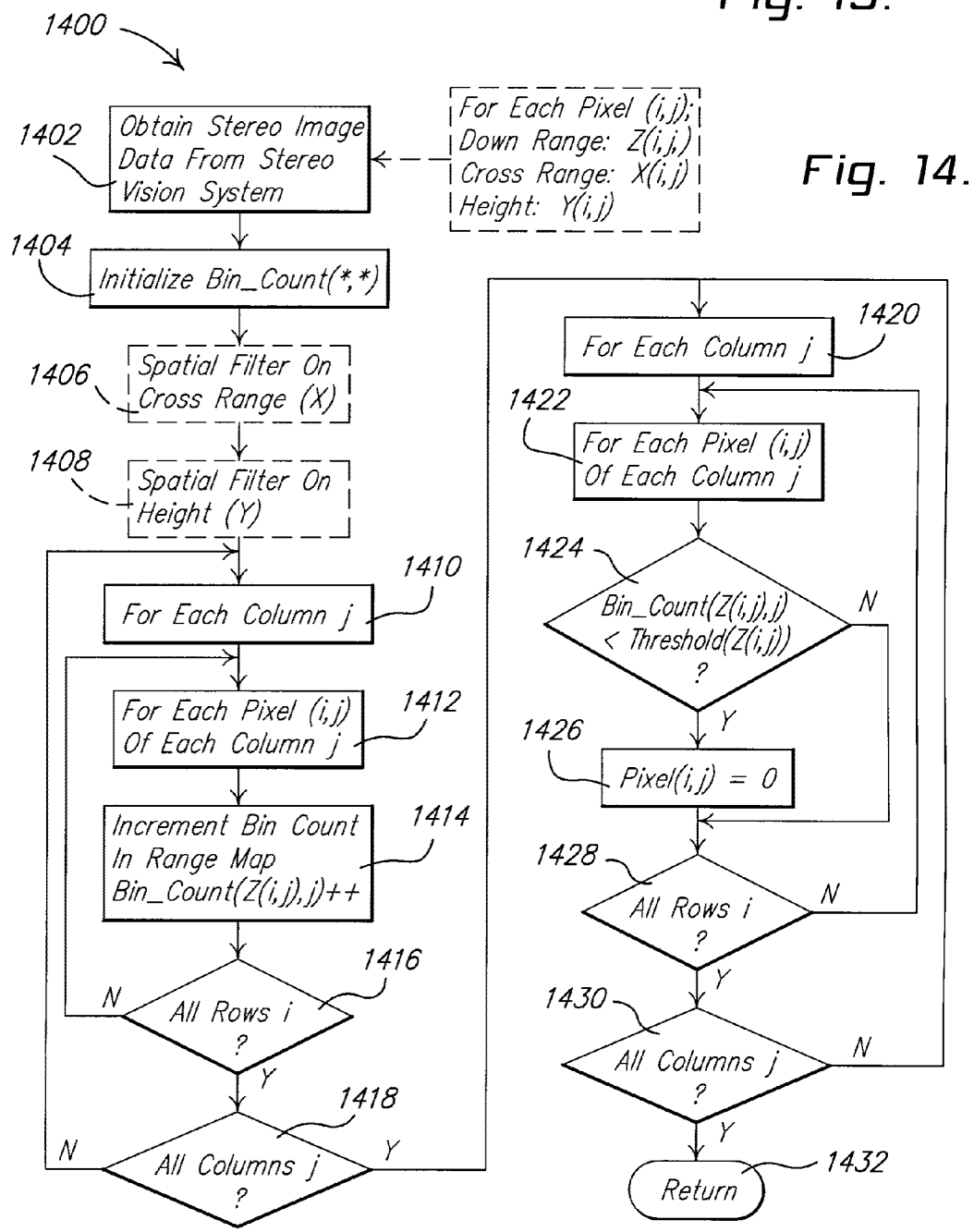
FIG. 14 illustrates a flow chart of a road surface filter process.

Referring to FIG. 14, this road filtering process 1400 commences in step (1402) by obtaining the stereo image data from the stereo vision system, and more particularly, as illustrated in FIG. 15, at least the down range estimate (Z) for each pixel of the image to be processed. The stereo image data, i.e. the down range (Z), cross-range (X) and height (Y) corresponding to each pixel to be analyzed, will be dependent upon the camera height and tile angle, which can be assumed to be respective nominal, predetermined values for the particular vulnerable road user protection system 10. In step 1404, a Bin_Count array is initialized with values of zero. Referring to FIG. 16, for each pixel with a nonzero down range estimate, in optional steps (1406) and (1408), the pixels may first be filtered in cross range (objects outside the collision inevitable zone) and height (objects whose height exceeds some preset value) so as to reduce the associated processing requirements. In steps (1410) through (1418), for each pixel of each column, and then for each column of the image, the associated range bin in the Bin_Count range histogram array is incremented, wherein the range bin corresponds to the down range estimate associated with that pixel. The down range estimates appear to be sufficient for this purpose, as opposed to using non-linear range bins for both down-range and cross-range measurements; based upon extensive testing that has shown that the cross range non-linearity yields little improvement when compared to sorting the data down each FPA column. Referring also to FIG. 17, after all of the pixels have been accounted for in the Bin_Count range histogram array, then, in steps (1420) through (1430), for each pixel of each column, and then for each column of the image, if for a given pixel the value of the associated Bin_Count range histogram element is less than or equal to a threshold value, i.e. Threshold(Z), the latter of which may be range dependent, then the corresponding value of that pixel—associated with a height less than a predetermined threshold, e.g. the road surface—is set to zero. FIGS. 18a-c, illustrate a road surface, a down range map thereof generated by the stereo engine, and an associated modification of the image per the inverse of steps (1424) and (1426) so as to retain only the road surface. Accordingly, if all stereo 3-D spatial data that correspond to the remaining pixels shown in FIG. 18c are removed, the range map will only contain those 3-D elements that exist above the road surface.

Figure 19A:
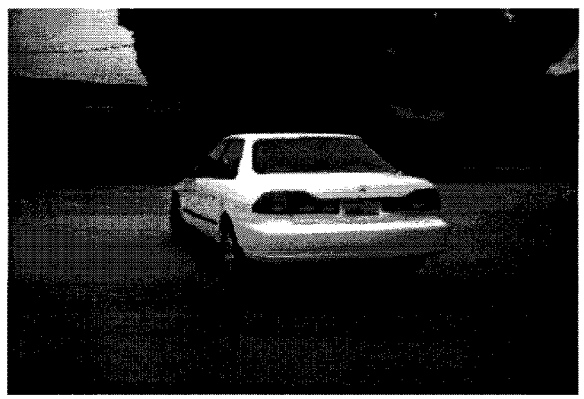
FIG. 19a illustrates a grayscale image of a parked vehicle, from a left-hand camera of the stereo vision system.
Figure 19B:
Figure 19C:
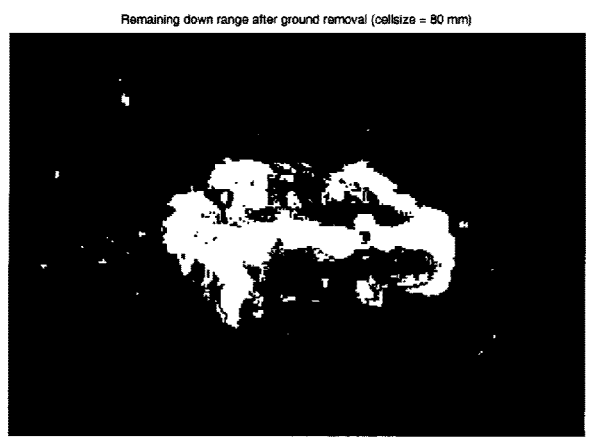
FIG. 19c illustrates a modification of the image illustrated in FIG. 19b, modified so as to display substantially only the associated parked vehicle therein.

Referring to FIGS. 19a-c, the road filtering process 1400 is illustrated in operation on an image of a parked vehicle 12, wherein the original range map is illustrated in FIG. 19b, and the resulting modified range map is illustrated in FIG. 19c.

A Collision Inevitable Space is defined as the space directly in the path of the vehicle 12, which if occupied by object will result in a collision even if maximum braking and steering actions are activated. A Collision Possible Space is defined as that space for which a collision will result if the dynamics of the vehicle 12 remains unchanged, with the object moving at its maximum assumed velocity towards the path of the vehicle 12. A Collision Inevitable Space is a subset of the Collision Possible Space.

In accordance with a collision feasibility filtering process of step (422), a collision feasibility filter 312 substantially removes from the road-surface-filtered image 420 objects for which a collision with the vehicle 12 would not be feasible under given assumptions about the kinematics and dynamics of the vehicle 12 and a potential VRU 14. The collision feasibility filter 312 generates a simplified range map image 424 which includes only those objects for which a collision of with the vehicle 12 would be feasible.

In accordance with one aspect of the collision feasibility filter 310, tracked objects are discriminated responsive to their velocity. The geometry of the Collision Possible Space is dependent upon the velocity of the vehicle 12, and, in one embodiment, objects outside of the Collision Possible Space are not tracked. In another embodiment, the road surface filter 310 also provides for determining the location of a curb, and objects outside of the curb boundary are also not tracked. Pedestrians 14.1 and pedal cyclists 14.2 would typically have a maximum speed of approximately 7 mph and 14 mph respectively, while vehicles 12 may have far higher velocities. The collision feasibility filter 310 removes from the road-surface-filter image 420 any tracked object having a speed greater than the maximum speed of a VRU 14, i.e. 14 mph— which object would necessarily be something other than a VRU 14,—so as to substantially reduce the number of moving objects subject to subsequent VRU detection.

Figure 20:
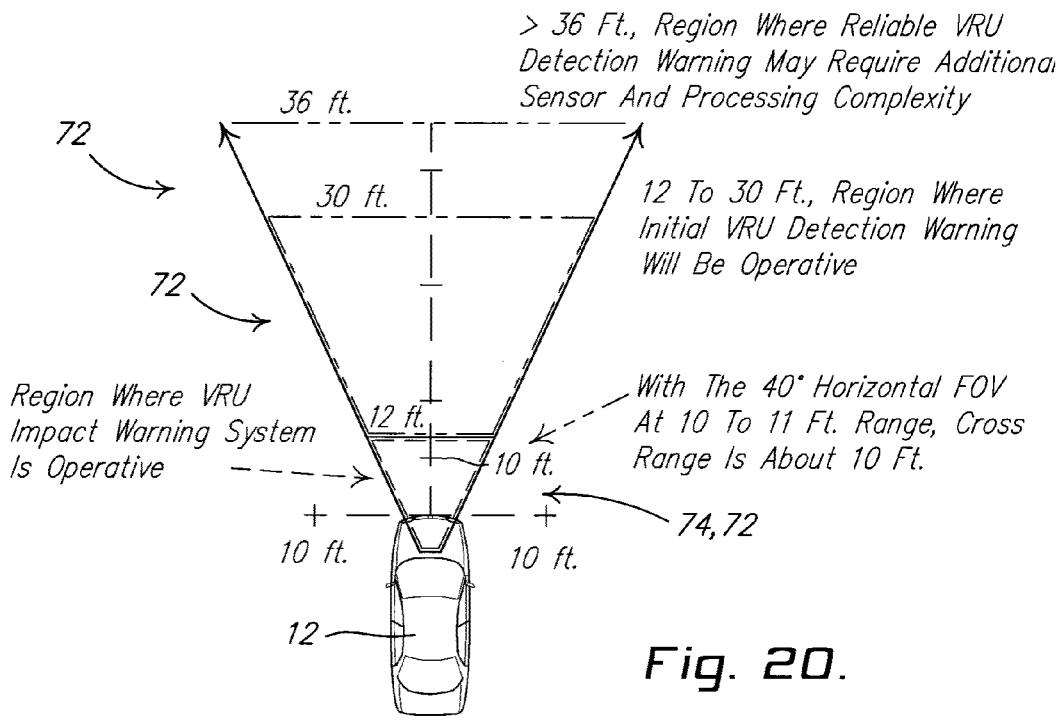
FIG. 20 illustrates a geometry of a vulnerable road user protection system.
Figure 21:
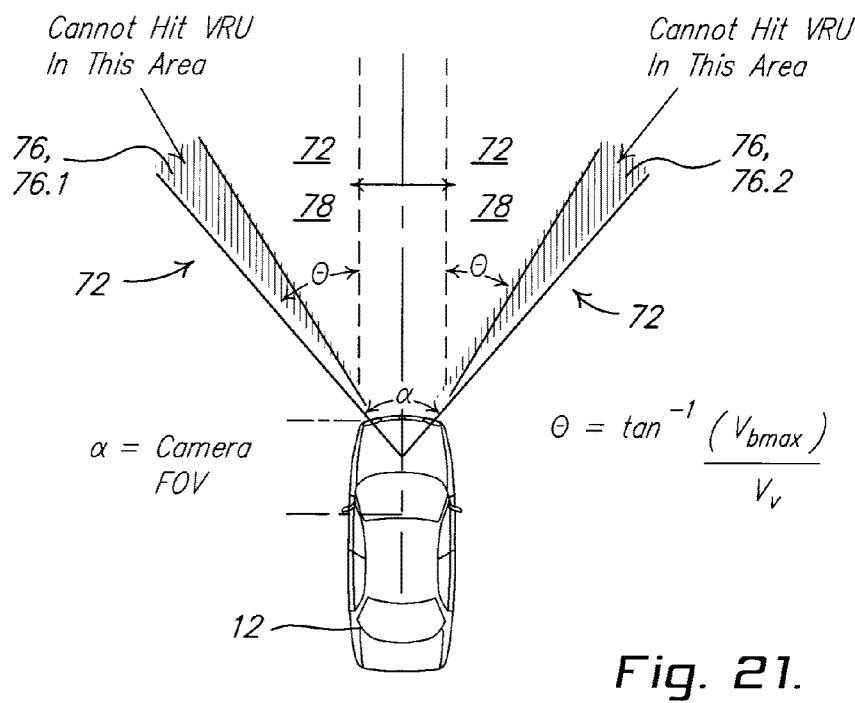
FIG. 21 illustrates collision inevitable and collision possible spaces for a vehicle traveling in a straight line.

In accordance with another aspect of the collision feasibility filter 312, potential VRU 14 targets are removed if there is no prospect for them to collide with the vehicle 12, assuming those VRU 14 targets travel at a speed—up to the maximum postulated speed of a VRU 14—and in a direction that would lead to a collision, if possible, for a given velocity and turn rate of the vehicle 12. Referring to FIG. 20, the detection region 72 of the vulnerable road user protection system 10 is determined by the geometry of the stereo vision system 16, which, for example, in one embodiment, has a 40 degree horizontal field of view. In one embodiment, the vulnerable road user protection system 10 provides for detecting a VRU 14 up to about 36 feet in front of the vehicle 12, and provides for actuating a VRU protective devices 32 for a VRU 14 in an activation region 74 up to about 10 feet in front of the vehicle 12, which distance can be responsive to the velocity of the vehicle 12. Generally, the maximum range of the activation region would depend upon the particular driver warning devices 28, VRU warning device 30 and VRU protective device 32, and the associated activation ranges or times would be specified by either the OEM or a government agency. Referring to FIGS. 21-23, there exist infeasible regions 76 within the detection region 72 for which a VRU 14 located therein could not possibly collide with the vehicle 12. The shape and size of the infeasible regions 76 depends upon the speed and turn rate of the vehicle 12. FIG. 21 illustrates a vehicle 12 traveling along a straight line, for which the associated infeasible regions 76 are wedge-shaped left-right symmetric infeasible regions 76.1, 76.2 at the left and right edges of the detection region 72. The portion of the detection region 72 between the infeasible regions 76 is referred to as a field of interest 78, within which a VRU 14 would need to be discriminated. Referring to FIGS. 22a and 22b, for increasing vehicle speed, the width of the field of interest 78.1 decreases, and the widths of the infeasible regions 76.1, 76.2 increase. Referring to FIG. 23, for a turning vehicle 12, the associated infeasible regions 76.3, 76.4 and the associated field of interest 78.2 are shaped according to the projected path of the vehicle 12.

In accordance with an object range segmentation process of step (426), an object range segmentation processor 314 separates and isolates neighboring objects (stationary or in motion) from one another responsive to differential range information from the simplified range map image 424.

Figure 24:
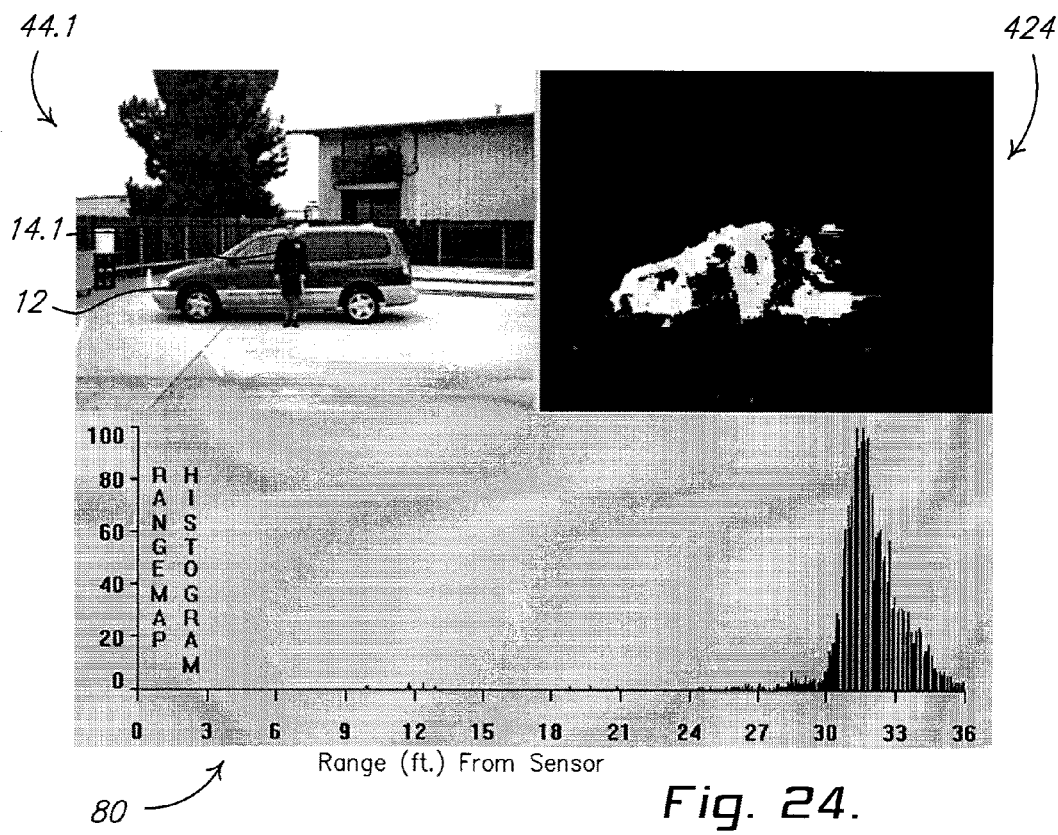
FIG. 24 illustrates a result of an object range segmentation process for a VRU near a stationary vehicle.
Figure 25:
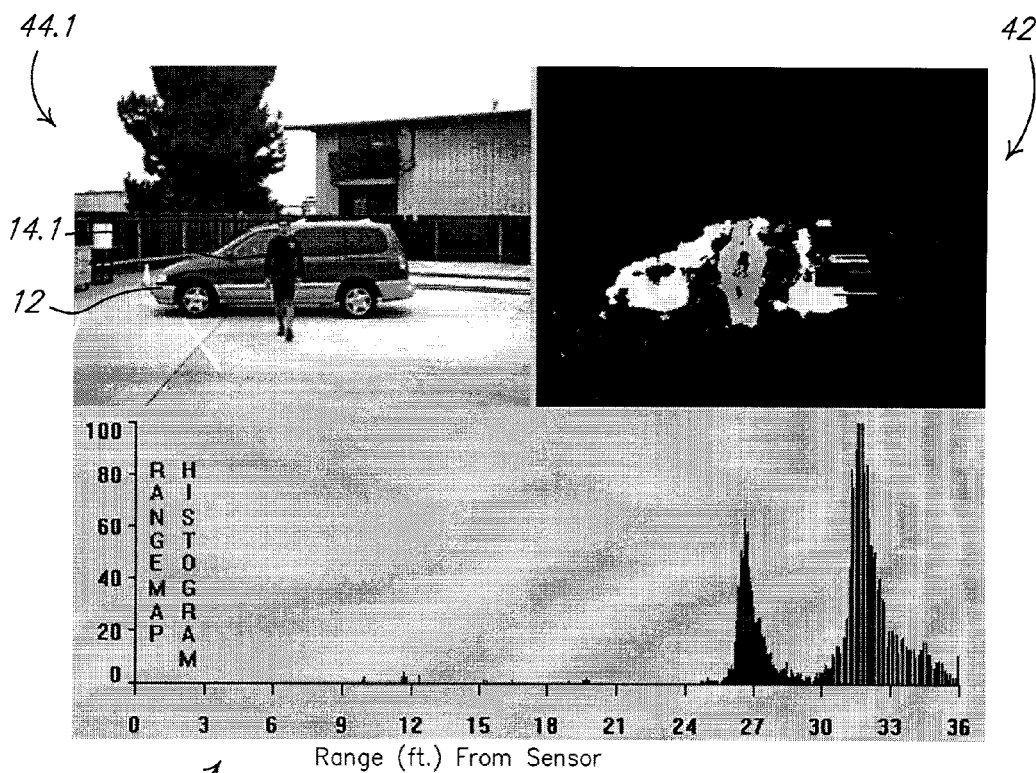
FIG. 25 illustrates a result of the object range segmentation process for a VRU approximately six feet from a stationary vehicle.
Figure 26:
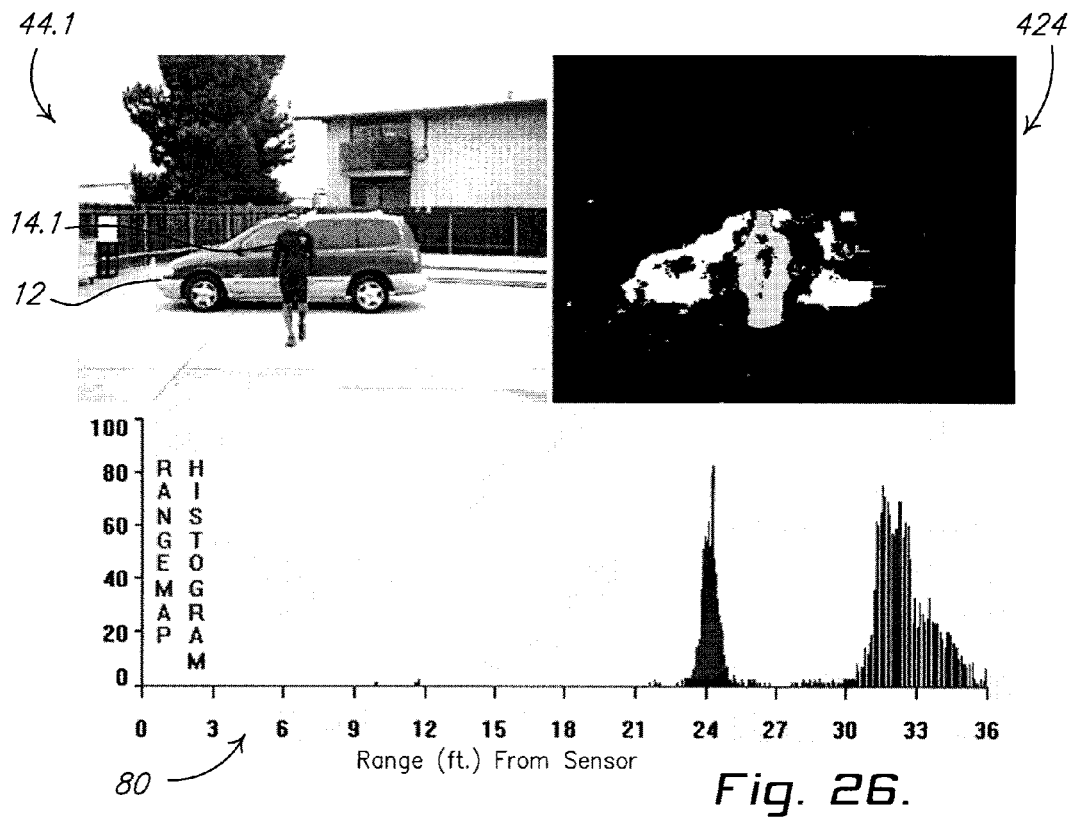
FIG. 26 illustrates a result of the object range segmentation process for a VRU approximately eight feet from a stationary vehicle.

Referring to FIGS. 24-26, a walking pedestrian 14.1 is imaged at increasing distances from a stationary vehicle 12. In each figure, the grayscale first image 44.1 (left image of the stereo pair) is displayed in the upper left, the corresponding simplified range map image 424 is displayed in the upper right, and a corresponding range map histogram 80 is displayed in the bottom half of the frame. The x-axis of the range map histogram 80 indicates range r in feet, and the y-axis of the range map histogram 80 indicates the number of pixels of in the simplified range map image 424 at the particular range r. The range map histogram 80 is constructed by summing up the number of image pixels for each range bin, for all pixels of the simplified range map image 424. In one embodiment, there are $2^{16}$ range bins, each separated by 1 millimeter, so as to provide for a total range of about 65.5 meters (215 feet), although the maximum practical range (e.g. in one embodiment, about 150 feet) is dependent upon the fields of view of the first 302.1 and second 302.2 stereo vision cameras, which determine the distance in object space that is spanned by a single pixel in image space.

FIG. 24 shows a VRU 14 leaning against the vehicle 12, in which case there is substantially no differential range between the two objects, so that the VRU 14 and the vehicle 12 occupy some of the same range bins. FIG. 25 shows the VRU 14 and vehicle 12 separated by approximately six feet for a distance-to-impact measure of approximately twenty-six feet. FIG. 26 shows the VRU 14 and vehicle 12 separated by approximately eight feet for a distance-to-impact measure of approximately twenty-four feet. Measurements of the separation distance and the distance-to-impact measure are taken with respect to the median of each cluster of range bins.

The simplified range map image 424 and the associated range map histogram 80 are updated in real-time (e.g. thirty frames per second). Using only the range map histogram 80, a preliminary threat assessment is computed based upon distance-to-impact, object density (number of pixels) and range spread (range of maximum range bin minus range of minimum range bin) for each object in the scene. The density and range spread of an object can help to make a determination of object class without requiring other pattern-based recognition techniques. For example, a range spread greater than approximately four feet would lower the likelihood of a VRU 14 classification.

The separation and isolation ("segmentation") of individual objects based on differential range may be done on a frame-to-frame basis or may be derived from several sequential image frames, dependent upon the quality of information in the range map images. Low light and nighttime conditions can cause a loss of range content due to the lack of gray-scale variance within the first 44.1 and second 44.2 images (left and right stereo image pairs), usually occurring within the boundaries of an object.

Figures 27A, 27B, 27C:
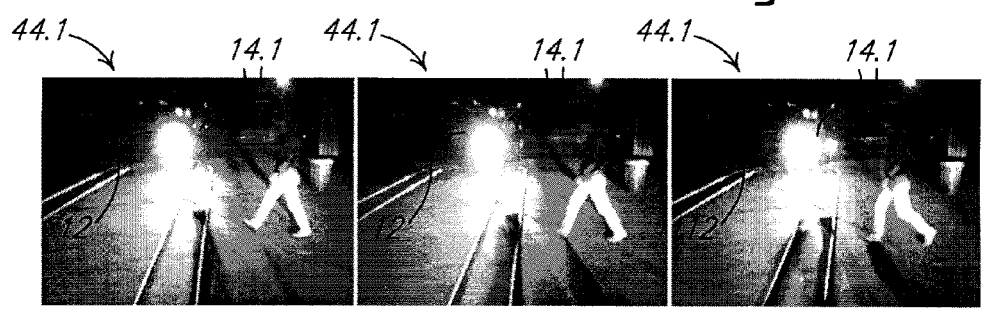
FIGS. 27a-c illustrate three successive grayscale image frames for a nighttime sequence of images.
Figures 28A, 28B, 28C:
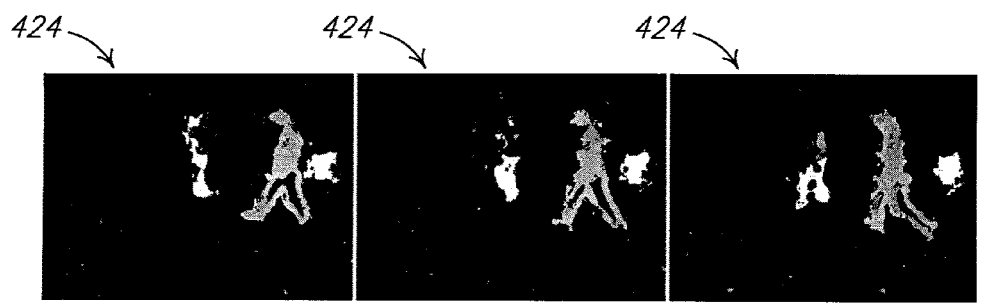
FIGS. 28a-c illustrate three successive range map images corresponding to the grayscale images illustrated in FIGS. 27a-c.
Figures 29, 30A, 30B:
FIG. 29 illustrates a composite range map image.
FIGS. 30a and 30b illustrate the operation of a connected-components sieve filter.

For example, FIGS. 27a-c show a sequence of three frames of grayscale first images 44.1 collected at night with the camera approaching a VRU 14 at approximately seven mph, with time increasing from left to right in the successive frames. FIGS. 28a-c shows the corresponding three simplified range map images 424. Each group of multiple (e.g. three) successive simplified range map images 424 is transformed using a principal components algorithm so as to generate a composite range map image 82 which incorporates the unique variance within the group of multiple successive simplified range map images 424, which also provides for filling in regions of the image of an object that may have been lost, for example, because of low illumination. For example, FIG. 29 illustrates the composite range map image 82 corresponding to the successive simplified range map images 424 illustrated in FIGS. 28a-c. After the multiple of simplified range map images 424 is transformed, then the next successive multiple of simplified range map images 424 is transformed with the principal components algorithm. The principal components algorithm generally operates as follows, the details of which are more fully described in the book, *Statistical Methods for Medical Investigations* by Brian S. Everitt, ISBN 0-340-61431-5, which is incorporated herein by reference:

Given L successive simplified range map images 424, i.e. simplified range map image arrays $R_1, R_2, \ldots R_L$, each simplified range map image array $R_i$, comprising an array of M rows by N columns of range pixels, the respective simplified range map image arrays $R_1, R_2, \ldots R_L$ are first transformed into corresponding simplified range map image vectors $r_1, r_2, \ldots r_L$, whereby each simplified range map image vector $r_i$ is formed by successively joining successive rows of the corresponding simplified range map image array $R_i$. For example, in one embodiment, L=3, M=228, N=308, and the length of each simplified range map image vector $r_i$ is 228×308=70,224. The column vector transposes of the simplified range map image vectors $r_1, r_2, \ldots r_L$ are then collected in an array $A=[r_1^T, r_2^T, \ldots r_L^T]$, and the corresponding L×L cross-correlation matrix C of array A is then calculated, and the eigenvalues $\lambda_1, \lambda_2, \ldots \lambda_L$ thereof are determined by solving for $|C-\lambda \cdot I|$, where I is the identity matrix and $|\ldots|$ is the matrix determinant. Given the eigenvalues $\lambda_1, \lambda_2, \ldots \lambda_L$, the associated eigenvectors $v_1, v_2, \ldots v_L$ of C are determined which satisfy the equations $C \cdot v_i = \lambda_i$. The corresponding L principal component images P are then found from $P = S^1 \cdot A \cdot S$, where $S = [v_1^T, v_2^T, \ldots v_L^T]$. The first column vector $p_1^T$ of P is transformed back to an M×N to form the composite range map image 82, which accounts for the greatest variance of the associated principal component image vectors $p_i$.

Prior to computing the range map histogram 80 of either the individual simplified range map images 424 or the composite range map image 82, clusters of pixels with a density less than, for example, eighty-five are removed using a connected-components sieve filter, and a range transform is then applied to the either the individual simplified range map images 424 or the composite range map image 82 in order to compress the original sixteen-bit range scales into ten-bit range scales, which has the effect of filling empty and low-density range bins when the range map histogram 80 is computed.

The connected-components sieve filter provides for removing regions of pixels that are less than a specified area, i.e. less than a specified number of connected pixels. These relatively low-area clusters can be considered to be artifacts (junk) in the range map. The connected-components algorithm determines the connectedness of each pixel to its immediate eight neighbors—vertically, horizontally, and diagonally—and identifies groups of connected pixels, after which, the area of each connected region is tested against the specified area constraint. Connected regions less than the area constraint are set to zero in the resulting output buffer. FIG. 30a illustrates an example of a 15-column by 10-row range map image for which there are clusters of pixels at four discrete ranges: 7, 10, 19 and 22 feet, and FIG. 30b shows the result of the operation of the connected-components sieve filter on the range map image of FIG. 30a, wherein the area constraint of the connected-components sieve filter was set to five pixels. There are four connected regions (labeled as 1 through 4) and the background region (labeled as 0), and for the area constraint set to five pixels, then range data associated with connected regions containing less that than five pixels—i.e. regions 2 and 3 in FIG. 30b—is removed, i.e. set to zero. The range data for connected regions for which the number of pixels is greater than or equal to the area constraint—i.e. regions 1 and 4 in FIG. 30b—is passed through the connected-components sieve filter.

Figure 31:
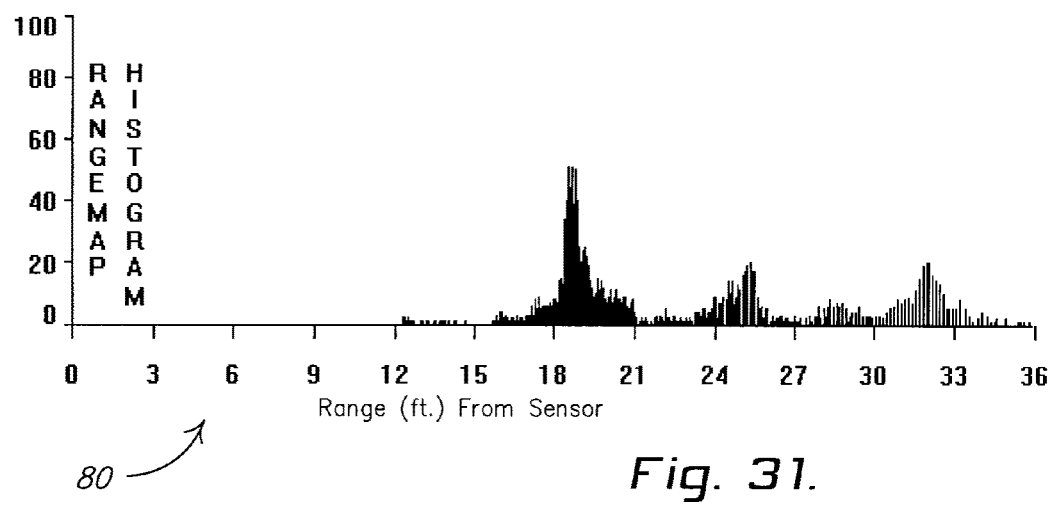
FIG. 31 illustrates a sixteen bit range map histogram corresponding to the right-most range map image of FIG. 29.
Figure 32:
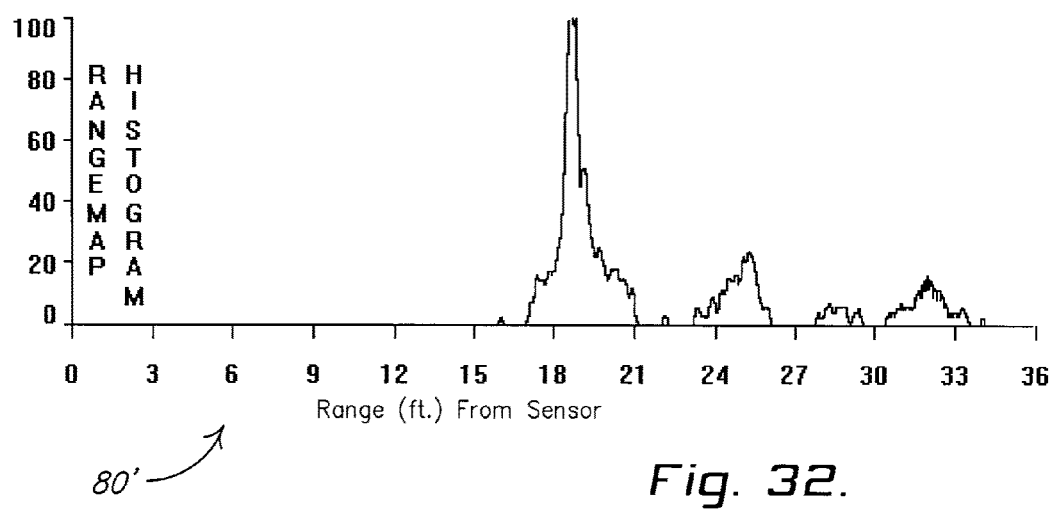
FIG. 32 illustrates a ten-bit range map histogram generated by transforming the sixteen-bit histogram of FIG. 31.

FIG. 31 illustrates the range map histogram 80 of a most recent simplified range map image 424 (i.e. the right image of FIG. 29) before the range transform, and FIG. 32 illustrates a corresponding range map histogram 80' of the same simplified range map image 424 after the range transform. The range transform necessarily preserves real-world range, shown here in feet, from zero to thirty-six, along the x-axis.

The object range segmentation process (426) relies upon two intra-object properties: 1) an object's range is highly correlated in the simplified range map image 424; and 2) an object's position is highly correlated in the grayscale first image 44.1 (i.e. left image of the gray-scale stereo image pair).

Figure 33:
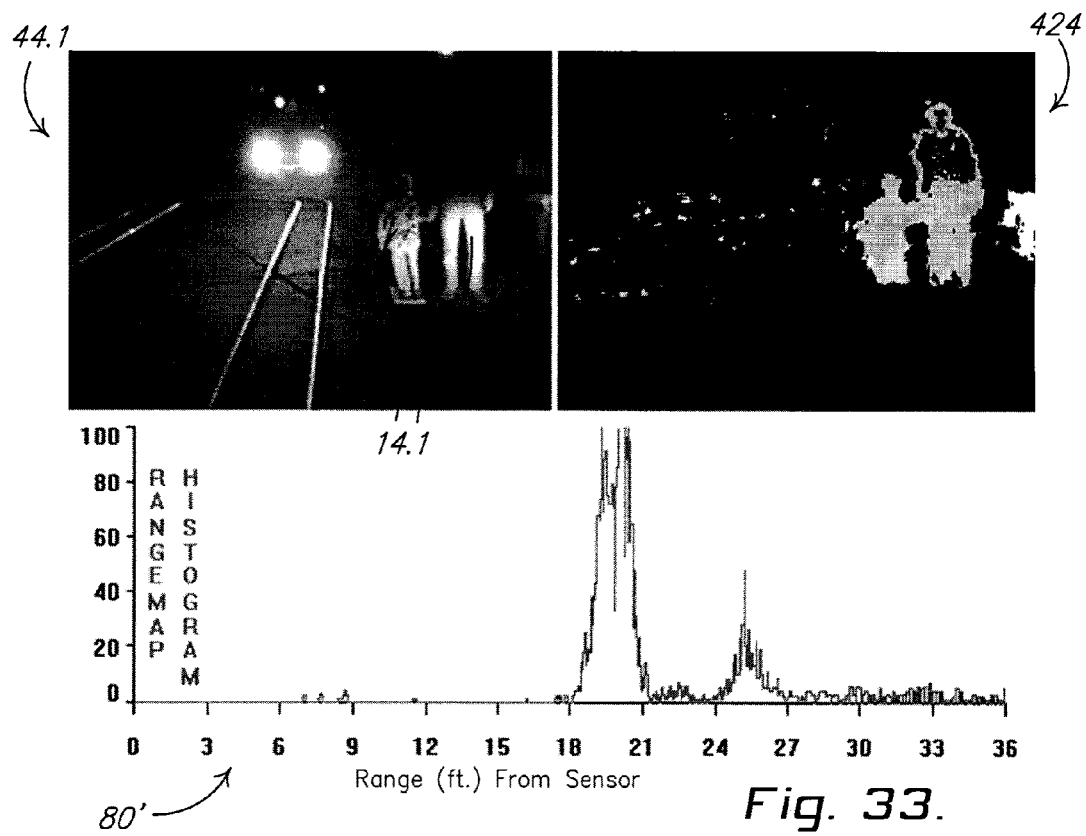
FIG. 33 illustrates two VRUs that are laterally separated in the field of view.
Figure 34:
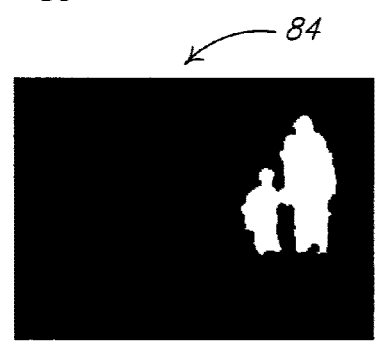
FIG. 34 illustrates a segmentation image resulting from a histogram search of the range map image illustrated in FIG. 33.

Objects may be isolated at different ranges by searching the range map histogram 80, 80'. FIG. 33 illustrates a grayscale first image 44.1, a corresponding simplified range map image 424, and a corresponding range map histogram 80' for a visual scene 24 of two VRUs 14 that are laterally separated in the field of view of the stereo vision camera 302, together with a trashcan in the background to the right of the VRUs 14. A search of the range map histogram 80' reveals that the two VRUs 14 have an initial range bin of approximately eighteen feet and a final range bin of approximately twenty-one feet. The trashcan has an initial range bin of approximately twenty-four feet and a final range bin of approximately twenty-seven feet. FIG. 34 shows a binary segmentation image 84 of the closest object(s) from FIG. 33, i.e. the two VRUs 14, after several additional morphological filtering steps for closure and boundary clean up, whereby "holes" within bounded (closed) regions of the binary segmentation images 84 are filled and the boundary is smoothed with an erosion filter which removes one or more outer layer of pixels from the binary segmentation images 84 so as to remove associated small protrusions. The binary segmentation image 84 is merely a binary reference table, wherein a non-zero value (usually a +1) indicates that the corresponding location in the associated grayscale first image 44.1 and the associated simplified range map image 424 is of relevance.

Detached objects that appear laterally in the field of view of the stereo vision camera 302 and that have negligible differential range may be isolated using the "reverse indices" technique, wherein a storage array is generated containing a list of the locations in the original simplified range map image 424 that contributed to each bin of the range map histogram 80'. This list, commonly called the reverse (or backwards) index list, efficiently determines which range map elements are accumulated in a set of histogram range bins.

Figure 35A:
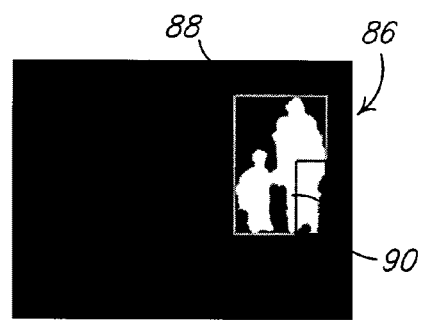
FIGS. 35a-c illustrates three different subsections of the segmentation image illustrated in FIG. 34.
Figure 35B:
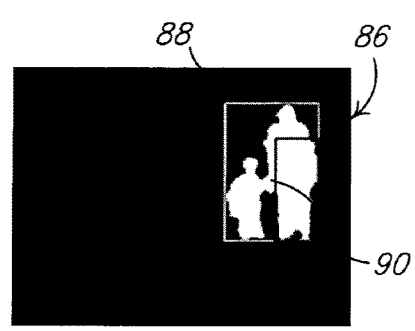
Figure 35C:
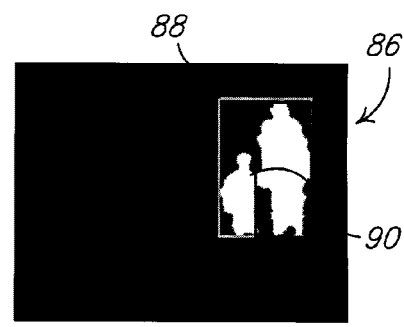

Attached objects that appear laterally in the field of view of the stereo vision camera 302 and that have negligible differential range—e.g. as illustrated in FIG. 33—may be isolated using an iterative approach. Through knowledge gained in training of the pattern recognition system, the geometric features associated with the binary segmentation image 84 shown in FIG. 34 are outside the limits of the class of VRUs 14, but not quite within the classes of pedal cyclists 14.2 or vehicles 12. With the knowledge from training that the aspect ratio of the best-fit rectangle (vertical extent divided by horizontal extent) is approximately eleven-to-five for an adult pedestrian, the segmentation may be sub-sectioned and reclassified, for example, as illustrated in FIGS. 35a-c, which show three different subsection images 86 with an eleven-to-five ratio and the resulting full best-fit rectangle 88. This is also referred to a "region-growing" technique, wherein the vertical extent of the best fit rectangle is divided into Q portions, e.g. Q equal portions, and successively larger subsection images 86, beginning with the smallest portion, each aligned with a particular corner of the best-fit rectangle 88, each successive subsection image 86 extending to the next of the Q portions, are overlaid on the best-fit rectangle 88, and the associated subsection images 86 is extracted and separately classified. If any of the resulting subsection images 86 classifies as a VRU 14, then this subsection image 86 is acted upon by the subsequent steps of the vulnerable road user protection process 400. The remaining portion of the image within the best-fit rectangle 88 may also be processed after extraction of the subsection image 86, for example) depending upon the outcome of processing the subsection image 86. For example, in FIGS. 35a-c, the objects within the overall best-fit rectangle 88 are separated by the subsection rectangle 90 which, for example, grows at a ratio of eleven-to-five (vertical extent to horizontal extent). Although the eleven-to-five was found to be beneficial for pedestrians, other aspect ratios may also be found from subsequent training to be beneficial for these or other objects of significance. In the embodiment illustrated in FIGS. 35a-c, Q was equal to 4, and FIGS. 35a-c illustrated subsection rectangles 90 of half, three quarters and the full height respectively of the best-fit rectangle 88, wherein each subsection rectangle 90 is aligned with the lower right corner of the best-fit rectangle 88. In another embodiment, the point of alignment could be the lower left corner, which may be beneficial for objects generally on the right side of the vehicle 12, so as to provide for more quickly identifying objects that are closest to the vehicle 12. For example, if the point of alignment were the lower left corner for the example illustrated in FIGS. 35a-c, then perhaps the child VRU 14 would have been identified first from the subsection image 86 illustrated in FIG. 35a.

Figure 36:
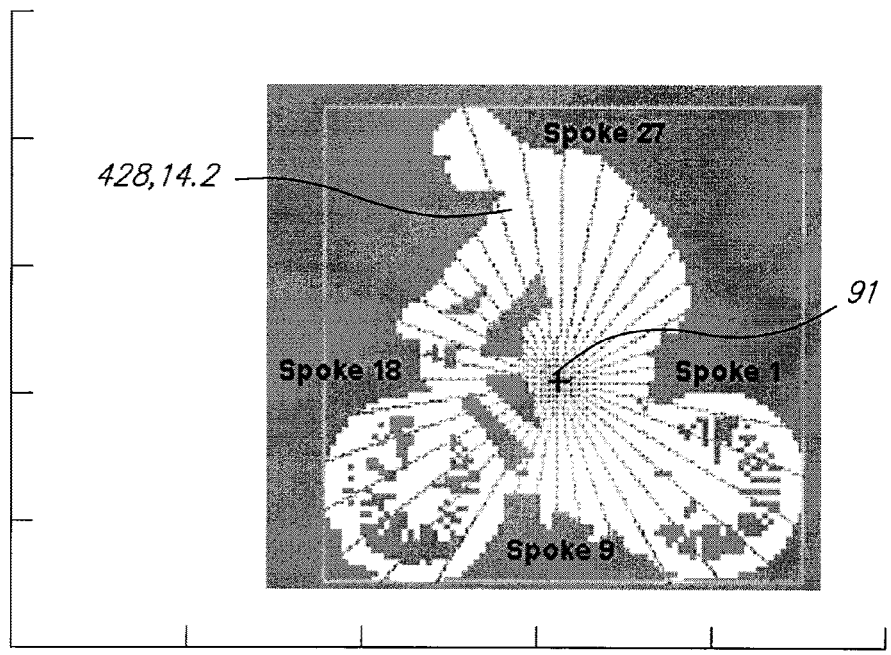
FIG. 36 illustrates a harmonic profile extraction process applied to a segmented image of a pedal cyclist.
Figure 37A:
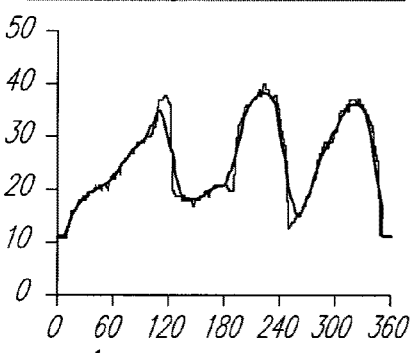
FIG. 37a illustrates a grayscale image and an associated harmonic profile of a pedal cyclist object.
Figure 37B:
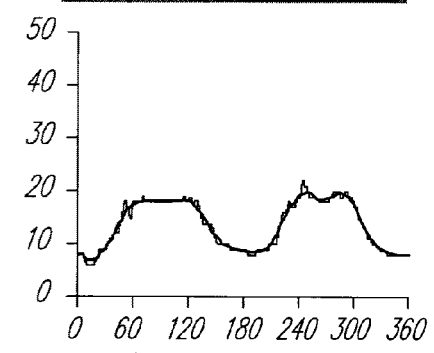
FIG. 37b illustrates a grayscale image and an associated harmonic profile of a trash can object.

The object range segmentation process (426) extracts a set of objects 428, i.e. binary segmentation images 84 or subsection images 86, from either the simplified range map image 424 or the composite range map image 82. Referring to FIGS. 3 and 4, in step (430), the closest object 428 is selected, and in step (432), a harmonic profile extractor 316 uses a range invariant harmonic shape descriptor to parameterize an object's shape as a function of angle and radial distance from its binary center-of-mass 91. The harmonic shape descriptor preserves the fine structure associated with each class of objects, for example: the tires of a bicycle or the heads and legs of pedestrians 14.1. Harmonics are more robust than traditional geometric descriptors (best-fit-ellipse, best-fit-rectangle). Small to medium errors in segmentation due to sunlight, shadow, or occlusion distort the harmonic profile locally. These errors are then eliminated or reduced using a central moving average filter. The harmonic profile of an object 428 is determined by a sequential search in memory, from the binary center-of-mass 91 of the object (the '+' symbol in FIG. 36) outwards to find the last active pixel. The search continues clockwise, and the extent of the search is limited by the boundary of the associated best-fit rectangle 88. This harmonic profile extraction process (432) is illustrated in FIG. 36 for a pedal cyclist 14.2 object 428, wherein the associated harmonic profile is defined using 36 equiangularly spaced "spokes". FIGS. 37a-e illustrate grayscale images and associated harmonic profiles of five different objects as follows, left to right: a pedal cyclist 14.2 (FIG. 37a), a trash can (FIG. 37b), a dog (FIG. 37c), a vehicle 12 (FIG. 37d) and a pedestrian 14.1 (FIG. 37e), wherein the respective gray scale first images 14.1 are shown above the corresponding harmonic profiles 92 generated therefrom. FIG. 37f illustrates an associated cross-correlation matrix of the cross-correlations of harmonic profiles 92 from FIGS. 37a-e, which shows that the harmonic profiles 92 exhibit inter-class uniqueness, thereby providing for the recognition and distinction of pedal cyclists 14.2. pedestrians 14.1. and vehicles 12.

The range invariance of harmonic profiles 92 is illustrated in FIGS. 38a-i. FIGS. 38a and 38e illustrate a grayscale image and an associated harmonic profile 92 for a relatively close pedal cyclist 14.2. FIGS. 38b and 38f illustrate a grayscale image and an associated harmonic profile 92 for a relatively distant pedal cyclist 14.2. FIGS. 38c and 38g illustrate a grayscale image and an associated harmonic profile 92 for a relatively close pedestrian 14.1. FIGS. 38d and 38h illustrate a grayscale image and an associated harmonic profile 92 for a relatively distant pedestrian 14.1. FIG. 38i illustrates an associated cross-correlation matrix of the cross-correlations of harmonic profiles 92 from FIGS. 37e-h, which shows that the harmonic profiles 92 of like objects are relatively strongly correlated regardless of range r, and that the harmonic profiles 92 of unlike objects are relatively weakly correlated.

Figure 39:
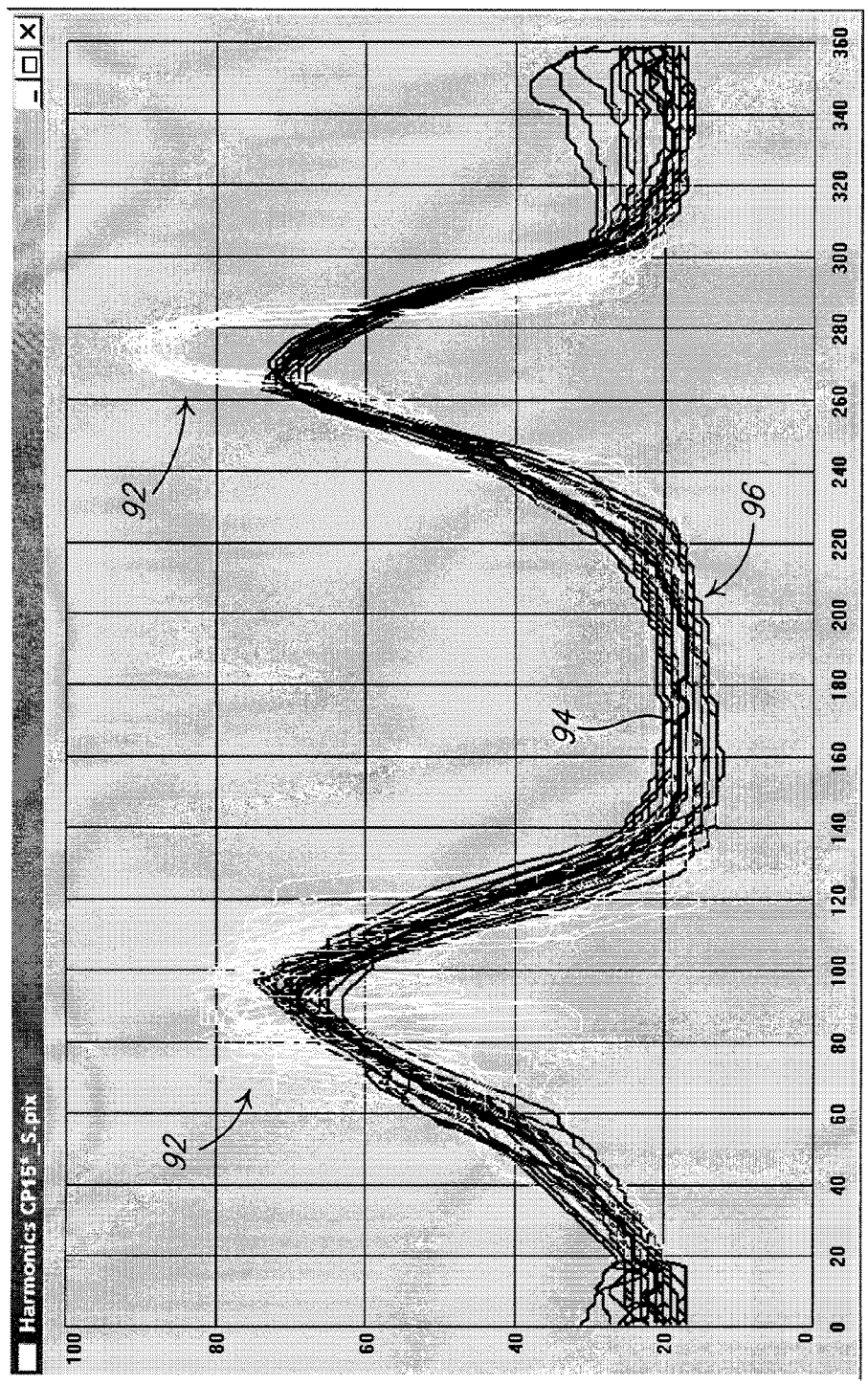
FIG. 39 illustrates a composite of harmonic profiles for various walking pedestrians in mid-stride at a range of 15 feet, including unfiltered harmonic profiles, corresponding filtered profiles resulting from a 19 element central moving average filter, and an associated best fit harmonic profile for the class of walking pedestrians at a range of 15 feet.
Figure 40:
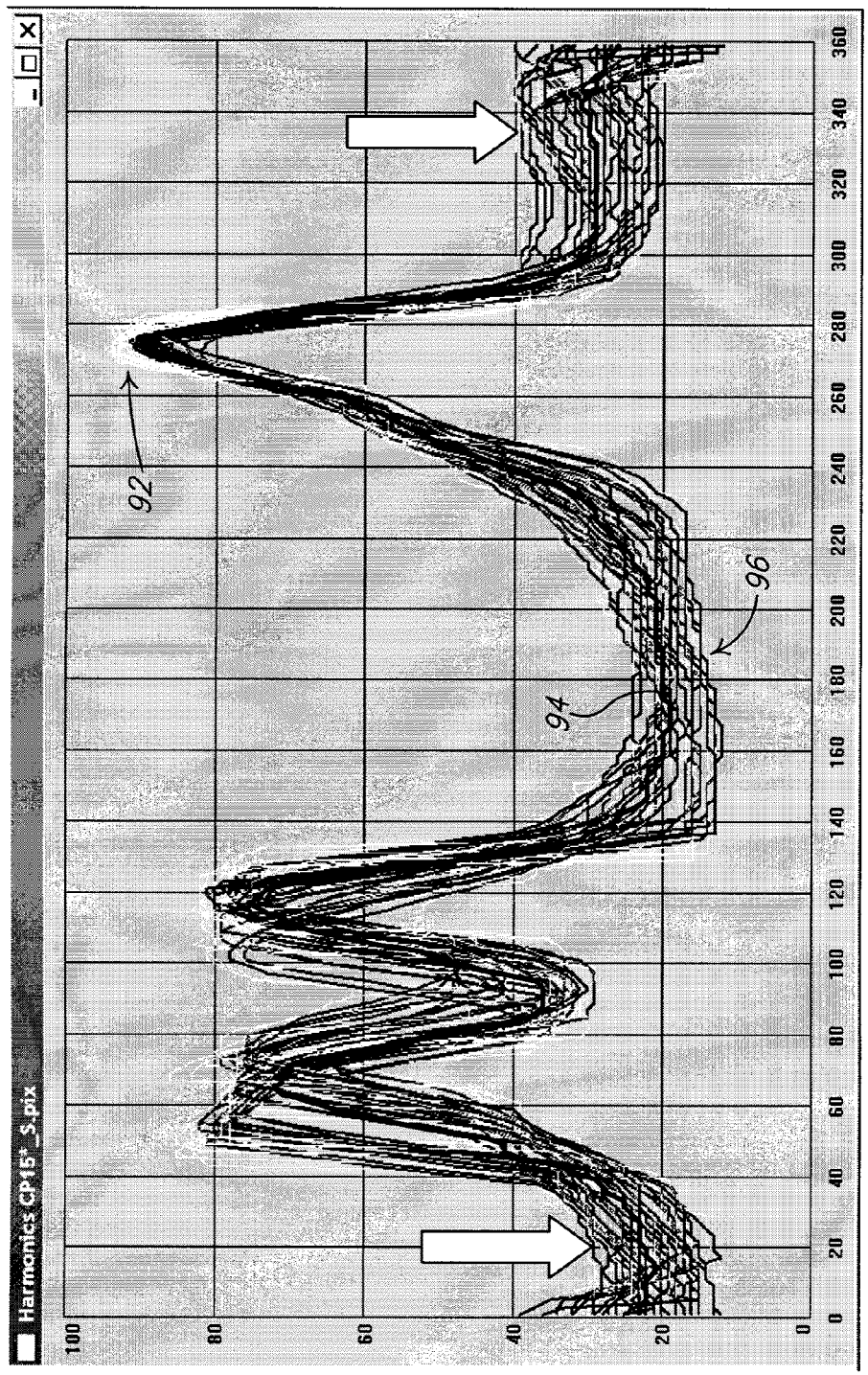
FIG. 40 illustrates a composite of harmonic profiles for various walking pedestrians in full-stride at a range of 15 feet, including unfiltered harmonic profiles, corresponding filtered profiles resulting from a seven-element central moving average filter, and an associated best fit harmonic profile.
Figure 41A:
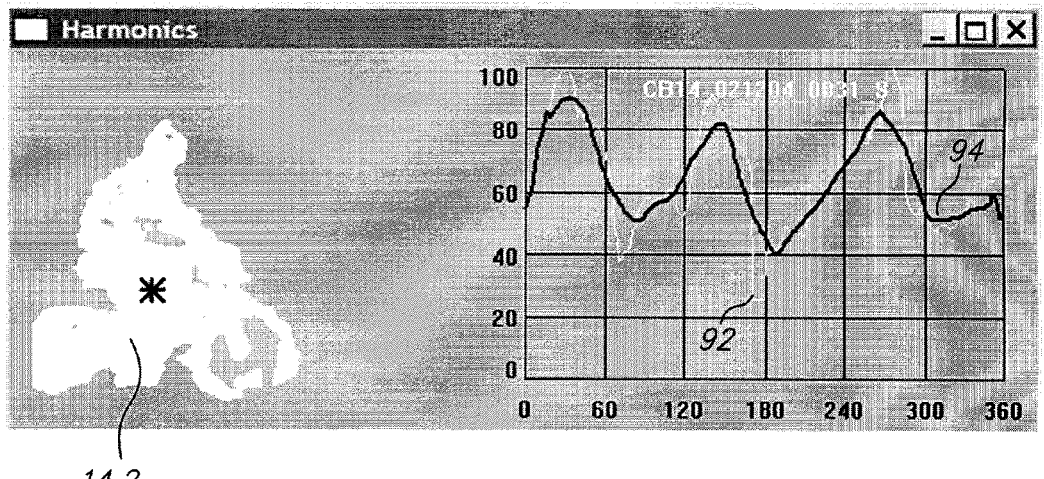
FIGS. 41a and 41b illustrate the binary image, associated harmonic profile, and associated harmonic profile model for a binary image of a pedal cyclist and a mirror image thereof, respectively.
Figure 41B:
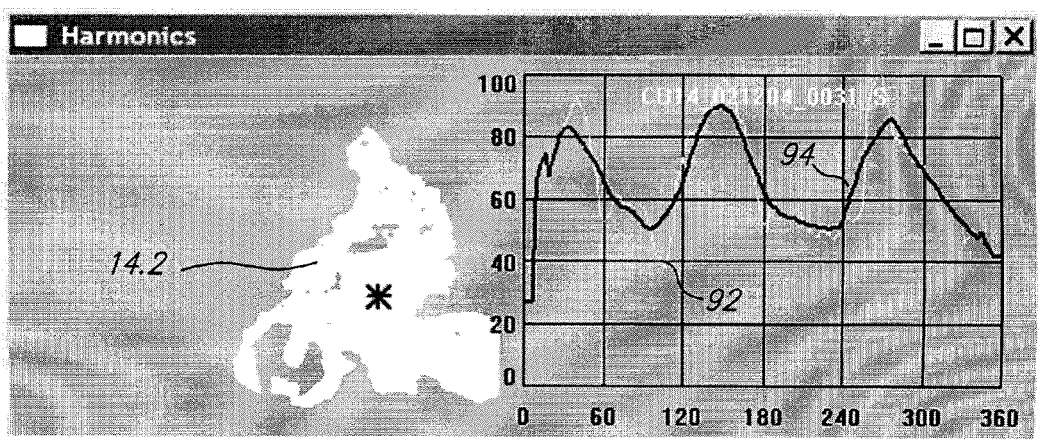
Figure 42A:
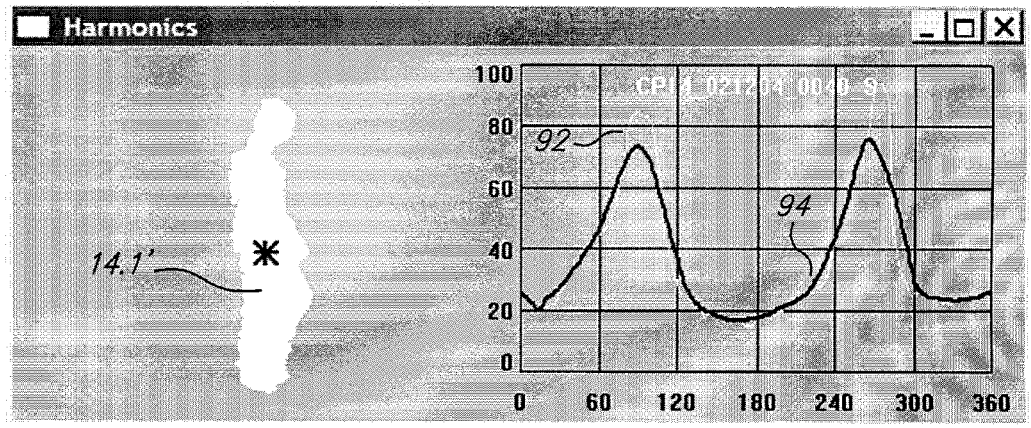
FIGS. 42a and 42b illustrate the binary image, associated harmonic profile, and associated harmonic profile model for a binary image of a pedestrian and a mirror image thereof, respectively.
Figure 42B:
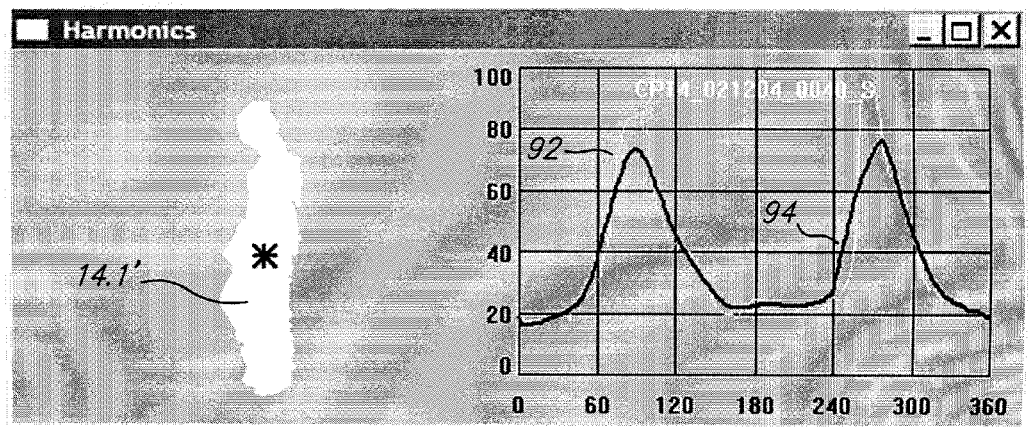
Figure 43A:
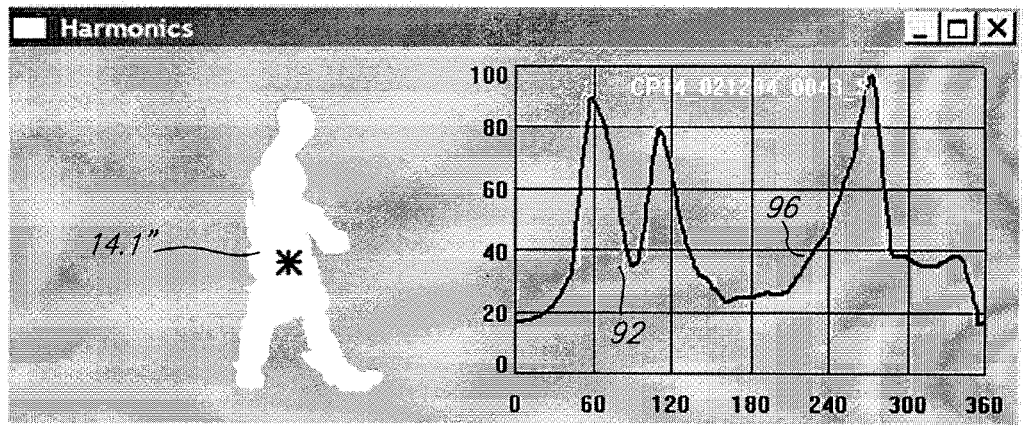
FIGS. 43a and 43b illustrate the binary image, associated harmonic profile, and associated harmonic profile model for a binary image of a walking pedestrian in full stride, and a mirror image thereof, respectively.
Figure 43B:
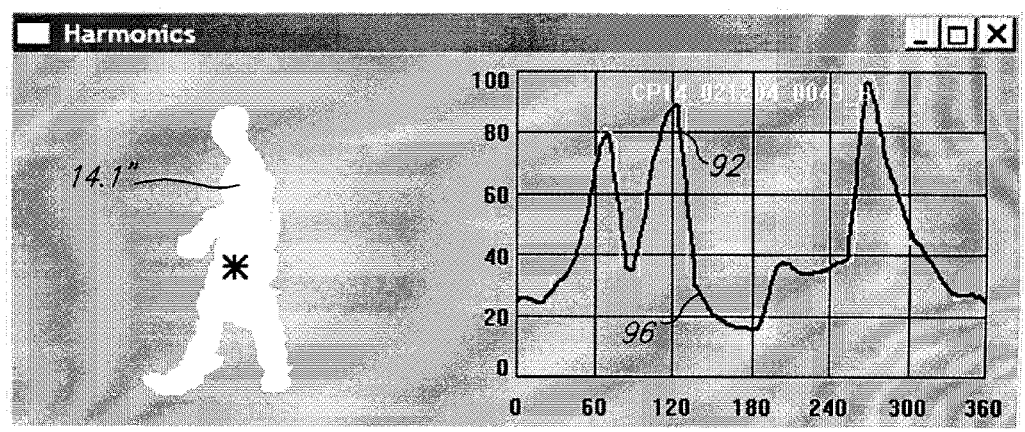

Harmonic profile models 94 are stored for a variety of classes of VRUs 14 to be identified. For example, in one embodiment, the following three classes of VRUs 14 were identified: pedal cyclist 14.2, stationary pedestrian or walking pedestrian at mid-stride 14.1', and walking pedestrian at full stride 14.1". For each class of VRU 14, and for ranges r at one foot increments from seven feet to thirty-two feet, the harmonic profiles 92 were gathered for about 300 different conditions, for example, at two degree increments, as illustrated by the groups of white traces in FIGS. 39 and 40 for walking pedestrians at mid-stride 14.1' and full-stride 14.1" respectively. Harmonic profiles 92 for the pedal cyclist 14.2 and stationary pedestrian or walking pedestrian at mid-stride 14.1' classes are then filtered with a 19-element central moving average filter, so as to generate corresponding filtered harmonic profiles 96, which for the example of FIG. 39 are illustrated in black. Harmonic profiles 92 for the walking pedestrian at full stride 14.1" class are filtered with a seven-element central moving average filter, so as to generate the corresponding filtered harmonic profiles 96, which for the example of FIG. 40 are illustrated in black. Furthermore, the "tails" of the filtered harmonic profiles 96 are "chopped" between 338 and 22 degrees, i.e. outside the arrows indicated in FIG. 40. The seven-element central moving average filter is used for the harmonic profiles 92 of the walking pedestrian at full stride 14.1" class so as to not excessively filter the dual-lobe between approximately 40 and 140 degrees which are characteristic of the legs of the walking pedestrian at full stride 14.1". The resulting harmonic profile models 94 are then found by fitting the associated filtered harmonic profiles 96, for example by using the median value of the filtered harmonic profiles 96 at each angular location, e.g. as illustrated by the bold traces in FIGS. 39 and 40.

The harmonic profile 92, 94, 96 parameterizes the shape of an object as a radial distance function of angle, and beneficially provides for using a relatively small number of data points to preserve relatively fine structures associated with each class of object. Relatively minor errors in segmentation caused by sunlight, shadow or occlusion—e.g. caused by the road surface filter 310—that otherwise might distort a harmonic profile locally may be eliminated or reduced using the central moving average filter.

Referring to FIGS. 41*a* and 41*b*, 42*a* and 42*b*, and 443*a* and 43*b*, the harmonic profile models 94 were determined for both the original training images, and the mirror images thereof, respectively, examples of which are illustrated for the pedal cyclist 14.2, stationary pedestrian or walking pedestrian at mid-stride 14.1', and walking pedestrian at full stride 14.1" classes respectively.

Figure 44:
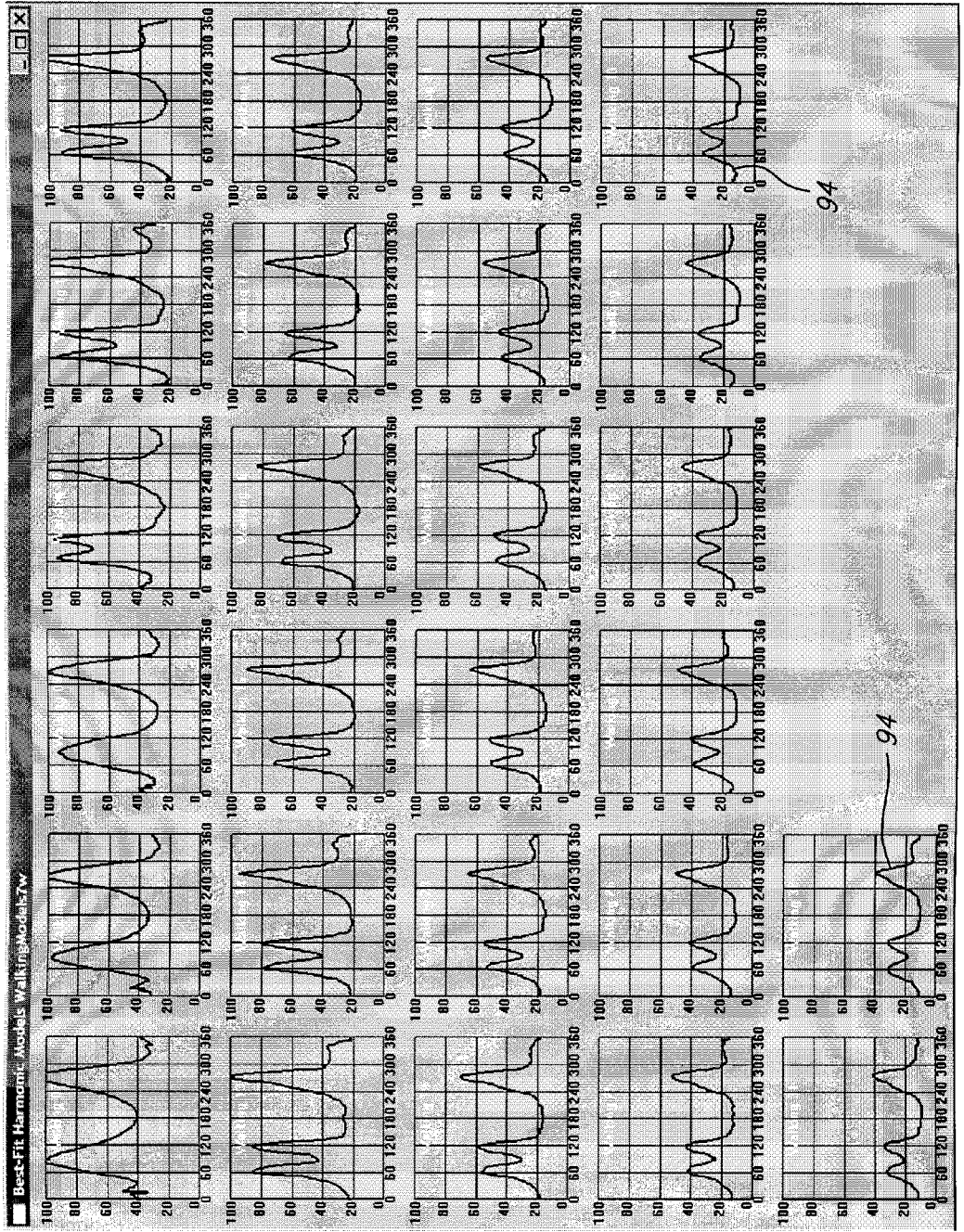
FIG. 44 illustrates an example of best fit harmonic profiles generated with data filtered by a seven-element central moving average filter, for the class of walking pedestrians at full stride, at ranges from 7 to 32 feet.

FIG. 44 illustrates an example of a plurality of harmonic profile models 94 for the class of walking pedestrians at full stride 14.1", at one foot range r increments between ranges of seven and thirty-two feet.

The lengths of the central moving average filters, e.g. nineteen-elements or seven-elements, were adapted so as to provide for maximizing the number of intra-class harmonic profile models 94—i.e. harmonic profile models 94 corresponding to different ranges r for a given class of VRU 14 objects—for which the associated cross-correlation is relatively high, e.g. greater than 0.9.

The harmonic profile 92 of a binary segmentation image 84 or subsection images 86 is filtered with a nineteen-element central average filter and correlated with the stored harmonic profile models 94 for the pedal cyclist 14.2, stationary pedestrian or walking pedestrian at mid-stride 14.1' classes of objects, and the harmonic profile 92 is filtered with a seven-element central average filter and correlated with the stored harmonic profile models 94 for the walking pedestrian at full stride 14.1" class objects. The maximum correlation value and corresponding library index are used to match the harmonic profile 92 with a particular harmonic profile model 94 and the associated object class and range r.

Figure 45A:
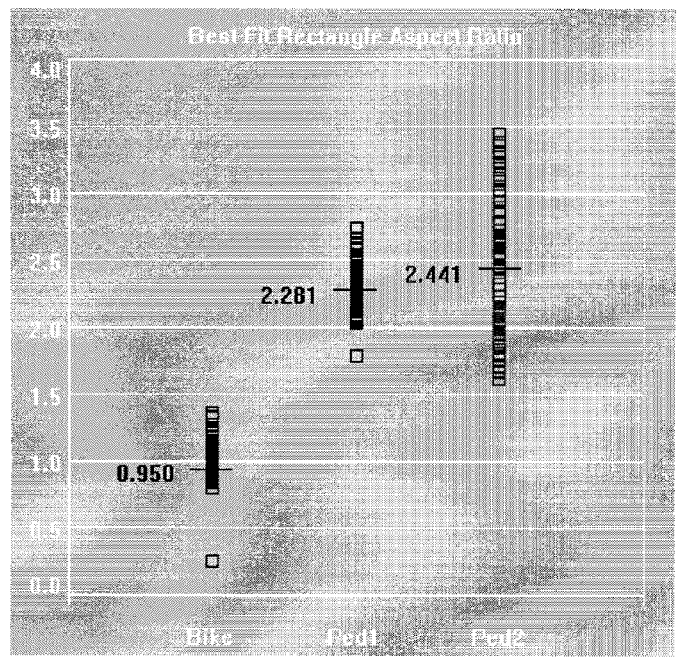
FIG. 45a illustrates a scatter plot of a best-fit rectangle geometric shape descriptor for pedal cyclists and stationary and walking pedestrians.
Figure 45B:
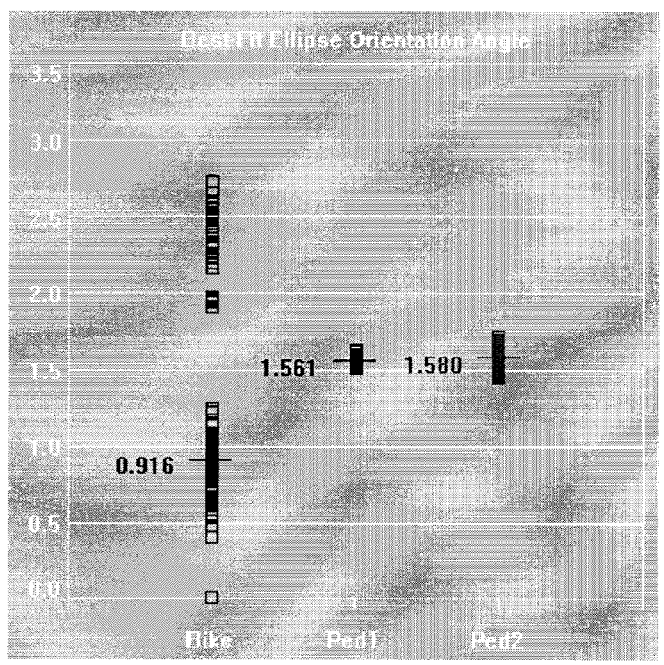
FIG. 45b illustrates a scatter plot of an angular orientation of a best-fit ellipse geometric shape descriptor for pedal cyclists and stationary and walking pedestrians.

Following step (430), a set of mathematical and geometric shape descriptors are computed for the object 428 identified prior to step (432). These descriptors compactly represent the characteristics of that object 428, and are adapted to identify VRUs 14 and pedal cyclists 14.2 of various sizes. The best descriptors exhibit intra-class clustering and inter-class separation, and are invariant with respect to position, rotation, and size within the image plane. Two such descriptors, the aspect ratio of the best-fit rectangle and the angular orientation of the best-fit ellipse, are scatter plotted in FIGS. 45*a* and 45*b* respectively for approximately seven hundred pedal cyclists 14.2, stationary pedestrians 14.1 and walking pedestrians 14.1. The median value of each descriptor is shown for each class. The best fit rectangle and the best-fit ellipse are determined by fitting a rectangle and ellipse respectively to the binary segmentation image 84 or subsection images 86 determined by the object range segmentation processor 314.

Figure 46A:
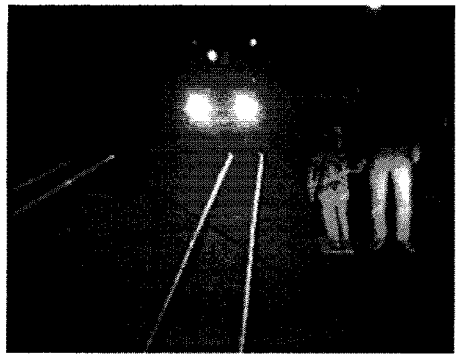
FIG. 46a illustrates a grayscale image.
Figure 46B:
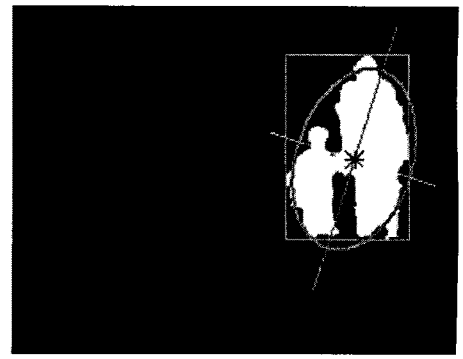
Figure 47A:
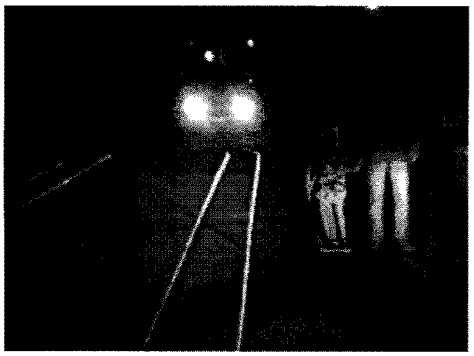
Figure 47B:
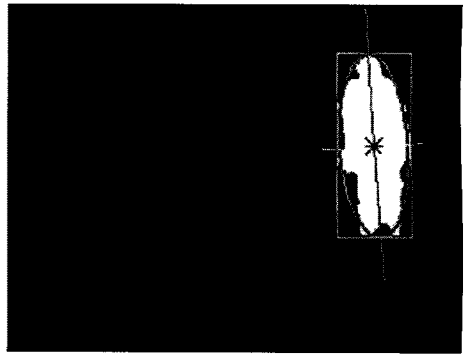

In general, the shape descriptors of attached objects are quite different than those of the same individual objects after separation of the attached objects. FIG. 46*b* shows the best-fit rectangle and best-fit ellipse descriptors—having values of 1.480 and 1.262, respectively—for the visual scene illustrated in FIG. 46*a*. FIG. 47 shows the same descriptors—having values of 2.425 and 1.633, respectively—computed on the largest of the separated objects. These values for the largest separated object closely matches those of the pedestrian class ("Ped 1") of the training set, which validates the utility of the best-fit rectangle and best-fit ellipse descriptors for VRU discrimination.

Referring to FIGS. 3 and 4, in step (438), a feature vector processor 320 determines the values of the elements of a twelve-element feature vector 440, as follows:
1. the size of the segmented area;
2. the row of the camera focal plane array that contains the binary center-of-mass of the segmented area;
3. the column of the camera focal plane array that contains the binary center-of-mass of the segmented area;
4. the vertical extent of the object;
5. the horizontal extent of the object;
6. the best-fit rectangle aspect ratio;
7. the best-fit rectangle fill factor (i.e. fraction of the best fit rectangle that is filled by the segmented area);
8. the best-fit ellipse major axis angle with respect to vertical;
9. the best-fit ellipse major and minor axes ratio;
10. the best correlation of the object's harmonic profile after the application of a 19 element central moving average filter with the stored set of harmonic profiles;
11. the best correlation of the object's harmonic profile after the application of a 7 element central moving average filter with the stored set of harmonic profiles; and
12. the maximum horizontal extent of the object in lower half of the best-fit rectangle.

Figure 48:
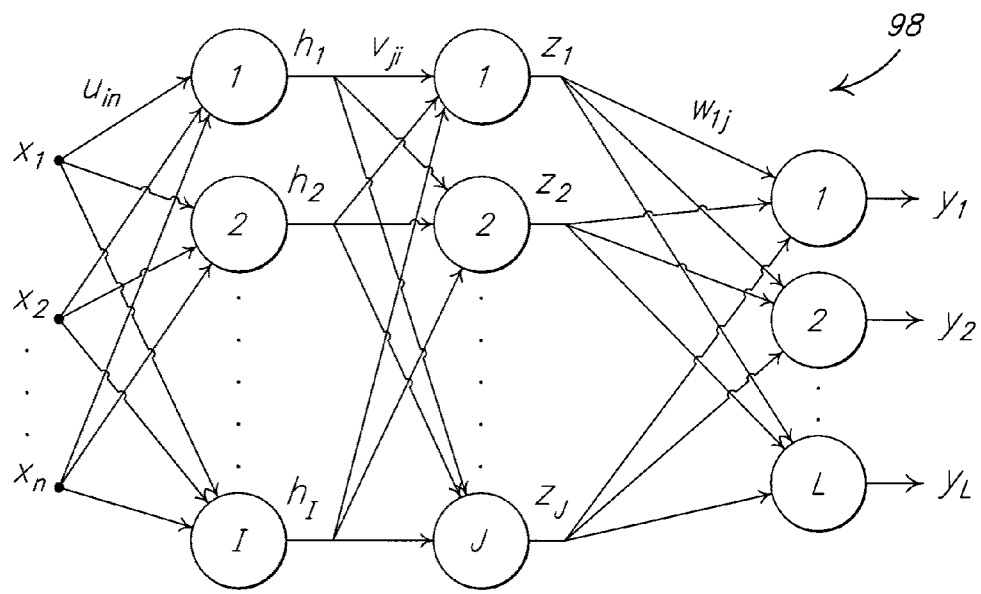
FIG. 48 illustrates an embodiment of an inclusive neural network.
Figure 49:
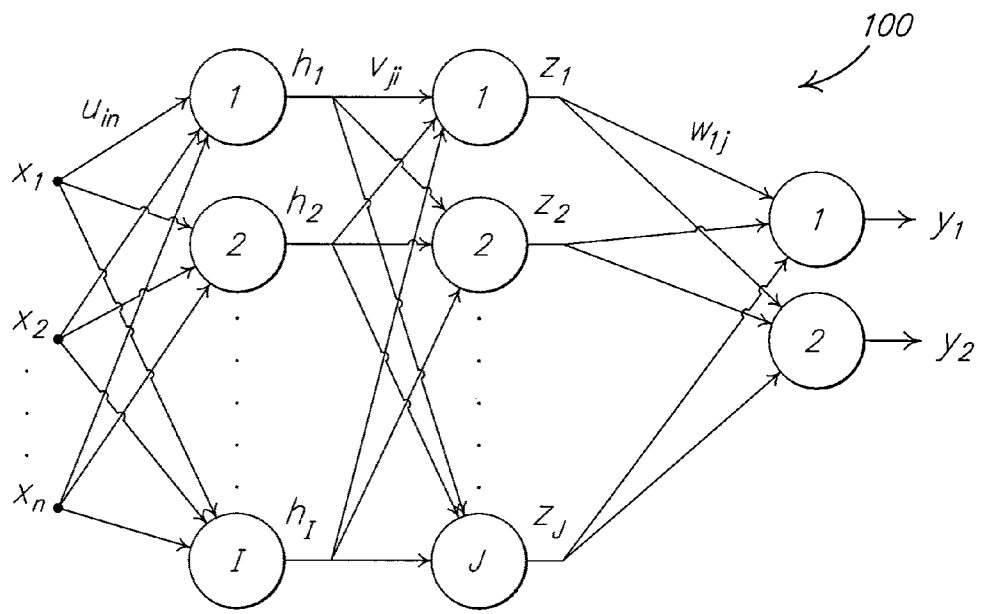
FIG. 49 illustrates an embodiment of an exclusive neural network.

Referring to FIGS. 3 and 4, in step (442), the feature vector is input to an object recognition processor 322, the output of which is the probability P 444 that the object 428 is a VRU 14. Referring to FIGS. 48 and 49, in one embodiment, the object recognition processor 322 comprises an inclusive neural network 98, a plurality of exclusive neural networks 100, one for each class of objects, and an associated rule-based decision process, which are trained using a knowledge base acquired through exposure to thousands of images for each of the primary classes. A successful pattern match occurs when the features of an untrained object closely match the features of a trained object. The algorithm is extensible to the recognition of other classes provided that they exhibit distinct characteristics from the existing classes. Referring to FIG. 48, the inclusive neural network 98 is used for the recognition of VRUs 14 and vehicles 12, and finds patterns within the features that identify an object with others in the same class while also finding patterns that make the object unique from other classes. This network is trained to consider aspects of all classes. The inclusive neural network 98 provides an output corresponding to each class of objects—and the null class—for which the inclusive neural network 98 is trained. For example, in an embodiment with three classes as follows: pedal cyclists 14.2, stationary pedestrian or walking pedestrians at mid-stride 14.1', and walking or running pedestrians at full stride 14.1", the inclusive neural network 98 would have four outputs, $y_1$, $y_2$, $y_3$, and $y_4$ that provide the probability that the particular feature vector 440 input to the inclusive neural network 98 is associated with an object that belongs to the corresponding class.

Referring to FIG. 49, the exclusive neural network 100 is used for the recognition of the three specific classes of VRUs in the training set: pedal cyclists 14.2, stationary pedestrian or walking pedestrians at mid-stride 14.1', and walking or running pedestrians at full stride 14.1". An exclusive network is self-similar, in that it finds patterns in the feature vector 440 that identify that feature vector 440 with others in a particular class, regardless of other classes. An exclusive neural network 100 is provided for each class of VRUs 14, and each exclusive neural network 100 has two outputs, $y_1$ and $y_2$, corresponding to the likelihood that the object associated with the feature vector 440 belongs or doesn't belong to the class upon which the exclusive neural network 100 is based.

In the inclusive 98 and exclusive 100 neural networks illustrated in FIGS. 48 and 49 the x values represent the input features, i.e. the elements of the feature vector 440 (except for elements 10 and 11 in the above list); the first column of neurons is called a hidden layer with outputs h; the second column of neurons is the second hidden layer with outputs z; and the last column of neurons represents the output layer with outputs y. The u, v and w values represent the weights for each input for each node. The objective during the training of the neural network is to determine what these weights are such that the calculated features will provide the correct output values. The inclusive 98 and exclusive 100 neural networks are trained by collecting large amounts of input data, for which the desired output result is specified, and running this data through the associated inclusive 98 and exclusive 100 neural networks. Each time new inputs are applied, the weights are adjusted to obtain the desired result until there is a very small error for all sets of data.

The operation of training the inclusive 98 and exclusive 100 neural networks is summarized as follows:

Weights going to output layer:

$$w_{ij}^{k+1} = w_{ij}^k + \rho(d_l^k - y_l^k)y_l^k(1-y_l^k)z_j^k + \alpha(dw^{k-1})$$

Weights going to second hidden layer:

$$v_{ji}^{k+1} = v_{ji}^k + pz_j^k(1-z_j^k)h_i^k \sum_{l=1}^{L}(d_l^k - y_l^k)y_l^k(1-y_l^k)w_{lj}^k + \alpha(dv^{k-1})$$

Weights going to first hidden layer:

$$u_{in}^{k+1} = u_{in}^k +$$

$$ph_i^k(1-h_i^k)x_n^k \sum_{j=1}^{J}\left[z_j^k(1-z_j^k)v_{ji}^k \sum_{l=1}^{L}(d_l^k - y_l^k)y_l^k(1-y_l^k)w_{lj}^k\right] + \alpha(du^{k-1})$$

where $\rho$ is called the training rate and represents how big a step is taken toward the error function minimum, and $\alpha$ is called the momentum and is multiplied by the previous change in the weight to speed up convergence of the training.

The classification of an object 428 entering the Collision Possible Space is made using a trainable pattern recognition system that uses the mathematical, geometric and harmonic shape descriptors. This system is taught to discriminate between the possible classes using a knowledge base acquired through exposure to numerous examples of predetermined class. The training set contains thousands of images for each of the primary classes. A successful pattern match occurs when the descriptors of an untrained object closely match the descriptors of a corresponding trained object. The algorithm can be extended to the recognition of other classes provided that these other classes exhibit characteristics that are distinct from the existing classes. A rule-based system may also be added to complement the decision of the pattern recognition system, wherein the rules are designed to apply, without exception, to every possible variation within a class. The rules may be stated in such a way as to include or exclude specific classes.

In one embodiment, an object is classified as follows:

If the output of the inclusive neural network 98 is >=0.80 for the vehicle class then classify the object as vehicle 12; otherwise if the output of the inclusive neural network 98 is >=0.90 for the VRU class then classify the object as a VRU 14; otherwise if the output of the inclusive neural network 98 is >=0.80 for the VRU class AND the output of both the exclusive neural network 100 and the correlation with the harmonic profile model 94>=0.80 for the same type of VRU 14 then classify the object as VRU 14; otherwise if the output of either exclusive neural network 100 or the correlation with the harmonic profile model 94>=0.95 then classify object as a VRU 14; otherwise do not classify the object.

Figure 50:
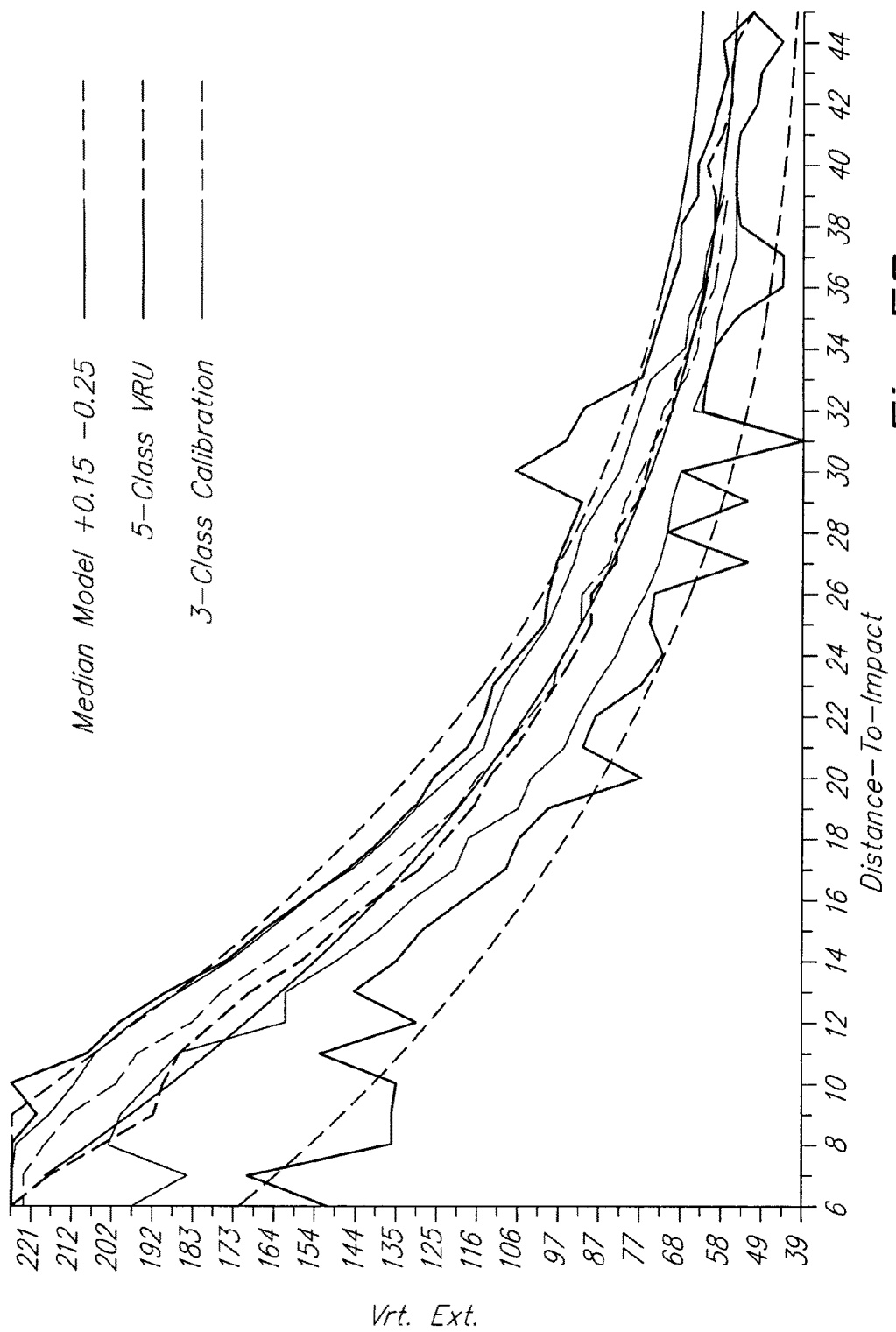
FIG. 50 illustrates a vertical extent model for mitigating a false detection of a VRU.
Figure 51:
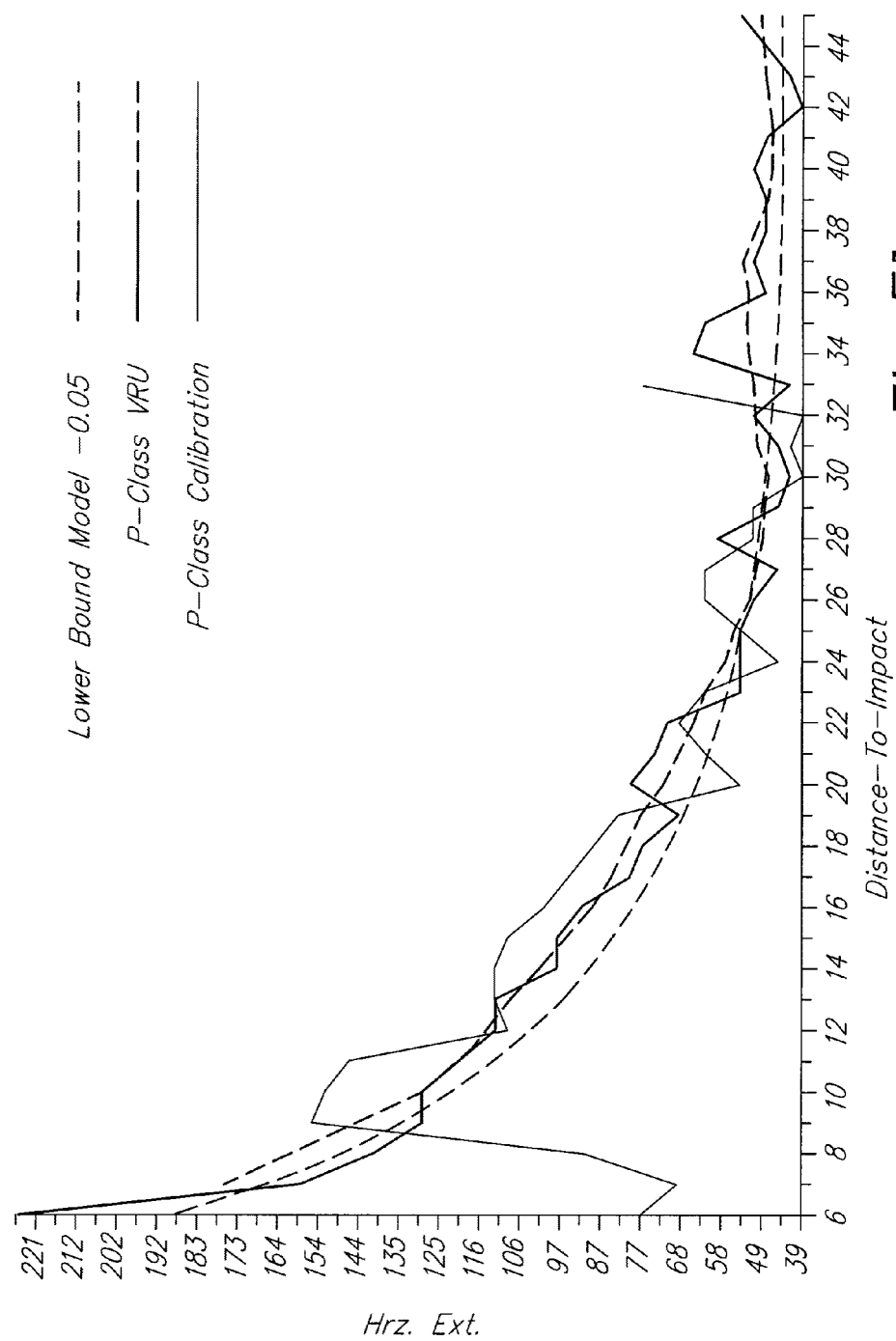
FIG. 51 illustrates a horizontal extent model for mitigating a false detection of a VRU.
Figure 52:
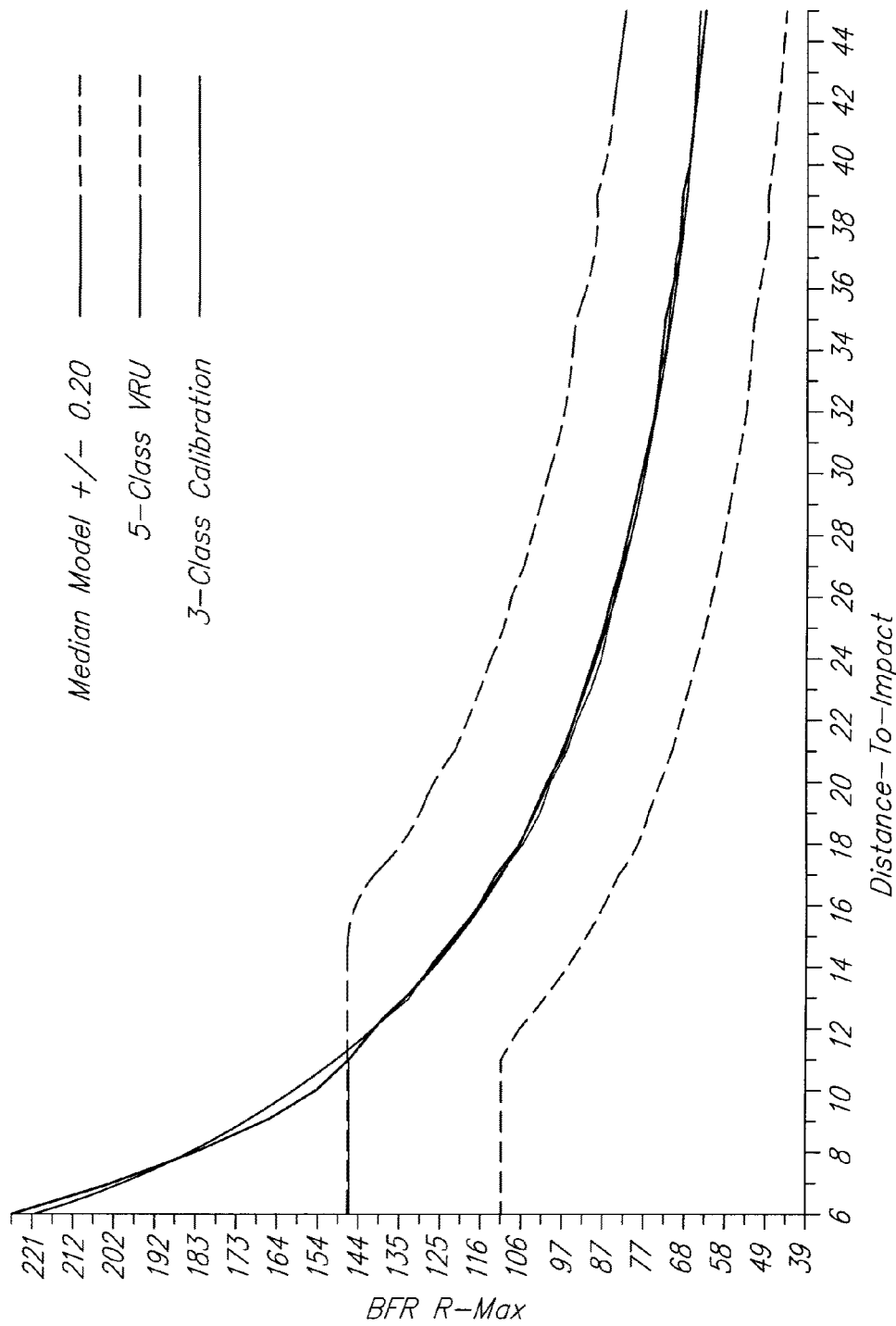
FIG. 52 illustrates a vertical location model for mitigating a false detection of a VRU.

A rule-base refers to an observation that applies to all possible members of a class. If the rule is false, the object in question is not a class member. For example, the vertical extent (height of the best-fit rectangle 88) of a pedestrian at a distance of X feet is never greater than Y pixels. If an object (not yet classified) at X feet has a vertical extent of Y+k (k>0), then the object is not a member of the pedestrian class. A rule-base to eliminate the possibility of "false alarming" (false deployment of protective devices) was developed for the different classes of VRUs 14. For example, referring to FIGS. 50, 51 and 52, the vertical extent, horizontal extent, and lower boundary of the best-fit rectangle 88 features were respectively modeled for all VRU 14 classes in the training set. The model for best-fit rectangle 88 vertical extent represents the upper and lower limits for all VRUs 14 in the training set. The model for best-fit rectangle 88 horizontal extent represents the lower limit of all VRUs 14 in the training set. The model for best-fit rectangle 88 lower boundary represents the upper and lower limits for all VRUs 14 in the training set. These models provide for rejecting VRU 14 false positive detections, e.g. corresponding to objects such as trash cans, lamp poles, overhanging branches, or etc. The anti-"false alarming" is invoked when a detected threat is outside of the trained VRU 14 parameters. For example, in one case, a lamp pole detected at approximately 39 feet initially classifies as a stationary pedestrian, but the best-fit rectangle 88 vertical extent is 132 pixels, which the maximum model value of 69 pixels at this distance, so that the VRU 14 classification is rejected. For each of the models, if the particular feature of the best-fit rectangle 88 exceeds the modeled threshold, then a VRU 14 classification is rejected.

If, in step (446), the probability P 444 is not greater than an associated VRU identification threshold P* 324, then, in step (448), the next closest object 428 is selected from those identified by the object range segmentation processor 314, and the above process repeats with step (432).

Otherwise, in step (450), an object tracker 326 tracks the object 428 identified as a VRU 14 by the object recognition processor 322. Once a VRU 14 has been identified, a track file corresponding to that VRU 14 is established by the object tracker 326. Outputs associated with the track file include accumulated confidence of recognition, down range and cross range history of the VRU 14 center of gravity, estimated time to fire and estimated time to impact. The object tracker 326 maintains information on all objects 428 within the field of view of the stereo vision camera 302 that have been previously classified as potential threats, but have not yet entered the Collision Possible Space. A unique track ID, classification code, distance-to-impact, center-of-mass, and vertical extent are maintained in a linear buffer for the most recent ten seconds for each object 428 being tracked. A $P^{th}$ order autoregressive model uses this information to estimate a future position of the object 428. The track file is also able to provide a limited "situational awareness" capability by tracking an object in a transient maneuvers, for example a pedestrian 14.1 bending down or falling.

Figure 53:
FIG. 53 illustrates a scene from a vehicle following a pedal cyclist VRU.

The track file maintains information (features and classification), in a linear buffer, on the most recently identified objects. The objects are sorted, in ascending order, based on distance-to-impact. This ensures that the most significant threats (closest to the host vehicle) are actively maintained. Each newly classified object is correlated against those already in the track file. Track file records are updated accordingly. The information in the track file gives a limited situational awareness. For example, inter-frame persistence of a specific VRU 14, with little variation in distance-to-impact, would indicate that the host vehicle is following the VRU 14, as seen in FIG. 53.

In step (452), a time-to-fire processor 328 estimates whether the vehicle 12 will collide with a VRU 14, and if so, estimates the time remaining before a collision is expected to occur. If, in step (454), a collision is anticipated and there is sufficient time remaining (i.e. the time to fire (TTF) is less than an associated time to fire threshold (TTF*), then, in step (456) either a driver warning device 28 or a VRU warning device 30 is activated to warn the driver 33 and/or the VRU 14, the brake control system 34 is signaled to actuate the vehicle brakes 102, or one or more VRU protective devices 32 such as an external air bag 32.1 or a hood actuator 32.2 are actuated depending upon the nature of the VRU 14, so as to provide for mitigating injury to the VRU 14 from a subsequent collision. For example, when the estimated time to fire (TTF) is less than the cycle time of the vulnerable road user protection system 10 (i.e. <30 millisecs), a signal 26 is generated at the correct moment with the cycle to inflate an external air bag 32.1 as necessary to protect the VRU 14. The vulnerable road user protection system 10 provides for detecting and recognizing pedestrians 14.1 and other VRUs 14 prior to impact, and, in one embodiment, provides the driver 33 and/or the VRU 14 with a warning if an impact with a VRU 14 is possible, initiates braking if an impact with a VRU 14 is probable, and provide a deploy signal to actuate either a external air bag 32.1 or a hood actuator 32.2 if an impact with a VRU 14 is certain. If, from step (454), either no collision is anticipated or there is insufficient time remaining for actuation of the next possible driver warning device 28, VRU warning device 30, brake control system 34, or VRU protective devices 32, or following step (456), the process repeats with step (402) after advancing to the next image frame in step (458).

Timing tests on an IBM T30 (1.8 GHz P4 512 MB RAM) showed that the vulnerable road user protection system 10 can perform thirty-nine to forty-four classifications per second with an image size of 308×228 pixels.

While each of the above-described independent neural networks: inclusive, exclusive, and harmonic in accordance with the above-described approach for recognition of vulnerable road users (VRU) has fundamental strengths that uniquely contribute to a recognition decision, the proper interpretation of the output of theses networks can sometimes be subjective and imprecise. However, in accordance with an alternative embodiment—which can be referred to as a 4-class consolidated network (4 cc network),—the outputs from the inclusive, exclusive, and harmonic networks are joined so as to provides for determining a single and unambiguous classification statistic for each of the three VRU classes: bicyclists, stationary pedestrians, and walking/running pedestrians.

Figure 54:
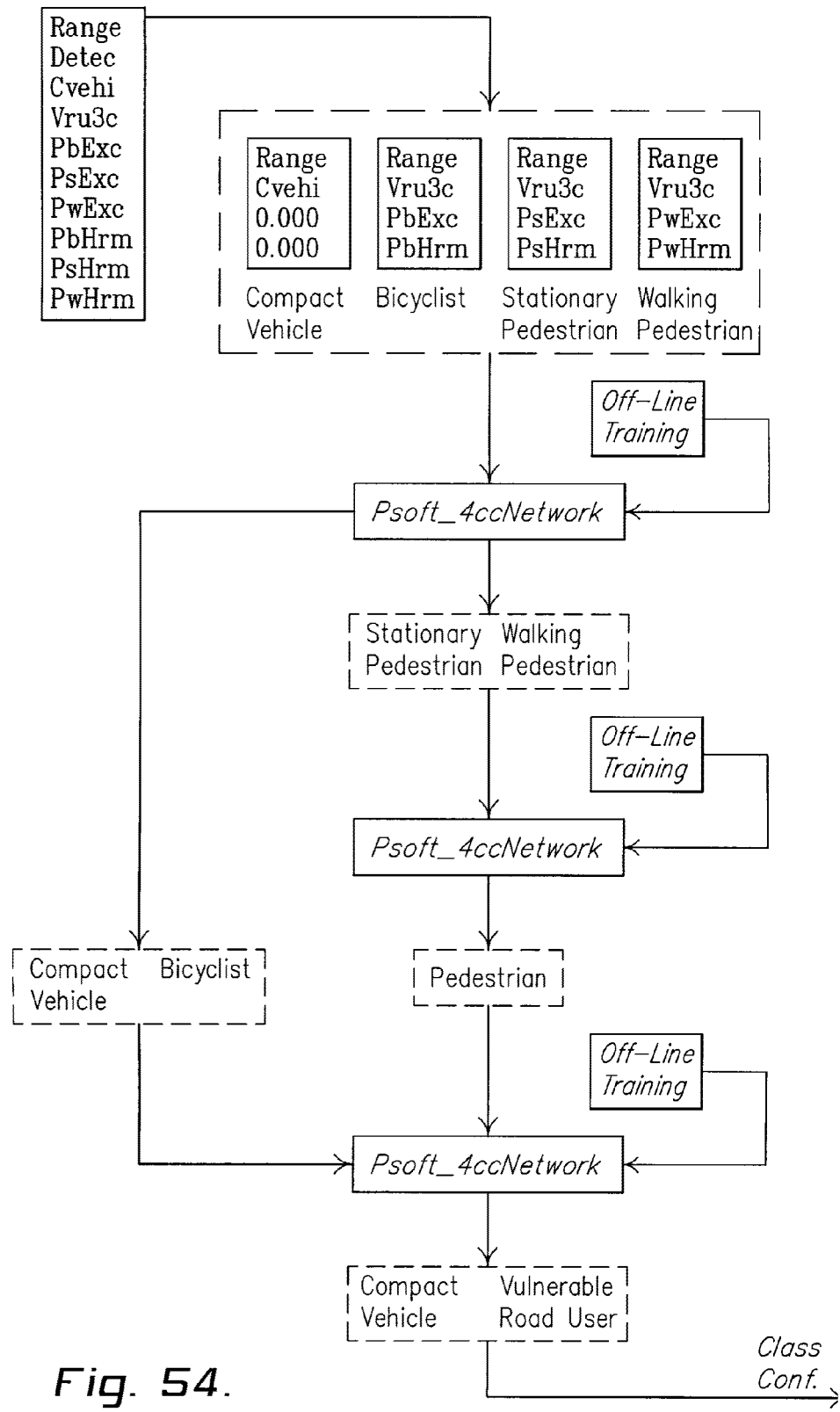
FIG. 54 illustrates a flow chart of a 4-class consolidated network.

The 4 cc network uses a trained neural network to combine the outputs of the original multiple neural networks. The training process is used to identify the optimal weighted contribution that the inclusive, exclusive, and harmonic networks make to each of the three VRU classes. The process requires iteratively classifying a training set (22,000 images of known classification) with various levels of support—a term often used to quantify the clustering of related classes and separation of dissimilar classes. This information provides for reliably joining the network outputs in correct proportion and leads to the three-tiered process in FIG. 54. The tiers represent increasing measures of intra- and inter- class support.

Tier 1 of the 4 cc network reorders the 10-element vector of classification statistics into four 4-element feature vector inputs, returning a single classification statistic for the Compact Vehicle, Bicyclist, Stationary Pedestrian, and Walking Pedestrian classes. Tier 2 of the 4 cc network combines the Stationary Pedestrian and Walking Pedestrian into a single Pedestrian classification statistic. Tier 3 of the 4 cc network combines the Bicyclist and Pedestrian into a single VRU classification statistic. This tier is optional.

The 5-element vector of classification statistics returned by the 4 cc network is shown in FIG. 55 together with the original 10-element vector.

The detection flag, NetStat[1] of both the combined and discrete classification statistics, is intended to provide some feedback for unclassified detections. If the detected object is within approximately 48 feet of the host vehicle and is dissimilar to all of the trained classes, the detection flag will be set to a value of 1.0. If the detected object is within approximately 48 feet of the host vehicle and is dissimilar to only the trained VRU classes, the detection flag will be set to the value of the VRU false alarm confidence. This was referred to previously as anti-"false alarming". Both of these conditions indicate the presence of an unrecognized object that poses a potential threat based on connected area. If the detected object is beyond approximately 48 feet of the host vehicle, the detection flag is then set to a value of 1.0. Extended-range objects are not classified because there are insufficient shape features.

The compact vehicle class (Cvehi) of the combined classification statistics was trained on compact vehicles (Honda Accord & Volvo S40) imaged from the rear and slightly off axis. The bicyclist class (VruB) of the combined classification statistics was trained on bicyclists crossing the FOV laterally. The pedestrian class (VruP) of the combined classification statistics was trained on stationary and walking pedestrians carrying small objects. This class was also trained to include approaching and departing bicyclists.

The scene illustrated in FIG. 56 is from a familiar Group5 test sequence, wherein the associated upper and lower output logs illustrated the discrete and combined classification statistics.

Figure 57:
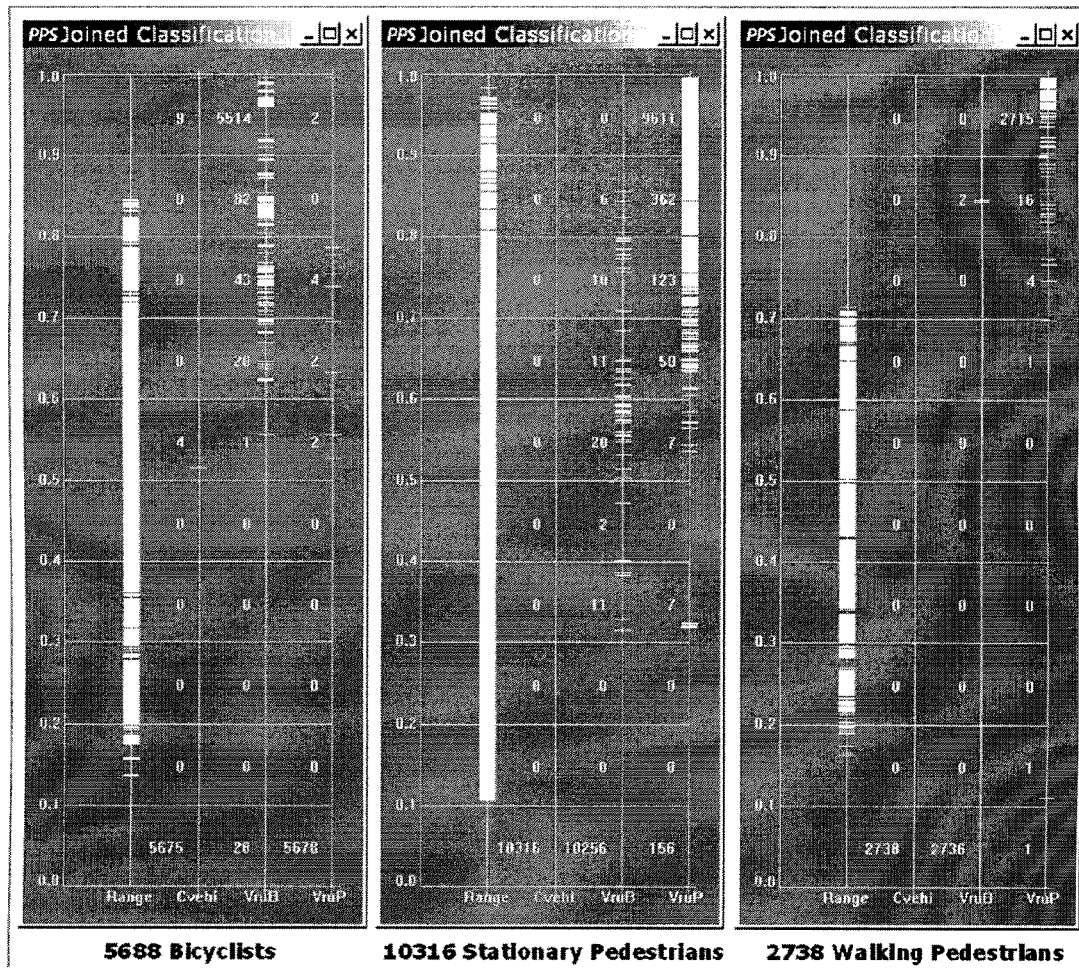
FIG. 57 illustrates classification densities from the 4 cc Network classification density for 22,000 training images for three classes of objects.

Referring to FIG. 57, the associated density plots illustrate the 4 cc network classification confidence for each 10% incremental bin. Of the 5,688 bicyclist-class training images, 5,514 (97%) have a confidence above 0.90. Of the 10,316 stationary-pedestrian-class training images, 9,611 (93%) have a confidence above 0.90. Of the 2,738 walking-pedestrian-class training images, 2,715 (99%) have a confidence above 0.90. Tests of the 4cc network against the 22,000 training images show a high percentage of high confidence detections for each of the three VRU classes.

Figure 58:
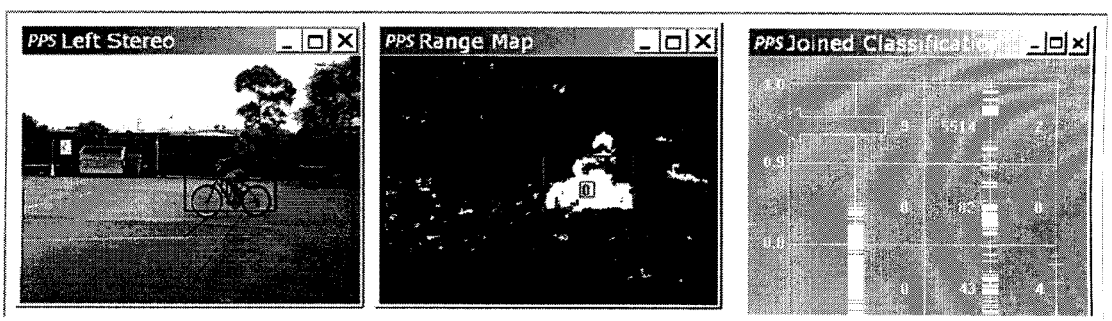
FIG. 58 illustrates nine bicyclist misclassifications caused by upper torso detachment in the image.

Of the 5,688 bicyclist-class training images, 9 (0.15%) misclassify as compact vehicles, as seen in the Cvehi column of the bicyclist density plot of FIG. 57. Although this is an insignificant number, this type of error is potentially the most severe resulting in a non-deployment of a protection device. However, each of the nine high confidence bicyclist misclassifications seen in FIG. 57 resulted from an anomaly in the range map. In each case, the head or upper torso was detached or missing from the lower portion of the bicyclist. The segmentation algorithm detected the detached portion, but it either discarded it due to insufficient size or classified it as a separate object. The example in FIG. 58, one of the nine cases, shows that the detached head alters the segmented boundary, which then degrades the classification process. Also, it can be seen that the space between the tires is filled, eliminating the characteristic double lobe that the harmonic networks require.

Figure 59:
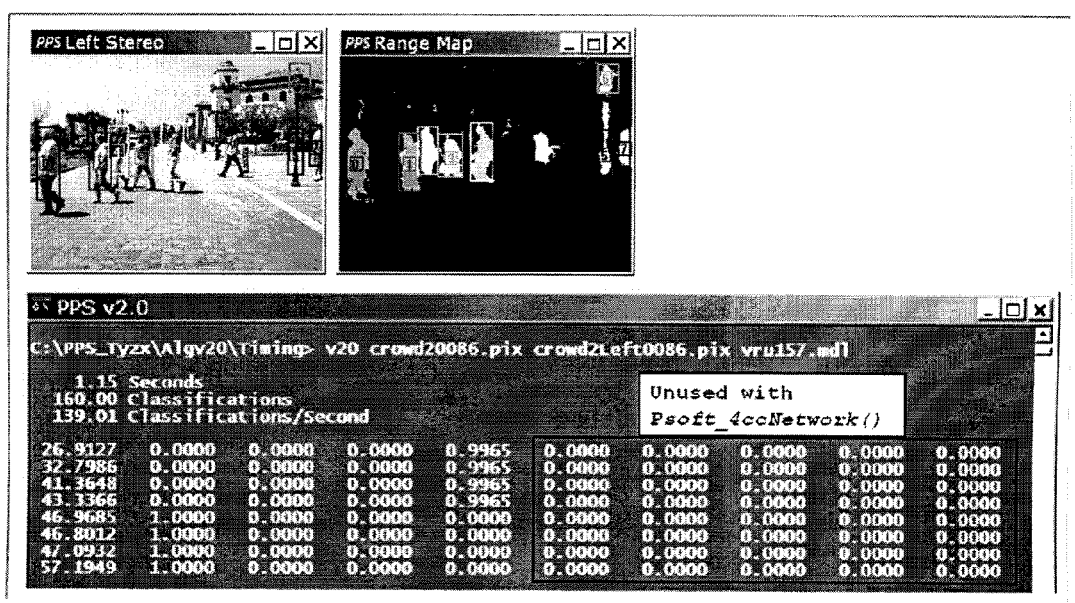
FIG. 59 illustrates Version 2.0 time test.

Referring to FIG. 59, time tests using 20 frames of the crowd2 sequence indicate operation at 139 classifications per second, which is 12% faster than a previous embodiment at 124 classifications per second in 64-bit mode, using an HP xw4100 (P4 2.8 GHz, 1 GB RAM) computer for the tests.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. A method of processing an image of a visual scene, comprising:
   a. acquiring at least one image of a visual scene, wherein said at least one image comprises a plurality of pixels;
   b. acquiring or determining a range map comprising at least one distance value associated with at least one pixel of said plurality of pixels, wherein said at least one distance value comprises a measure of distance relative to an associated at least one camera used to acquire said at least one image;
   c. calculating a range histogram from said range map, wherein said range histogram accounts for every pixel of said at least one image, said range histogram comprises a vector, each element of said vector is associated with a different corresponding range of values of said at least one distance value, and each said element of said vector comprises a count of elements of said range map for which said at least one distance value of said range map is within said corresponding range of values of said at least one distance value;
   d. associating each element of said range map counted by said element of said vector with at least one of a corresponding pixel of said plurality of pixels;
   e. operating on said range histogram; and
   f. operating on at least one of said at least one of said corresponding pixel of said plurality of pixels associated with said element of said range map responsive to the operation of operating on said range histogram.

2. A method of processing an image of a visual scene as recited in claim 1, wherein said at least one image of said visual scene comprises at least one pair of stereo images of said visual scene, and the operation of acquiring or determining said range map comprises determining said range map from said at least one pair of stereo images of said visual scene.

3. A method of processing an image of a visual scene, comprising:
   a. acquiring at least one image of a visual scene, wherein said at least one image comprises a plurality of pixels;
   b. acquiring or determining a range map comprising at least one distance value associated with at least one pixel of said plurality of pixels, wherein said at least one distance value comprises a measure of distance relative to an associated at least one camera used to acquire said at least one image;
   c. calculating a range histogram from said range map, wherein said range histogram comprises a vector, each element of said vector is associated with a different corresponding range of values of said at least one distance value, and each said element of said vector comprises a count of elements of said range map for which said at least one distance value of said range map is within said corresponding range of values of said at least one distance value;
   d. associating each element of said range map counted by said element of said vector with at least one of a corresponding pixel of said plurality of pixels or said range map;
   e. operating on said range histogram; and
   f. operating on at least one of said at least one of said corresponding pixel of said plurality of pixels or said range map associated with said element of said range map responsive to the operation of operating on said range histogram;
   g. further comprising decreasing a resolution of said range map prior to calculating said range histogram by reducing a digital bit resolution of said range map prior to calculating said range histogram, so as to provide for smoothing said range map prior to calculating said range histogram.

4. A method of processing an image of a visual scene, comprising:
   a. acquiring at least one image of a visual scene, wherein said at least one image comprises a plurality of pixels;
   b. acquiring or determining a range map comprising at least one distance value associated with at least one pixel of said plurality of pixels, wherein said at least one distance value comprises a measure of distance relative to an associated at least one camera used to acquire said at least one image;
   c. calculating a range histogram from said range map, wherein said range histogram comprises a vector, each element of said vector is associated with a different corresponding range of values of said at least one distance value, and each said element of said vector comprises a count of elements of said range map for which said at least one distance value of said range map is within said corresponding range of values of said at least one distance value;
   d. associating each element of said range map counted by said element of said vector with at least one of a corresponding pixel of said plurality of pixels or said range map;
   e. operating on said range histogram; and
   f. operating on at least one of said at least one of said corresponding pixel of said plurality of pixels or said range map associated with said element of said range map responsive to the operation of operating on said range histogram, wherein the operation of operating on said range histogram comprises searching said range histogram for at least one object in said visual scene responsive to a corresponding at least one cluster of elements of said range histogram, and the operation of operating on said at least one of said at least one of said corresponding pixel of said plurality of pixels or said range map associated with said element of said range map responsive to the operation of operating on said range histogram comprises nulling or ignoring each pixel of said plurality of pixels not associated with said at least one object and converting each other pixel of said plurality of pixels associated with said at least one object to a uniform value indicative of an active pixel so as to form a binary segmentation image of an entirety of said at least one image or said range map.

5. A method of processing an image of a visual scene as recited in claim 4, further comprising filling at least one hole within at least one boundary of said binary segmentation image, wherein each pixel associated with said at least one hole is converted to said uniform value indicative of said active pixel.

6. A method of processing an image of a visual scene as recited in claim 4, further comprising using an erosion filter to smooth at least one boundary of said binary segmentation image by nulling or ignoring one or more outer layers of pixels associated with said at least one boundary.

7. A method of processing an image of a visual scene, comprising:
   a. acquiring at least one image of a visual scene, wherein said at least one image comprises a plurality of pixels;
   b. acquiring or determining a range map comprising at least one distance value associated with at least one pixel of said plurality of pixels, wherein said at least one distance value comprises a measure of distance relative to an associated at least one camera used to acquire said at least one image;
   c. calculating a range histogram from said range map, wherein said range histogram comprises a vector, each element of said vector is associated with a different corresponding range of values of said at least one distance value, and each said element of said vector comprises a count of elements of said range map for which said at least one distance value of said range map is within said corresponding range of values of said at least one distance value;
   d. associating each element of said range map counted by said element of said vector with at least one of a corresponding pixel of said plurality of pixels or said range map;
   e. operating on said range histogram; and
   f. operating on at least one of said at least one of said corresponding pixel of said plurality of pixels or said range map associated with said element of said range map responsive to the operation of operating on said range histogram;
   g. further comprising generating a list that for each said element of said vector provides a location for each corresponding element of said range map contributing to said count of said elements of said range map for which said at least one distance value of said range map is within said corresponding range of values of said at least one distance value so as to facilitate the operation of operating on said at least one of said at least one of said corresponding pixel of said plurality of pixels or said range map associated with said element of said range map responsive to the operation of operating on said range histogram.

8. A method of processing an image of a visual scene as recited in claim 7, further comprising isolating relatively laterally-separated detached objects from said plurality of pixels or from said range map responsive to said list that for each said element of said vector provides said location for each said corresponding element of said range map contributing to said count of said elements of said range map for which said at least one distance value of said range map is within said corresponding range of values of said at least one distance value.

9. A method of processing an image of a visual scene comprising:
   a. acquiring at least one image of a visual scene, wherein said at least one image comprises a plurality of pixels;
   b. acquiring or determining a range map comprising at least one distance value associated with at least one pixel of said plurality of pixels, wherein said at least one distance value comprises a measure of distance relative to an associated at least one camera used to acquire said at least one image;
   c. calculating a range histogram from said range map, wherein said range histogram comprises a vector, each element of said vector is associated with a different corresponding range of values of said at least one distance value, and each said element of said vector comprises a count of elements of said range map for which said at least one distance value of said range map is within said corresponding range of values of said at least one distance value;
   d. associating each element of said range map counted by said element of said vector with at least one of a corresponding pixel of said plurality of pixels or said range map;

e. operating on said range histogram; and f. operating on at least one of said at least one of said corresponding pixel of said plurality of pixels or said range map associated with said element of said range map responsive to the operation of operating on said range histogram, wherein the operation of operating on said range histogram comprises searching said range histogram for at least one object in said visual scene responsive to a corresponding at least one cluster of elements of said range histogram, and the operation of operating on said at least one of said at least one of said corresponding pixel of said plurality of pixels or said range map associated with said element of said range map responsive to the operation of operating on said range histogram comprises nulling or ignoring each pixel of said plurality of pixels not associated with said at least one object and converting each other pixel of said plurality of pixels associated with said at least one object to a uniform value indicative of an active pixel so as to form a binary segmentation image of said at least one object; and g. iteratively isolating laterally-spaced attached objects in said visual scene from one another in said binary segmentation image of said at least one object by searching for a best-fit rectangle in a subset of said binary segmentation image of said at least one object, having an aspect ratio associated with a vulnerable road user (VRU).

10. A method of processing an image of a visual scene as recited in claim 9, wherein the operation of searching for said best-fit rectangle having an aspect ratio associated with said vulnerable road user (VRU) comprises:

a. finding a first best fit rectangle of said binary segmentation image of said at least one object;

b. dividing said first best fit rectangle into a plurality of portions;

c. beginning at a first corner of said first best fit rectangle, finding a second best fit rectangle of a corresponding subsection of said binary segmentation image within said first best fit rectangle, wherein said corresponding subsection is bounded by one of said plurality of portions;

d. determining if said second best fit rectangle does not classify as a prospective vulnerable road user (VRU), then repeating step c for a different portion of said first best fit rectangle, or beginning at a different corner of said first best fit rectangle; and e. otherwise, if said second best fit rectangle classifies as said prospective vulnerable road user (VRU), then subsequently processing said corresponding subsection of said binary segmentation image so as to provide for either identifying or responding to said at least one object in said visual scene.

11. A method of processing an image of a visual scene as recited in claim 10, further comprising processing a remaining portion of said first best fit rectangle in accordance with steps a-e of claim 10, excluding said corresponding subsection of said binary segmentation image corresponding to second best fit rectangle.

12. A method of processing an image of a visual scene, comprising:

a. acquiring at least one image of a visual scene, wherein said at least one image comprises a plurality of pixels;

b. acquiring or determining a range map comprising at least one distance value associated with at least one pixel of said plurality of pixels, wherein said at least one distance value comprises a measure of distance relative to an associated at least one camera used to acquire said at least one image;

c. calculating a range histogram from said range map, wherein said range histogram comprises a vector, each element of said vector is associated with a different corresponding range of values of said at least one distance value, and each said element of said vector comprises a count of elements of said range map for which said at least one distance value of said range map is within said corresponding range of values of said at least one distance value;

d. associating each element of said range map counted by said element of said vector with at least one of a corresponding pixel of said plurality of pixels or said range map;

e. operating on said range histogram; and f. operating on at least one of said at least one of said corresponding pixel of said plurality of pixels or said range map associated with said element of said range map responsive to the operation of operating on said range histogram so as to provide for locating at least one object within said at least one image or within said range map;

g. extracting at least one profile of at least one object from an associated boundary thereof within said at least one image or said range map, or a binary segmentation image thereof;

h. determining a corresponding center of said at least one profile;

i. determining a measurement vector comprising a plurality of distances from said corresponding center to said at least one profile at a plurality of angles relative to and through said corresponding center, wherein said plurality of angles is in excess of four;

j. comparing said measurement vector with at least one stored vector representative of at least one type of reference object; and k. determining whether or not said at least one object corresponds to at least one said reference object responsive to the operation of comparing said measurement vector with said at least one stored vector.

13. A method of processing an image of a visual scene as recited in claim 12, wherein the operation of extracting said at least one profile of said at least one object comprises:

a. extracting a first profile of a closest object in said at least one image or said at least one image responsive thereto, responsive to at least one of said range map or said range histogram;

b. processing said first profile in accordance with steps a-e of claim 12;

c. extracting a subsequent profile of a relatively farther object in said at least one image or said at least one image responsive thereto, responsive to at least one of said range map or said range histogram; and d. processing said subsequent profile in accordance with steps a-e of claim 12.

14. A method of processing an image of a visual scene as recited in claim 13, repeating steps c and d of claim 13 one or more times for one or more yet farther objects.

15. A method of processing an image of a visual scene as recited in claim 12, wherein the operation of determining said corresponding center of said at least one profile comprises determining a corresponding center of mass of said at least one profile.

16. A method of processing an image of a visual scene as recited in claim 12, wherein each distance of said plurality of distances is determined by first radially searching radially outwards along a search direction from said corresponding center until reaching a point on said at least one profile, and then calculating a corresponding distance of said plurality of distances, from said corresponding center to said point on said at least one profile.

17. A method of processing an image of a visual scene as recited in claim 16, wherein the operation of searching radially outwards from said corresponding center until reaching said point on said at least one profile comprises continuing to search along said search direction until finding an inactive pixel located adjacent to said point on said at least one profile.

18. A method of processing an image of a visual scene as recited in claim 12, wherein said plurality of angles are substantially equally distributed over a span of 360 degrees.

19. A method of processing an image of a visual scene as recited in claim 12, further comprising filtering said measurement vector with a central moving average filter prior to the operation of comparing said measurement vector with said at least one stored vector.

20. A method of processing an image of a visual scene as recited in claim 12, further comprising deriving said at least one stored vector from a plurality of associated measurement vectors from a corresponding plurality of different images of a corresponding said at least one said reference object.

21. A method of processing an image of a visual scene as recited in claim 12, wherein said at least one stored vector is derived as a median value of a plurality of measurement vectors from a plurality of different images of said corresponding said at least one said reference object.

22. A method of processing an image of a visual scene, comprising:
 a. acquiring at least one image of a visual scene, wherein said at least one image comprises a plurality of pixels;
 b. acquiring or determining a range map comprising at least one distance value associated with at least one pixel of said plurality of pixels, wherein said at least one distance value comprises a measure of distance relative to an associated at least one camera used to acquire said at least one image;
 c. calculating a range histogram from said range map, wherein said range histogram comprises a vector, each element of said vector is associated with a different corresponding range of values of said at least one distance value, and each said element of said vector comprises a count of elements of said range map for which said at least one distance value of said range map is within said corresponding range of values of said at least one distance value:
 d. associating each element of said range map counted by said element of said vector with at least one of a corresponding pixel of said plurality of pixels or said map;
 e. operating on said range histogram; and
 f. operating on at least one of said at least one of said corresponding pixel of said plurality of pixels or said range map associated with said element of said range map responsive to the operation of operating on said range histogram so as to provide for locating at least one object within said at least one image or within said range map;
 g. extracting at least one profile of at least one object from an associated boundary thereof within said at least one image or said range map, or a binary segmentation image thereof:
 h. determining a corresponding center of said at least one profile;
 i. determining a measurement vector comprising a plurality of distances from said corresponding center to said at least one profile at a plurality of angles relative to and through said corresponding center, wherein each distance of said of plurality of distances is determined by first radially searching radially outwards along a search direction from said corresponding center until reaching a point on said at least one profile, and then calculating a corresponding distance of said plurality of distances, from said corresponding center to said point on said at least one profile;
 j. comparing said measurement vector with at least one stored vector representative of at least one type of reference object; and
 k. determining whether or not said at least one object corresponds to at least one said reference object responsive to the operation of comparing said measurement vector with said at least one stored vector;
 l. further comprising limiting the search along said search direction to a boundary of a best fit rectangle within said at least one image or said at least one image responsive thereto.

23. A method of processing an image of a visual scene,
 a. acquiring at least one image of a visual scene, wherein said at least one image comprises a plurality of pixels:
 b. acquiring or determining range map comprising at least one distance value associated with at least one pixel of said plurality of pixels, wherein said at least one distance value comprises a measure of distance relative to an associated at least one camera used to acquire said at least one image;
 c. calculating a range histogram from said range map, wherein said range histogram comprises a vector, each element of said vector is associated with a different corresponding range of values of said at least one distance value, and each said element of said vector comprises a count of elements of said range map for which, said at least one distance value of said range map is within said corresponding range of values of said at least one distance value;
 d. associating each element of said range map counted by said element said vector with at least one of a corresponding pixel of said plurality of pixels or said range map;
 e. operating on said range histogram; and
 f. operating on at least one of said at least one of said corresponding pixel of said plurality of pixels or said range map associated with said element of said range map responsive to the operation of operating on said range histogram so as to provide for locating at least one object within said at least one image or within said range map;
 g. extracting at least one profile of at least one object from an associated boundary thereof within said at least one image or said range map, or a binary segmentation image thereof;
 h. determining a corresponding center of said at least one profile;
 i. determining a measurement vector comprising a plurality of distances from said corresponding center to said at least one profile at a plurality of angles relative to and through said corresponding center;
 j. comparing said measurement vector with at least one stored vector representative of at least one type of reference object; and
 k. determining whether or not said at least one object corresponds to at least one said reference object responsive to the operation of comparing said measurement vector with said at least one stored vector;

l. further comprising deriving said at least one stored vector from a plurality of associated measurement vectors from a corresponding plurality of different images of a corresponding said at least one said reference object, wherein the operation of deriving said at least one stored vector further comprises filtering the data from said plurality of associated measurement vectors with a central moving average filter prior to storing said at least one stored vector.

24. A method of processing an image of a visual scene as recited in claim 23, wherein a length of said central moving average filter is dependent upon a type of said corresponding said at least one said reference object.

25. A method of processing an image of a visual scene as recited in claim 24, further comprising filtering said measurement vector with said central moving average filter prior to the operation of comparing said measurement vector with said at least one stored vector, wherein said length of said central moving average filter is the same for both said measurement vector and said at least one stored vector.

26. A method of processing an image of a visual scene as recited in claim 25, wherein said at least one stored vector comprises a plurality of stored vectors for a corresponding plurality of reference objects of said at least one said reference object of a variety of object classes.

27. A method of processing an image of a visual scene as recited in claim 25, wherein said length of said central moving average filter is configured so as to substantially maximize a count of intra-class measurement or stored vectors corresponding to said corresponding said at least one said reference object at different ranges that are relatively strongly cross-correlated with one another.

28. A method of processing an image of a visual scene as recited in claim 27, wherein said corresponding said at least one said reference object is selected from the group consisting of a pedal cyclist, a standing pedestrian, a walking pedestrian in full stride and a walking pedestrian in mid stride.

29. A method of processing an image of a visual scene as recited in claim 27, wherein said corresponding said at least one said reference object is selected from the group consisting of a vehicle, a dog and a trash can.

30. A method of processing an image of a visual scene, comprising:
 a. acquiring at least one image of a visual scene, wherein said at least one image comprises a plurality of pixels;
 b. acquiring or determining a range map comprising at least one distance value associated with at least one pixel of said plurality of pixels, wherein said at least one distance value comprises a measure of distance relative to an associated at least one camera used to acquire said at least one image;
 c. calculating a range histogram from said range map, wherein said range histogram accounts for every pixel of said at least one image, said range histogram comprises a vector, each element of said vector is associated with a different corresponding range of values of said at least one distance value, and each said element of said vector comprises a count of elements of said range map, for which said at least one distance value of said range map is within said corresponding range of values of said at least one distance value;
 d. forming at least one cluster of a plurality of associated range bins of said range histogram corresponding to at least one corresponding object in said visual scene; and
 e. generating a response responsive to said at least one cluster.

31. A method of processing an image of a visual scene as recited in claim 30, wherein the operation of generating said response responsive to said at least one cluster comprises separating and isolating said at least one corresponding object in said visual scene from at least one other object in said visual scene responsive to range information associated with said at least one cluster.

32. A method of processing an image of a visual scene as recited in claim 31, wherein the operation of separating and isolating said at least one corresponding object in said visual scene from said at least one other object in said visual scene is responsive to a range spread of said at least one cluster, and said range spread of said at least one cluster is responsive to a difference between maximum and minimum ranges associated with said at least one cluster.

33. A method of processing an image of a visual scene as recited in claim 31, wherein the operation of separating and isolating said at least one corresponding object in said visual scene from said at least one other object in said visual scene is responsive to a corresponding at least one median range of a corresponding said at least one cluster.

34. A method of processing an image of a visual scene as recited in claim 30, further comprising forming a preliminary threat assessment of at least one object in said visual scene associated with said at least one cluster responsive to a median range of said at least one cluster, a count of pixels in said at least one cluster, and a range spread of said at least one cluster, wherein said range spread of said at least one cluster is responsive to a difference between maximum and minimum ranges associated with said at least one cluster.

35. A method of processing an image of a visual scene as recited in claim 30, further comprising classifying at least one object in said visual scene associated with said at least one cluster responsive to a range spread of said at least one cluster, wherein said range spread of said at least one cluster is responsive to a difference between maximum and minimum ranges associated with said at least one cluster.

36. A method of processing an image of a visual scene as recited in claim 35, wherein if said range spread is greater than a threshold, then said at least one object associated with said at least one cluster is classified as likely not a vulnerable road user (VRU).

37. A method of processing an image of a visual scene as recited in claim 35, further comprising classifying said at least one object in said visual scene associated with said at least one cluster responsive to a number of pixels in said at least one cluster.

38. A method of processing an image of a visual scene as recited in claim 30, wherein said at least one image of said visual scene comprises at least one pair of stereo images of said visual scene, and the operation of acquiring or determining said range map comprises determining said range map from said at least one pair of stereo images of said visual scene.

39. A method of processing an image of a visual scene, comprising:
 a. acquiring at least one image of a visual scene, wherein said at least one image comprises a plurality of pixels;
 b. acquiring or determining a range map comprising at least one distance value associated with at least one pixel of said plurality of pixels, wherein said at least one distance value comprises a measure of distance relative to an associated at least one camera used to acquire said at least one image;

c. calculating range histogram from said range map, wherein said range histogram comprises a vector, each element of said vector is associated with a different corresponding range of values of said at least one distance value, and each said element of said vector comprises a count of elements of said range map, for which said at least one distance value of said range map is within said corresponding range of values of said at least one distance value;

d. forming at least one cluster of a plurality of associated range bins of said range histogram corresponding to at least one corresponding object in said visual scene; and e. generating a response responsive to said at least one cluster, wherein the operation of generating said response responsive to said at least one cluster comprises separating and isolating said at least one corresponding object in said visual scene from at least one other object in said visual scene responsive to range information associated with said at least one cluster, wherein the operation of separating and isolating said at least one corresponding object in said visual scene from said at least one other object in said visual scene is responsive to a composite range map generated from a plurality of sequential images of said visual scene.

40. A method of processing an image of a visual scene, comprising:

a. acquiring at least one image of a visual scene, wherein said at least one image comprises a plurality of pixels;

b. acquiring or determining a range map comprising at least one distance value associated with at least one pixel of said plurality of pixels, wherein said at least one distance value comprises a measure of distance relative to an associated at least one camera used to acquire said at least one image;

c. calculating a range histogram from said range map, wherein said range histogram comprises a vector, each element of said vector is associated with a different corresponding range of values of said at least one distance value, and each said element of said vector comprises a count of elements of said range map, for which said at least one distance value of said range map is within said corresponding range of values of said at least one distance value;

d. forming at least one cluster of a plurality associated range bins of said range histogram corresponding to least one corresponding object in said visual scene; and:

e. generating a response responsive to said at least one cluster, wherein the operation of generating said response responsive to said at least one cluster cormprises separating and isolating said at least one corresponding object in said visual scene from at least one other object in said visual scene responsive to range information associated with said at least one cluster, wherein the operation of separating and isolating said at least one corresponding object in said visual scene from said at least one other object in said visual scene is responsive to a range spread of said at least one cluster, and said range spread of said at least one cluster is responsive to a difference between maximum and minimum ranges associated with said at least one cluster; further comprising:

f. generating a list that for each said element of said vector provides a location for each corresponding element of said range map contributing to said count of said elements of said range map for which said at least one distance value of said range map is within said corresponding range of values of said at least one distance value so as to provide for isolating objects in said range map that have negligible differential range with respect to one another; and g. processing said at least one pixel of said range map with a connected-components sieve filter, h. wherein said connected-components sieve filter is adapted to locate at least one cluster of pixels or elements within said range map such that at least one isolated portion of said at least one cluster contains at least one pixel or element of said pixels or elements that is connected to at least one other pixel or element of said pixels or elements either along a same one of a first plurality of rows said range map, a same one of a second plurality of columns of said range map, or diagonally along both said same one of said first plurality of rows of said range map and said same one of said second pluralities of columns of said range map.

41. A method of processing an image of a visual scenes, comprising:

a. acquiring at least one image of a visual scene, wherein said at least one image comprises a plurality of pixels;

b. acquiring or determining a range map comprising at least one distance value associated with at least one pixel of said plurality of pixels, wherein said at least one distance value comprises a measure of distance relative to an associated at least one camera used to acquire said at least one image;

c. calculating a range histogram from said range map, wherein said range histogram comprises a vector, each element of said vector is associated with a different corresponding range of values of said at least one distance value, and each said element of said vector comprises a count of elements of said range map, for which said at least one distance value of said range map is within said corresponding range of values of said at least one distance value;

d. forming at least one cluster of a plurality of associated range bins of said range histogram corresponding to least one corresponding object in said visual scene; and:

e. generating a response responsive to said at least one cluster; further comprising:

f. decreasing a resolution of said range map prior to calculating said range histogram; and g. generating a list that for each said element of said vector provides a location for each corresponding element of said range map contributing to said count of said elements of said range map for which said at least one distance value of said range map is within said corresponding range of values of said at least one distance value so as to provide for isolating objects in said range map that have negligible differential range with respect to one another.

* * * * *